(12) United States Patent
Emoto-Tisdale et al.

(10) Patent No.: US 12,275,074 B2
(45) Date of Patent: Apr. 15, 2025

(54) POWER SAWS

(71) Applicant: SawStop Holding LLC, Tualatin, OR (US)

(72) Inventors: John R. Emoto-Tisdale, Portland, OR (US); Andrew E. Engel, Wilsonville, OR (US); J. David Fulmer, Wailea, HI (US); Stephen F. Gass, West Linn, OR (US); Curt M. Kemper, Portland, OR (US); Paul H. Stasiewicz, Oregon City, OR (US); Benjamin J. Stockwell, Turner, OR (US); Brian M. Unger, Hillsboro, OR (US)

(73) Assignee: SawStop Holding LLC, Tualatin, OR (US)

( * ) Notice: Subject to any disclaimer, the term of this patent is extended or adjusted under 35 U.S.C. 154(b) by 0 days.

(21) Appl. No.: 17/798,243

(22) PCT Filed: Feb. 9, 2021

(86) PCT No.: PCT/US2021/017258
§ 371 (c)(1),
(2) Date: Dec. 19, 2022

(87) PCT Pub. No.: WO2021/163057
PCT Pub. Date: Aug. 19, 2021

(65) Prior Publication Data
US 2024/0300040 A1    Sep. 12, 2024

Related U.S. Application Data

(60) Provisional application No. 63/051,367, filed on Jul. 13, 2020, provisional application No. 62/972,470, filed on Feb. 10, 2020.

(51) Int. Cl.
*B23D 47/02* (2006.01)
*B23D 45/06* (2006.01)
*B27B 5/24* (2006.01)

(52) U.S. Cl.
CPC ......... *B23D 47/025* (2013.01); *B23D 45/068* (2013.01); *B27B 5/243* (2013.01)

(58) Field of Classification Search
CPC .............. B23D 47/025; B23D 45/068
USPC ....................................... 83/477.2
See application file for complete search history.

(56) References Cited

U.S. PATENT DOCUMENTS

| 4,436,515 A * | 3/1984 | Mallet ............... F16D 3/32 464/118 |
| 5,185,911 A * | 2/1993 | Upson ............... G05G 7/02 83/477.1 |
| 2007/0215243 A1* | 9/2007 | Bauer ............... B27B 5/243 144/1.1 |
| 2011/0011231 A1 | 1/2011 | Frolov |

(Continued)

FOREIGN PATENT DOCUMENTS

DE    9418632 U1 *   2/1995

*Primary Examiner* — Nhat Chieu Q Do

(57) ABSTRACT

A table saw with an elevation mechanism to raise or lower a blade is disclosed. The elevation mechanism includes a handwheel operatively connected to one end of a rotatable shaft and a universal joint assembly connected to another end of the rotatable shaft. The universal joint assembly can include a driving yoke, a coupling yoke, and a driven yoke. The universal joint is mounted to a threaded shaft that turns to raise or lower the blade.

5 Claims, 69 Drawing Sheets

Fig. 64

(56) References Cited

U.S. PATENT DOCUMENTS

2014/0260869 A1     9/2014   Frolov
2019/0308257 A1*   10/2019   Laliberte .............. B23D 45/068

* cited by examiner

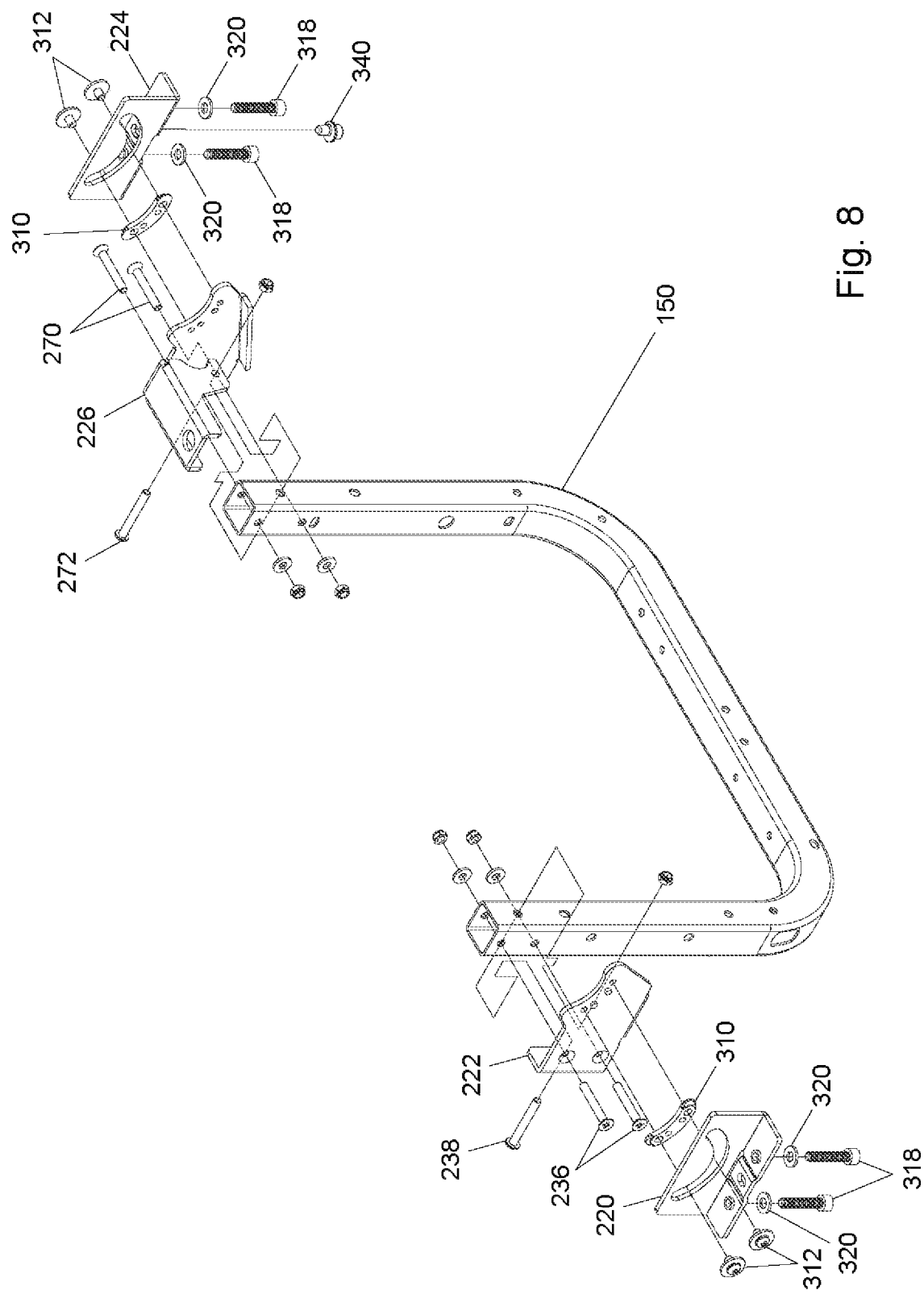

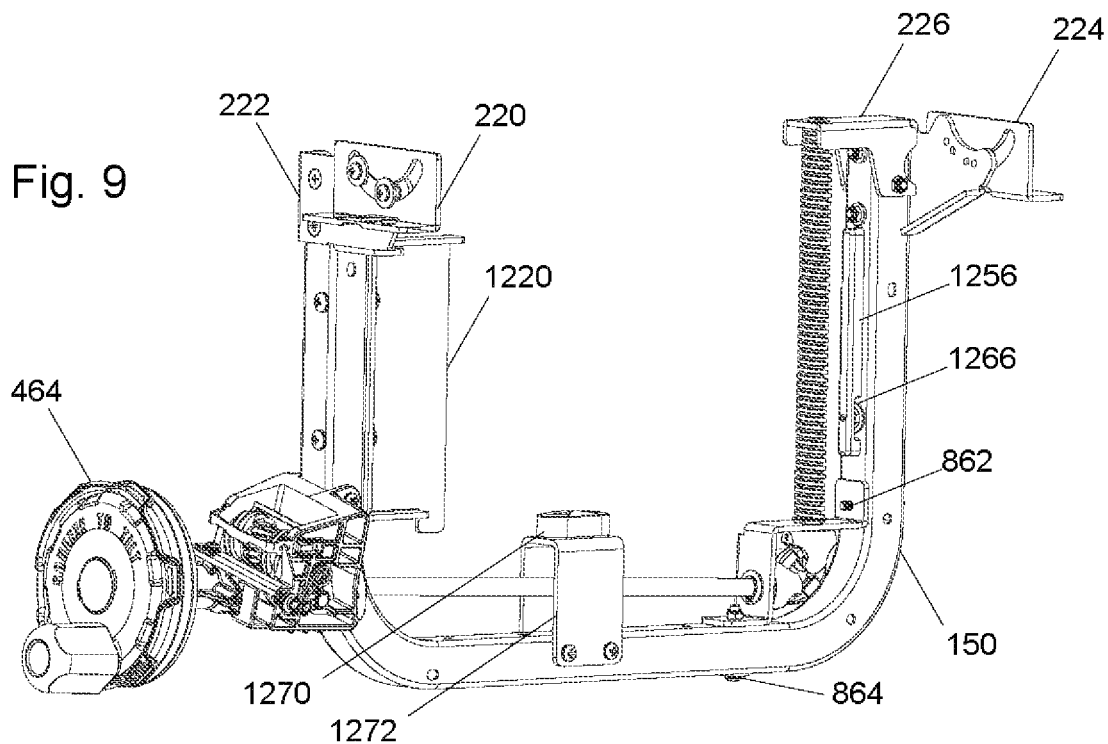
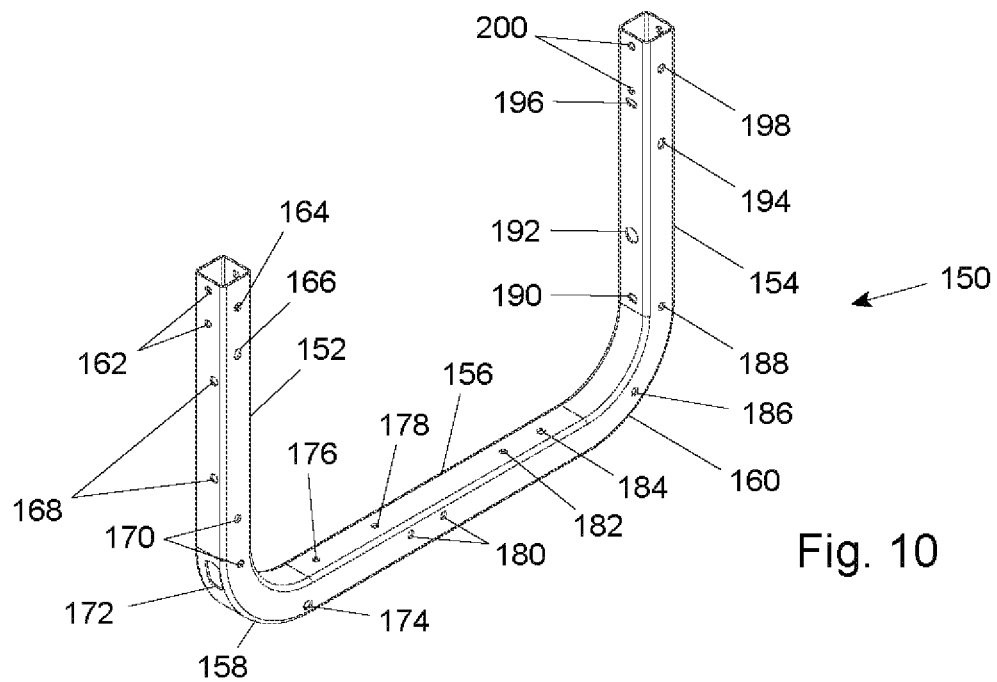

Fig. 29
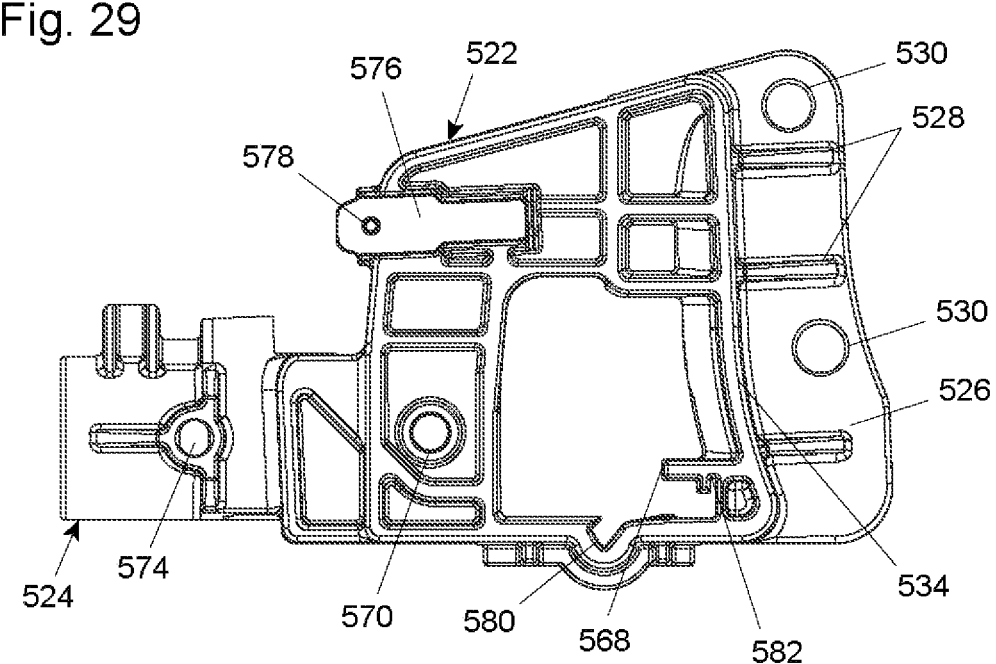
Fig. 30
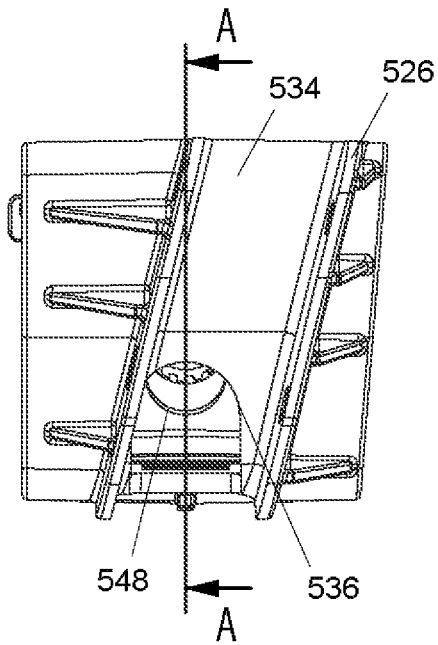
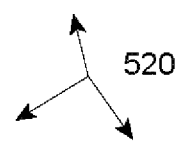
Fig. 31
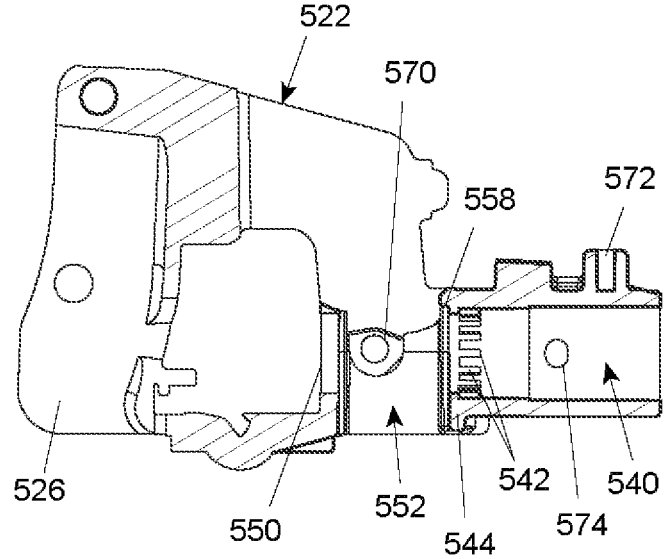

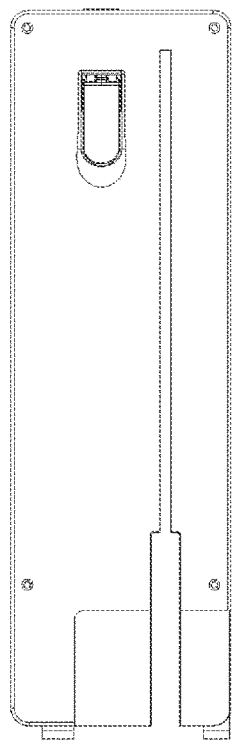
Fig. 92
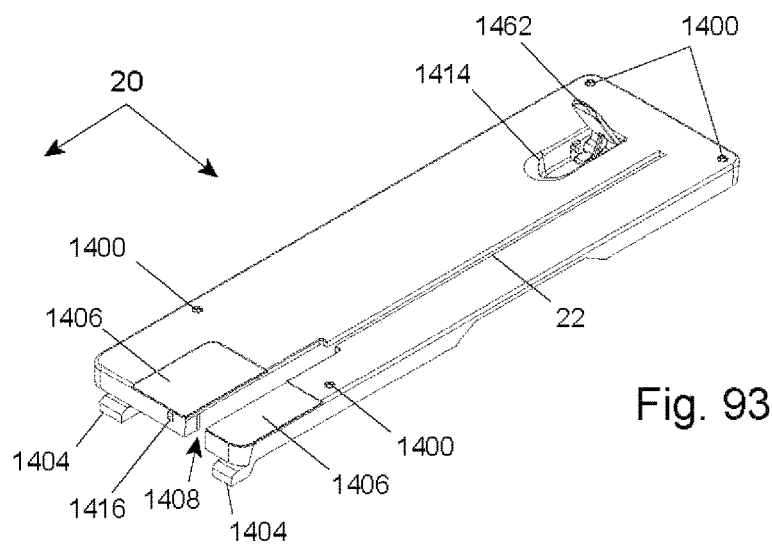
Fig. 93
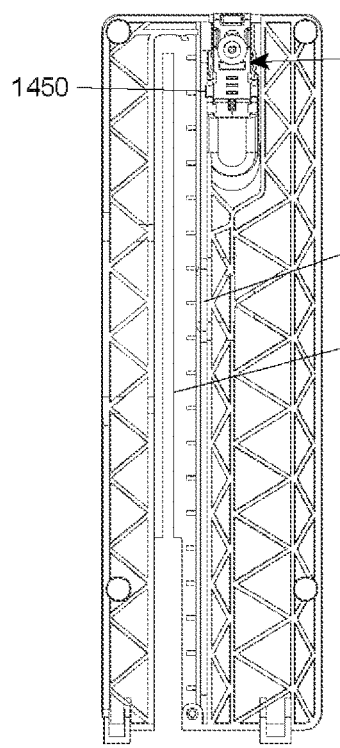
Fig. 94
Fig. 95

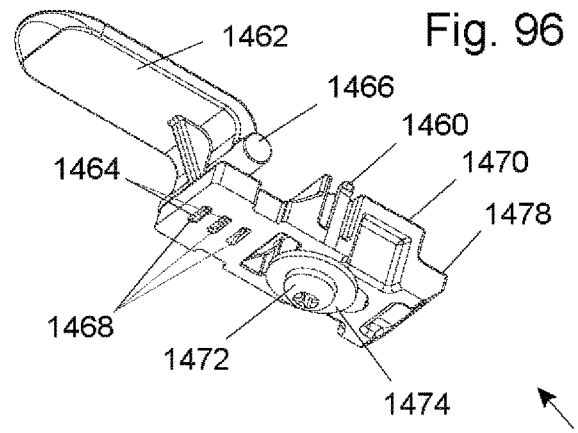
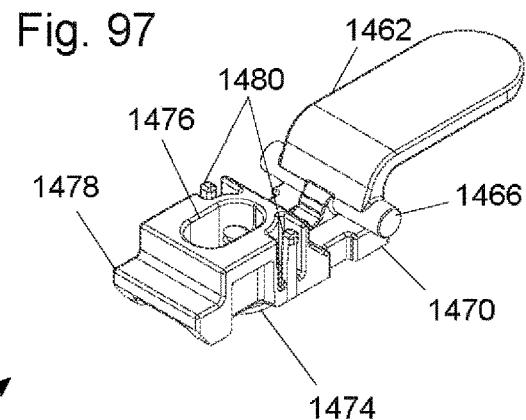
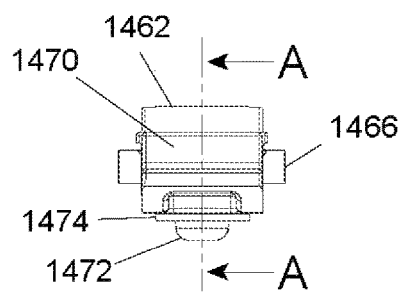
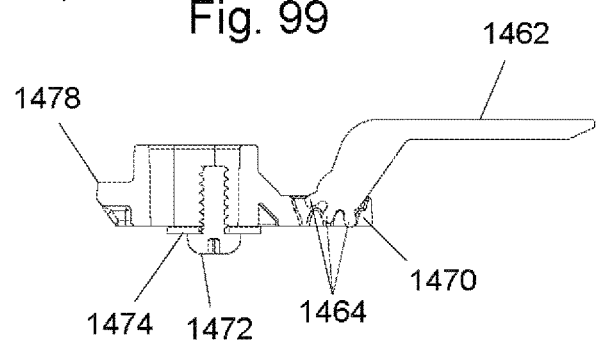
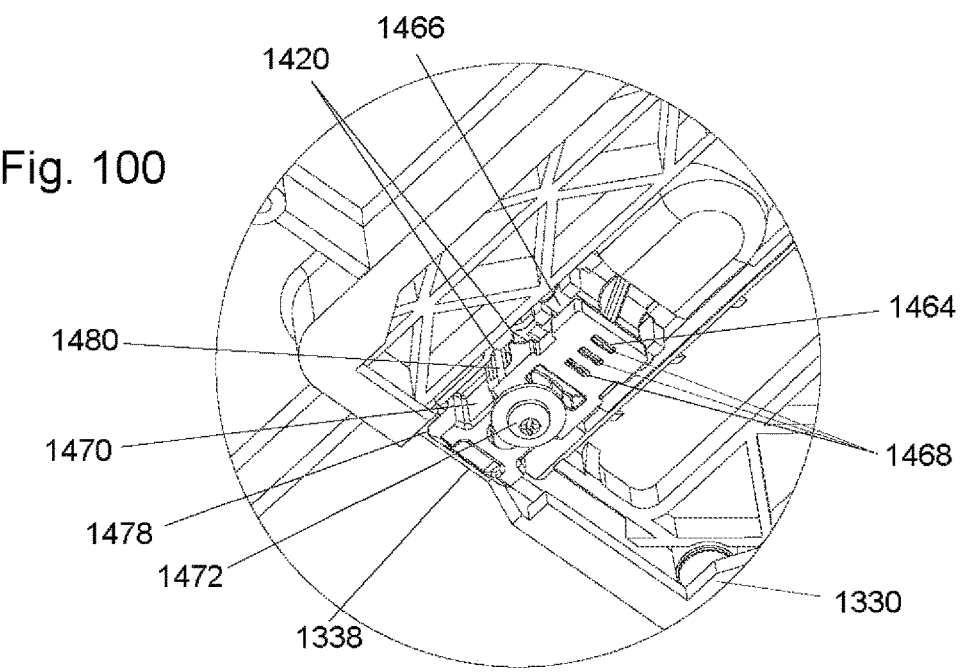

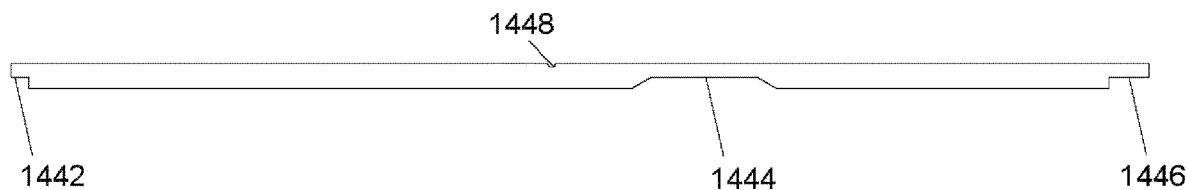
Fig. 101
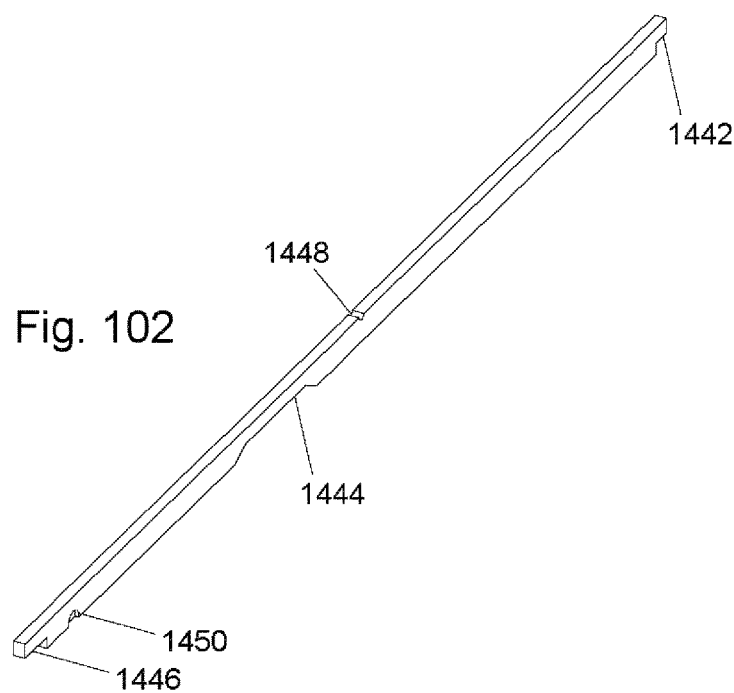
Fig. 102

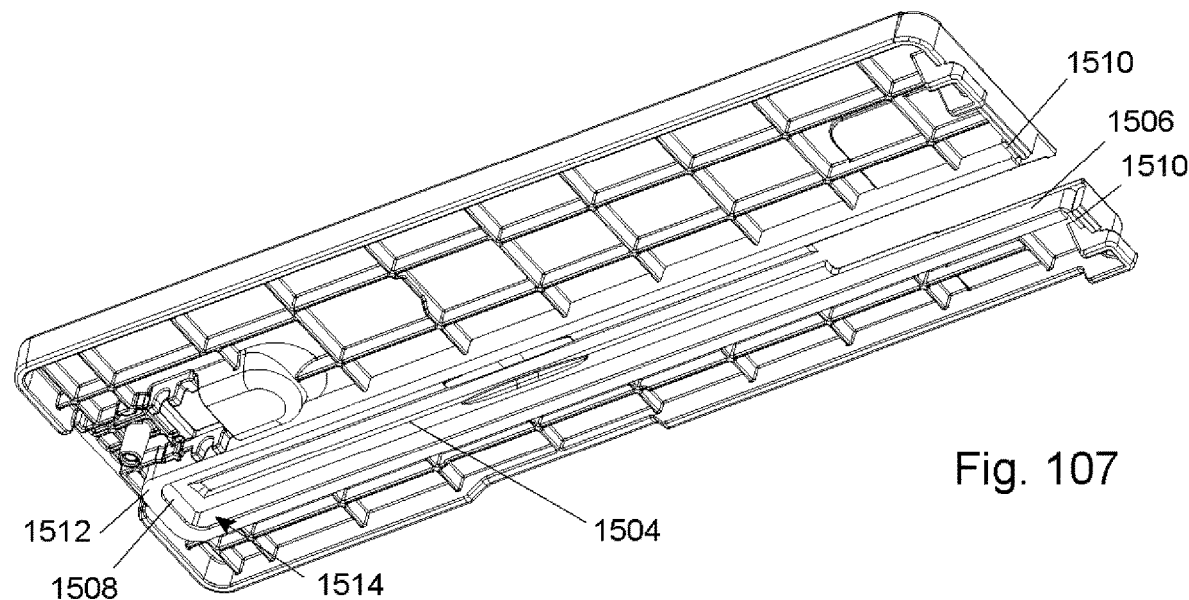
Fig. 107
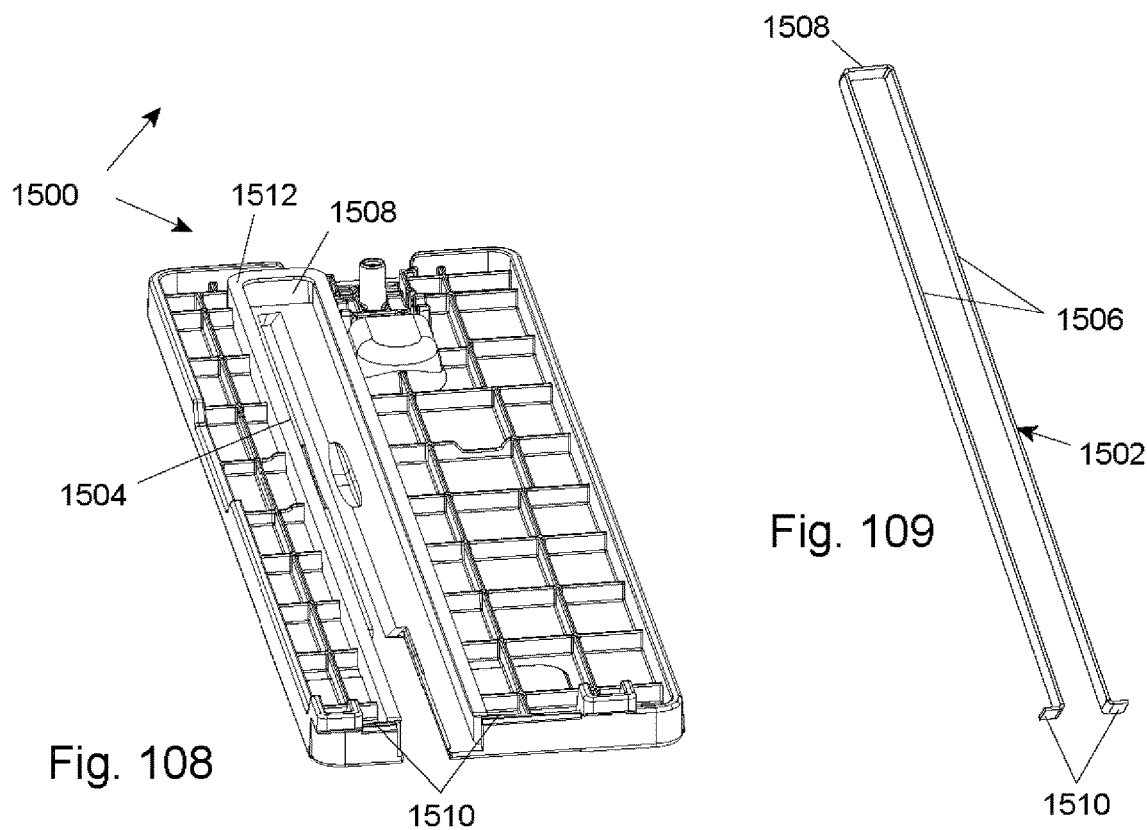
Fig. 108
Fig. 109

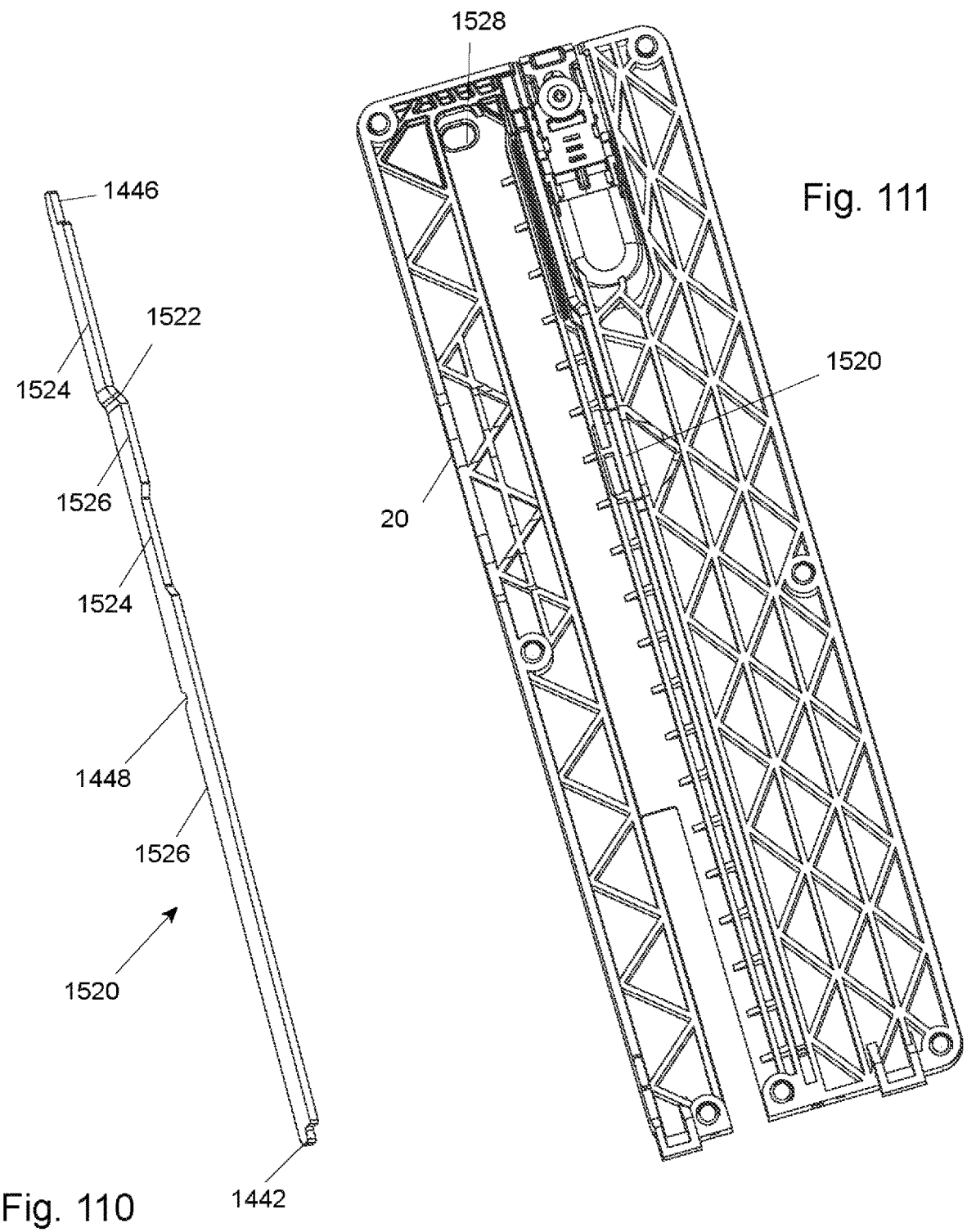

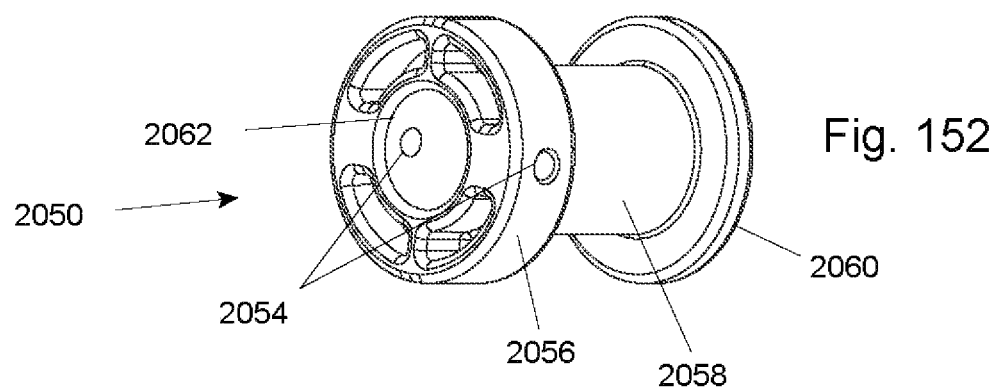
Fig. 152
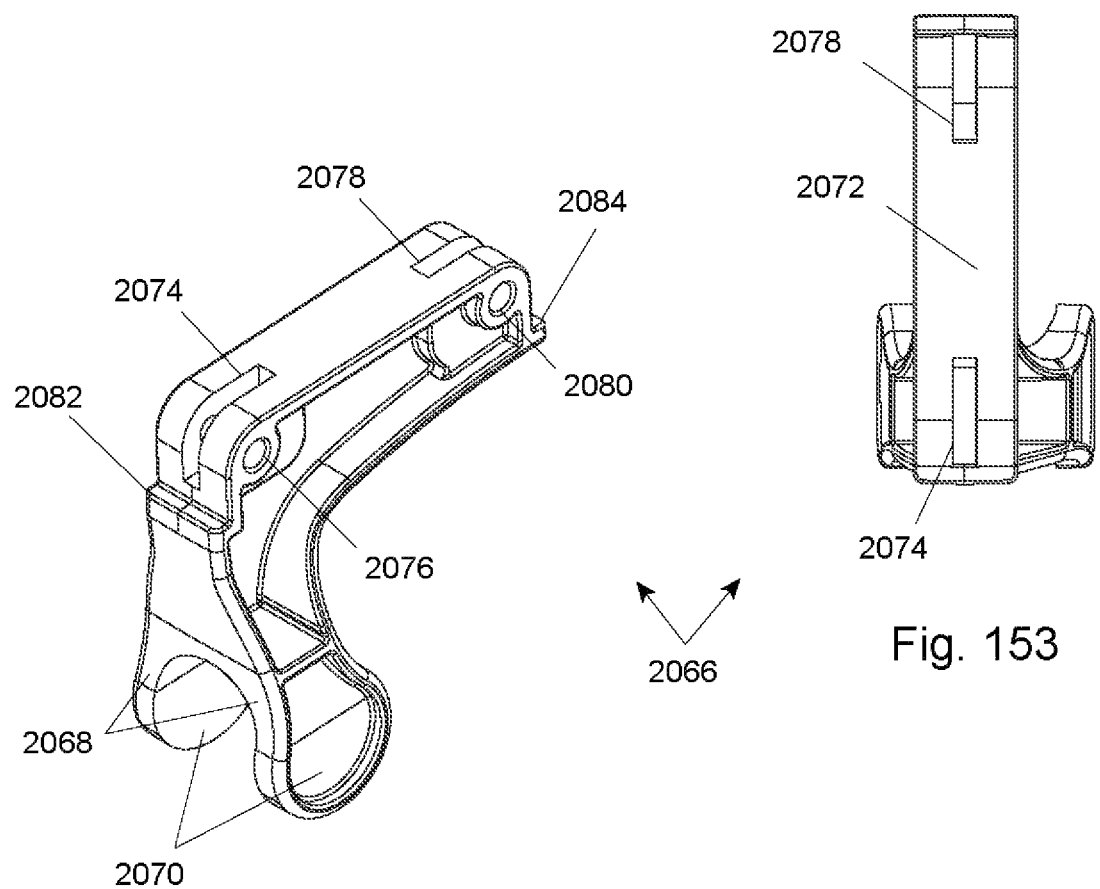
Fig. 153
Fig. 154

POWER SAWS

CROSS-REFERENCE TO RELATED APPLICATIONS

This application is a continuation of International Application No. PCT/US2021/17258, filed Feb. 9, 2021, which claims the benefit of and priority from U.S. Provisional Patent Application Ser. No. 62/972,470, filed Feb. 10, 2020, and from U.S. Provisional Patent Application Ser. No. 63/051,367, filed Jul. 13, 2020, both of which are incorporated herein by reference.

FIELD

The present disclosure relates to power saws and features that may be implemented in power saws. Various disclosed features are particularly relevant to portable table saws sometimes called jobsite or benchtop saws. Various other disclosed features are particularly relevant to table saws, hand-held circular saws, track saws, miter saws, and band saws with active injury mitigation technology.

BACKGROUND

A power saw is a tool used to cut a workpiece, such as a piece of wood, to a desired size or shape. Table saws, hand-held circular saws, track saws, miter saws, and band saws are examples of power saws. A table saw includes a work surface or table and a circular blade extending up through the table. A person uses a table saw by placing a workpiece on the table and feeding it into contact with the spinning blade to cut the workpiece to a desired size. A hand-held circular saw includes a circular blade, motor and handle. A person uses a hand-held circular saw by grasping the handle and moving the spinning blade into contact with a workpiece. A track saw is similar to a hand-held circular saw, and includes a track to guide the movement of the saw as the blade cuts the workpiece. A miter saw includes a circular blade on a moveable support arm. A person uses a miter saw by placing a workpiece under the blade and then moving the blade into contact with the workpiece to make a cut, typically by pivoting the blade and support arm down. A band saw includes a work surface and an adjacent band blade driven around two or more rollers or wheels. A person uses a band saw by placing a workpiece on the work surface and moving the workpiece into contact with the band blade.

Power saws are some of the most basic and versatile machines used in woodworking and construction. For example, power saws are used in making furniture and cabinetry, in the installation of hardwood flooring, in cutting plywood panels for roofing and walls, in cutting material for countertops, in making pallets and crates, and for many other projects and tasks.

Each type of power saw comes in various sizes and configurations. For example, table saws come in sizes ranging from large, stationary, industrial table saws, to small, lightweight, portable table saws. Larger table saws are sometimes called cabinet saws, mid-sized table saws are sometimes called contractor saws or hybrid saws, and smaller table saws are sometimes called portable, jobsite, or benchtop table saws. The larger table saws include induction motors and cast-iron parts, and typically weigh well over 100 pounds. The smaller, portable table saws are often small and light enough to be transported in the back of a pickup truck, and they often have stands with wheels so they can be moved around a jobsite or workspace. The smaller table saws have universal motors and weigh less than 100 pounds. For example, jobsite saws weigh approximately 60 to 80 pounds, and the smallest benchtop saws weigh approximately 40 to 45 pounds. Hand-held circular saws, track saws, miter saws and band saws also come in various sizes and configurations, and they can be equipped with different features.

The names "table saws," "hand-held circular saws," "track saws," "miter saws," and "band saws" are general categories that can overlap. For example, a track saw is a type of hand-held circular saw and can be referred to as a hand-held circular saw. Miter saws and band saws have tables or work surfaces on which a workpiece is placed to make a cut, and in that regard are similar to a table saw. Nevertheless, the designations "table saws," "hand-held circular saws," "track saws," "miter saws," and "band saws" are generally understood by persons of ordinary skill in the art of woodworking and construction to identify different categories or types of power saws.

Power saws present potential dangers or hazards because of the moving blade. Numerous accidents occur where a person using a power saw accidentally comes into contact with the moving blade. To address this issue, power saws can be equipped with active injury mitigation technology. Active injury mitigation technology detects a dangerous condition, such as accidental contact with the moving blade by a person, and then performs some action to mitigate injury, such as stopping or retracting the blade in milliseconds. Generally, an embodiment of active injury mitigation technology includes at least a detection system to detect the dangerous condition and a reaction system to perform the action to mitigate injury. An embodiment of active injury mitigation technology might also include a control system to control and/or test operation of the detection and reaction systems. The terms "detection system," "reaction system" and "control system" are used to identify known categories of structural components, and therefore, identify structure rather than function, just as the terms "actuator" and "sensor" identify known categories of structural components. For example, the term "detection system" is known to describe structural elements such as electronic circuitry to generate and monitor an electrical signal. The term "reaction system" is known to describe structural elements such as brake mechanisms and retraction mechanisms. The term "control system" is known to describe structural elements such as electronic circuitry and controllers used to manage, control and/or test the operability of the detection and reaction systems. U.S. patent application Ser. No. 10/100,211, filed Mar. 13, 2002 and titled "Safety Systems for Power Equipment," which issued as U.S. Pat. No. 9,724,840 on Aug. 8, 2017, describes active injury mitigation technology and various implementations and embodiments of active injury mitigation technology in power saws. The entire disclosure of U.S. patent application Ser. No. 10/100,211, and the patent resulting from that application, are incorporated herein by reference.

This document describes power saws and features that may be implemented in various categories of power saws. Some of the features described are particularly relevant to portable table saws such as jobsite and benchtop table saws. Other features described are particularly relevant to power saws with active injury mitigation technology.

BRIEF DESCRIPTION OF THE DRAWINGS

FIG. 8 shows an exploded view of a trunnion assembly.
FIG. 9 shows a trunnion assembly.
FIG. 10 shows a trunnion isolated.
FIG. 29 shows a side view of a bevel housing.
FIG. 30 shows a rear view of the bevel housing of FIG. 29.
FIG. 31 shows a cross sectional view of the bevel housing of FIG. 29.
FIG. 92 shows an insert for use with a table saw.
FIG. 93 shows another view of the insert of FIG. 92.
FIG. 94 shows the underside of the insert of FIG. 92.
FIG. 95 shows another view of the underside of the insert of FIG. 92.
FIG. 96 shows a locking mechanism for an insert isolated.
FIG. 97 shows another view of the locking mechanism of FIG. 96.

FIG. 98 shows another view of the locking mechanism of FIG. 96.

FIG. 99 shows a cross-sectional view of the locking mechanism of FIG. 96.

FIG. 100 shows a locking mechanism and insert installed in a table saw.

FIG. 101 shows a metal rib for an insert.

FIG. 102 shows another view of the rib of FIG. 101.

FIG. 107 shows another alternate embodiment of an insert for use with a table saw.

FIG. 108 shows another view of the insert of FIG. 107.

FIG. 109 shows a metal rib for use with the insert of FIG. 107.

FIG. 110 shows a metal rib for use with yet another alternate embodiment of an insert for use with a table saw.

FIG. 111 shows the insert for use with the rib of FIG. 110.

FIG. 152 shows a transfer bushing isolated.

FIG. 153 shows a link member isolated.

FIG. 154 shows another view of the link member of FIG. 153.

DETAILED DESCRIPTION

Figure 1:
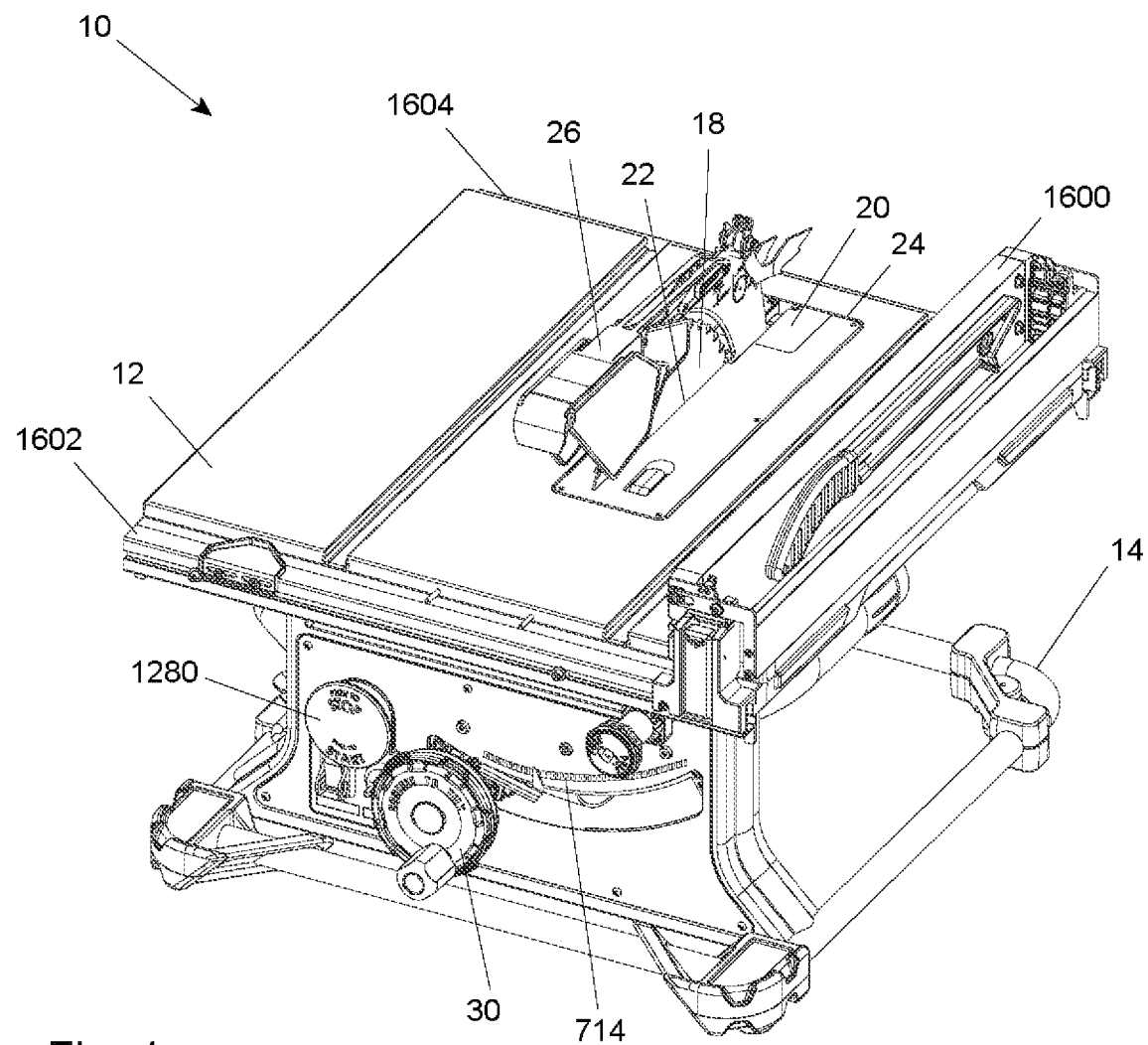
FIG. 1 shows a portable table saw.

FIG. 1 shows a table saw 10. The saw includes a table 12 on which a work piece may be cut. The table is supported by a housing or support structure 14, and a motor 16 is within the support structure, and it is operably connected to drive or spin a blade 18. The blade extends up through a slot 22 in an insert 20, which is fitted into an opening 24 in the table, and a blade guard 26 covers the blade. A handwheel 30 may be turned to adjust the elevation of the blade, or the handwheel may be moved along an arcuate path to change the tilt of the blade relative to the table top. In operation, a user would use the handwheel and associated components to position the blade as desired and then make a cut by pushing a workpiece on the table past the spinning blade.

Table saws such as saw 10 can be equipped with "active injury mitigation technology." That phrase refers to technology that detects a dangerous condition, such as contact between a person and the spinning blade, and then performs some predetermined action to mitigate any injury, such as stopping and/or retracting the blade. Exemplary implementations of active injury mitigation technology are described in International Patent Application Publication No. WO 01/26064 A2, in U.S. patent application Ser. No. 10/100,211, filed Mar. 13, 2002, titled "Safety Systems for Power Equipment," and in U.S. Pat. No. 9,724,840, which issued from U.S. patent application Ser. No. 10/100,211, all of which are incorporated herein by reference.

Figure 2:
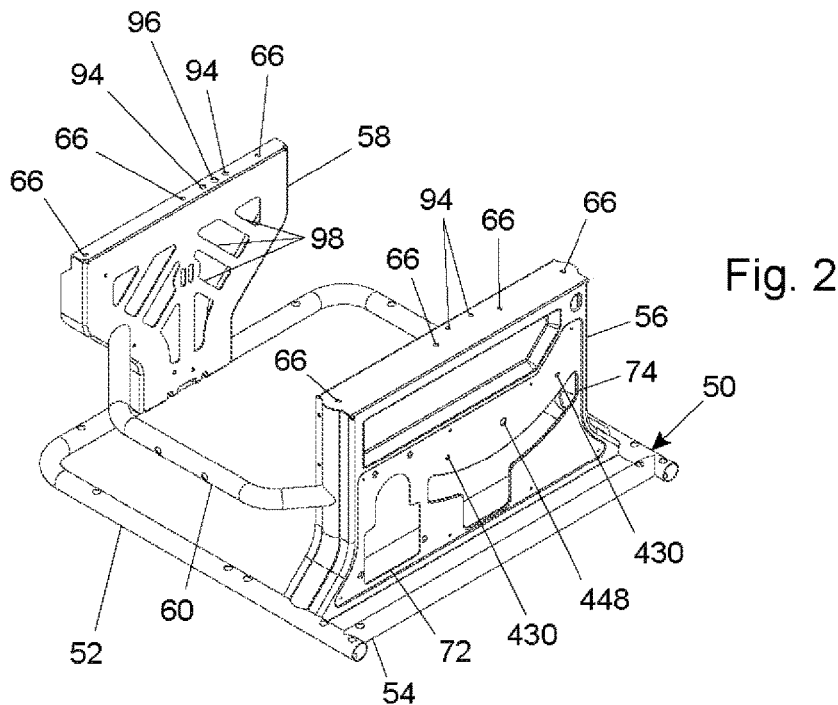
FIG. 2 shows an isometric view of a support structure for a table saw.
Figure 4:
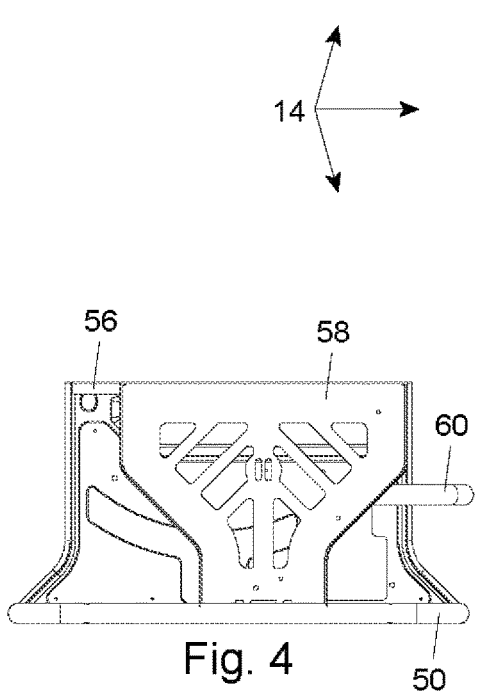
FIG. 4 shows a rear view of the support structure of FIG. 2.
Figure 3:
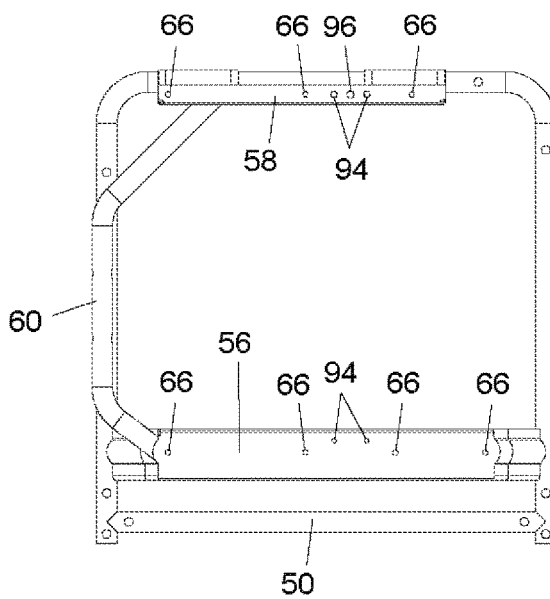
FIG. 3 shows a top view of the support structure of FIG. 2.
Figure 5:
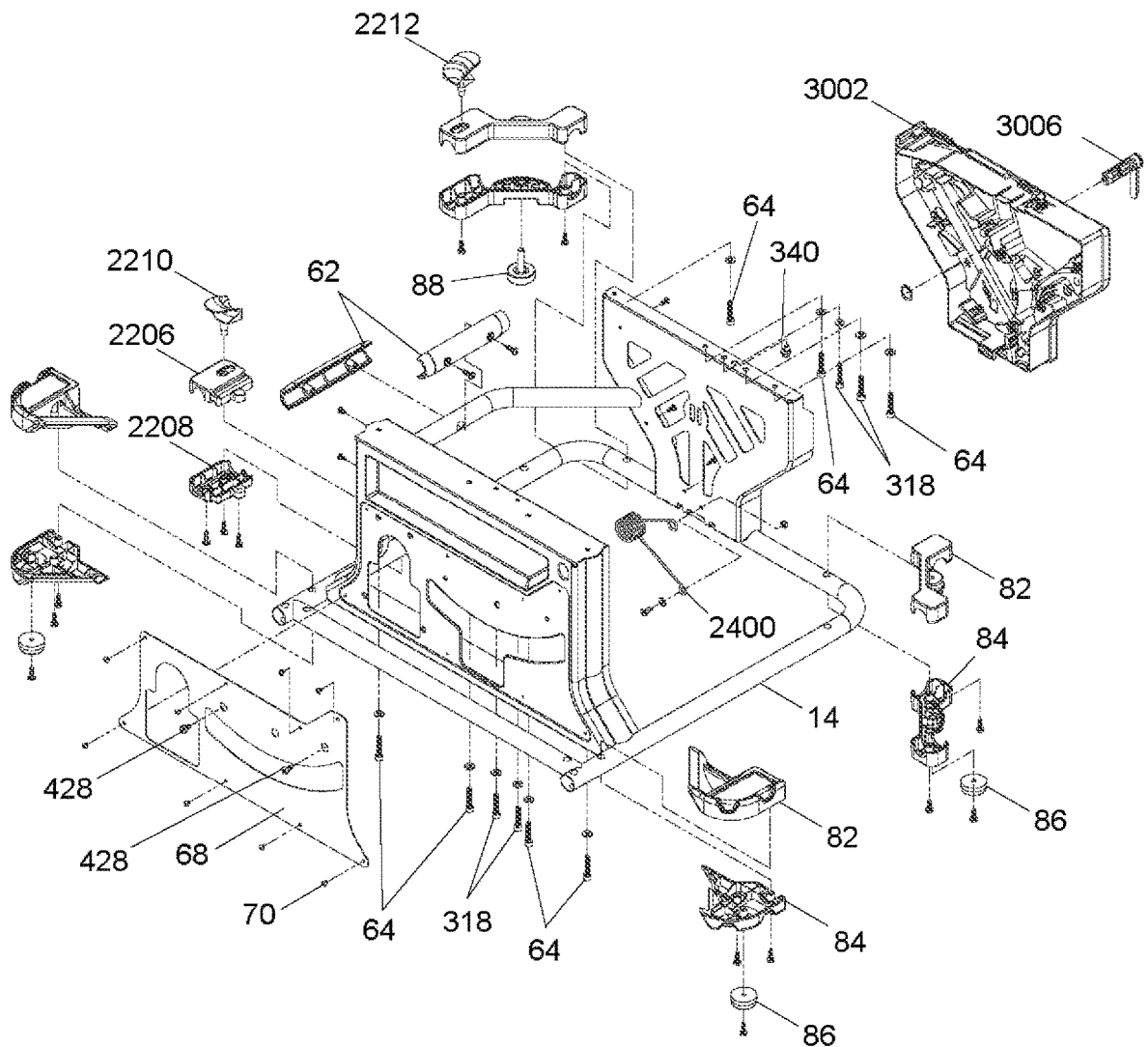
FIG. 5 shows an exploded view of a support structure with additional components.

Support structure 14 is shown isolated in FIGS. 2-4, with some components removed, and FIG. 5 shows an exploded view of the support structure and some additional components. The support structure includes a base 50 (formed from a U-shaped section 52 and a secondary section 54), a front panel 56, a rear panel 58, and a handle 60. In the presently disclosed embodiment, the front and rear panels are formed from bent, stamped sheet metal, and the base and handle are formed from bent, hollow, metal tubing. It will be appreciated that other materials and methods of manufacturing are also possible within the scope of the invention. The front and rear panels are attached to the table, a connector or tube structure, such as base 50, is disposed below the table, and no side panels are used to support the table.

Portable table saws can include handles to make it easier for users to carry and/or move the saws. In the presently disclosed embodiment, table saw 10 includes a handle 60, which extends between the front and rear panels on the left side of the saw. Handle 60 provides a way for a user to lift saw 10 and increases the stability of the support structure, because it extends between the front and rear panels at a height above base 50. The handle is formed from a bent piece of hollow, metal tubing, and it can include a rubber or foam grip 62 (shown in FIG. 5) to provide a comfortable surface for a user to grasp. Positioning the handle on the left side of the saw allows the handle to fit under table 12 without extending beyond the table. Since the internal components of saw 10 are configured to tilt to the right, more clearance would have to be provided for a handle on the right side of the saw, in order to prevent the internal components from interfering with the handle. The handle is welded or bolted to the front and rear panels, which are, in turn, welded or bolted to base 50. A secondary front panel 68 is bolted to front panel 56 by screws 70, and it includes holes which align with those in the support structure. Support feet are disposed at each of the four corners of base 50. Each foot includes an upper section 82 and a lower section 84, which fit together around the tubes forming base 50. A rubber foot 86 or threaded leveling foot 88 is connected to the bottom of each lower section 84, and the rubber feet help to prevent the saw from moving or sliding during use. Two bolts or screws extend up through each support foot and through holes in base 50, to secure the support feet to the tubes. It is advantageous to provide at least one adjustable support foot to prevent the saw from rocking or tipping. In the present embodiment, support foot 88 at the back, left corner of the saw is adjustable.

A rear cover 3002 is removably connected to rear panel 58 by a handle 3006, and the space between the panel and cover may be used as a storage compartment, as will be discussed later. It can be seen in FIG. 2 that rear panel 58 may include a plurality of optional cutouts 98, which may be used to reduce weight.

Figure 123:
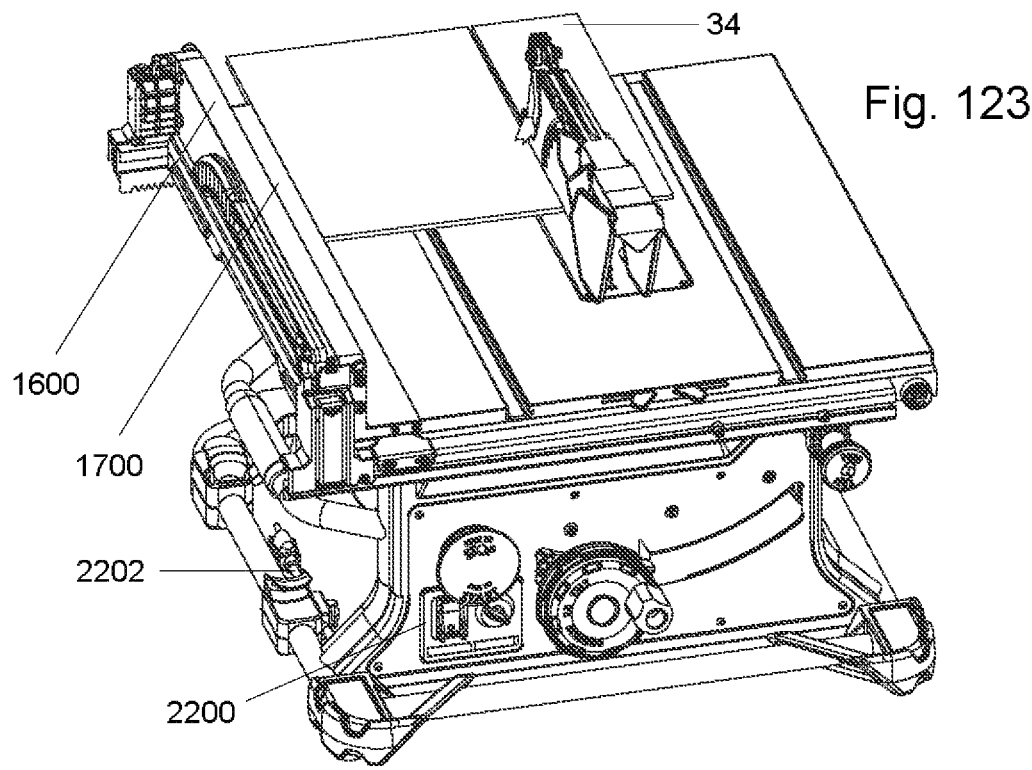
FIG. 123 shows a table saw with a fence in a low fence configuration.

The support structure is constructed to support the weight of the table, internal mechanism of the saw, and a workpiece, such as workpiece 34 shown in FIG. 123. The upper surfaces of the front and rear panels each include holes 66, and each bolt 64 passes through a washer and a hole 66, then threads into a boss 120 in the underside of table 12. Table 12 is shown isolated in FIGS. 6 and 7. The table is made from die cast aluminum with a plurality of ribs 122 on the bottom side, shown in FIG. 7, to add strength and rigidity while minimizing weight and manufacturing costs. It will be appreciated that table 12 could be made from other materials or by other methods. Grip surfaces or handles 124 may be molded in the sides of the table to provide additional surfaces for a user to grasp when lifting or moving the saw.

Saw 10 also includes a trunnion 150, which is supported in the saw by a set of front and rear trunnion brackets 220 and 224, as shown in 15 and 17. The trunnion brackets are pivotally connected to a set of front and rear mounting plates 224 and 226, respectively, which, in turn, are bolted to trunnion 150. FIGS. 8-17 show various views of the trunnion and related components.

Trunnion 150 is shown isolated in FIG. 10. Trunnion 150 is comprised of two generally parallel, generally vertical sections 152 and 154, connected to a bottom section 156 by corners 158 and 160. Trunnion 150 has holes 162-200, the uses of which will be discussed later. While only one side of each hole is labeled in FIG. 10, each of the holes has an accompanying hole on the opposite side of the hollow trunnion tube. In the present embodiment, base section 156 is generally perpendicular to sections 152 and 154, but it will be appreciated that the base could be angled relative to the generally vertical sections, such that one vertical section was slightly longer than the other. This trunnion design has several advantages, including low cost, simplicity, and ease of manufacturing.

Figure 11:
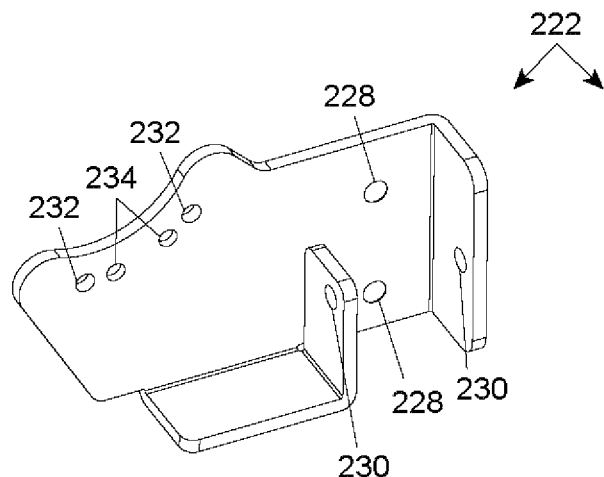
FIG. 11 shows a front mounting bracket.
Figure 12:
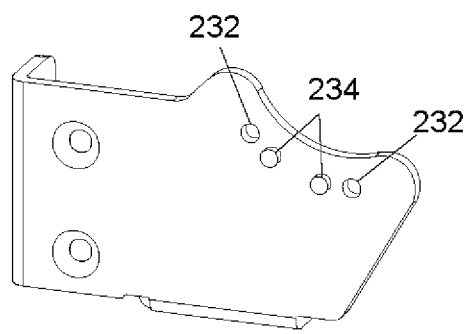
FIG. 12 shows another view of the front mounting bracket of FIG. 11.

Front mounting plate 222, shown isolated in FIGS. 11 and 12, is made from a unitary piece of bent sheet metal, which is bent to fit around the front of trunnion 150. The front mounting plate is connected to trunnion 150 via three screws. Two parallel screws 236 pass through holes 228 in front trunnion mounting plate 222 and then through holes 162 in trunnion 150. The third screw 238 passes through holes 230 in the front trunnion mounting plate and hole 164 in the trunnion. Each of the screws is secured with a washer and nut, although other methods of attachment are also possible.

Figure 13:
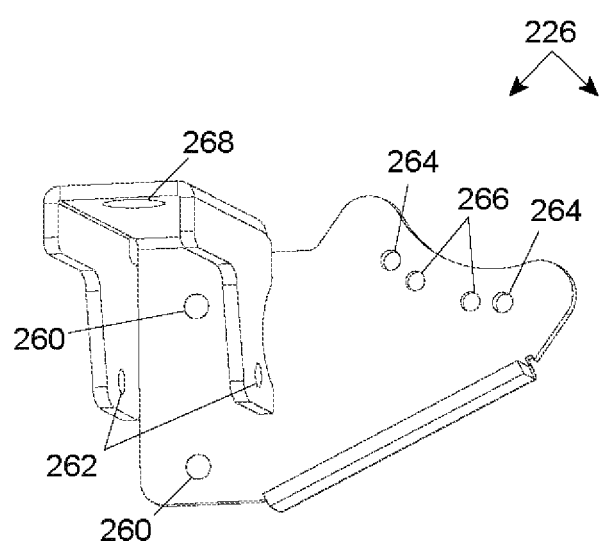
FIG. 13 shows a rear mounting bracket.
Figure 14:
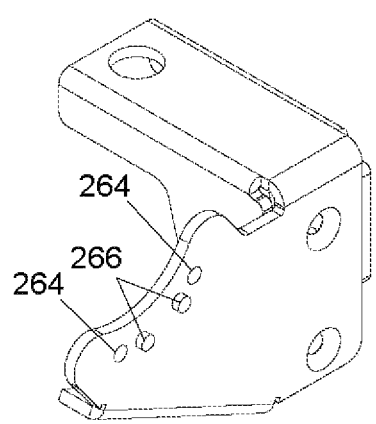
FIG. 14 shows another view of the rear mounting bracket of FIG. 13.

Rear trunnion mounting plate 226, shown isolated in FIGS. 13 and 14, is made from a unitary piece of sheet metal bent to fit around the back and over the top of trunnion 150. Two parallel screws 270 pass through holes 260 in rear mounting plate 226 and then through holes 200 in trunnion 150 (labeled in FIG. 10). A third screw 272, which is perpendicular to the two screws 270, passes through holes 262 in rear trunnion mounting plate 226 and hole 198 in trunnion 150. As with the front trunnion mounting plate, the three screws are secured with washers and nuts. The connection between the rear mounting plate and trunnion is perhaps best shown in FIGS. 8 and 9.

Figure 15:
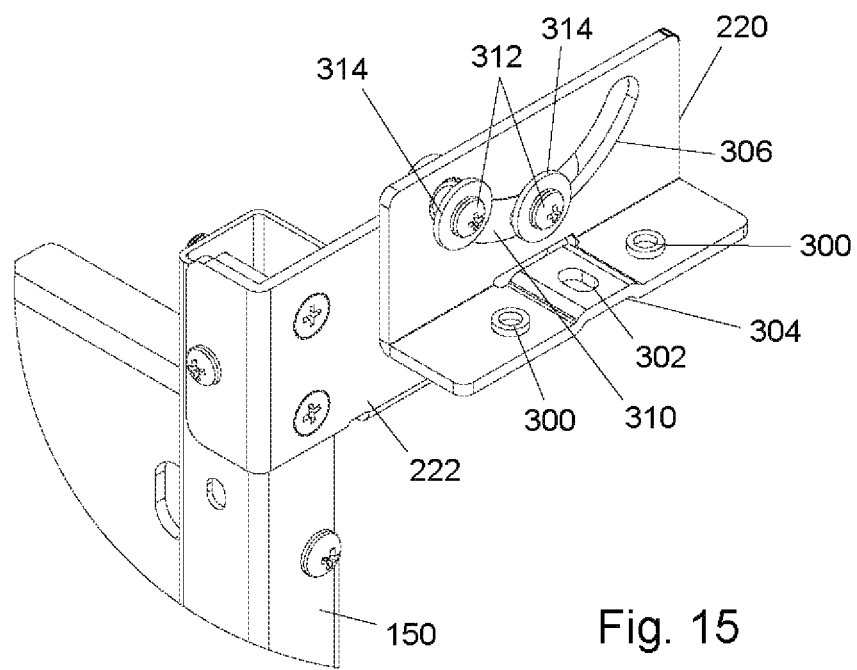
FIG. 15 shows a trunnion with a front mounting bracket and a front trunnion bracket.
Figure 16:
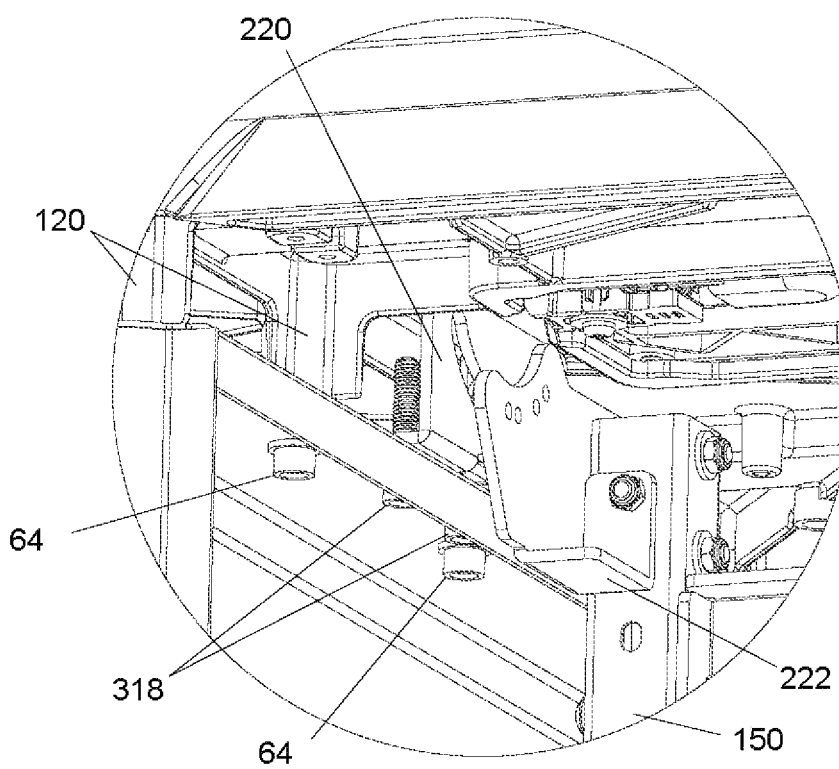
FIG. 16 shows the connection between a front trunnion bracket and a support structure.

The front and rear mounting plates are pivotally connected to respective front and rear trunnion brackets, which, in turn, are bolted to support structure 14. FIG. 15 shows a detail view of the connection between the trunnion, front trunnion bracket, and front mounting plate, and FIG. 16 shows a detail view of the connection between the front trunnion bracket and the support structure. In the presently disclosed embodiment, both trunnion brackets are identical, but it will be appreciated that different structures could be used within the scope of the invention. The trunnion brackets are formed from bent pieces of sheet metal, and each bracket includes two threaded holes 300, an elongate hole 302 centered in a raised section 304, and an arcuate opening 306, as can be seen in at least FIG. 15. Front mounting plate 222 attaches to front trunnion bracket 220 via two screws 312, which pass through holes 232 in the front mounting plate and arcuate opening 306 in the front trunnion bracket. Between screws 312, there is an arcuate sliding piece 310, shaped to fit within and slide along arcuate opening 306, with holes for screws 312 and depressions shaped to receive a pair of cylindrical projections 234 on front trunnion mounting plate 222. Sliding piece 310 can move within arcuate opening 306 in order to allow the trunnion 150 and accompanying blade, arbor, and motor, to tilt up to 45 degrees in order to allow a user to make angled cuts. Projections 234 and screws 312 prevent the sliding piece from moving relative to the front mounting plate.

Rear trunnion bracket 224 attaches to rear trunnion mounting plate 226 in the same manner in which front trunnion bracket 220 attaches to front trunnion mounting plate 222, as can be seen in FIGS. 8 and 9. Screws 312 pass through a sliding piece 310 and holes 264 in rear trunnion mounting plate 226 to secure the trunnion mounting plate to the trunnion bracket. Cylindrical projections 266 on rear trunnion mounting plate 226 are shaped to fit into corresponding cylindrical depressions in sliding piece 310 to provide additional stabilization between the rear trunnion mounting plate and bracket.

Figure 17:
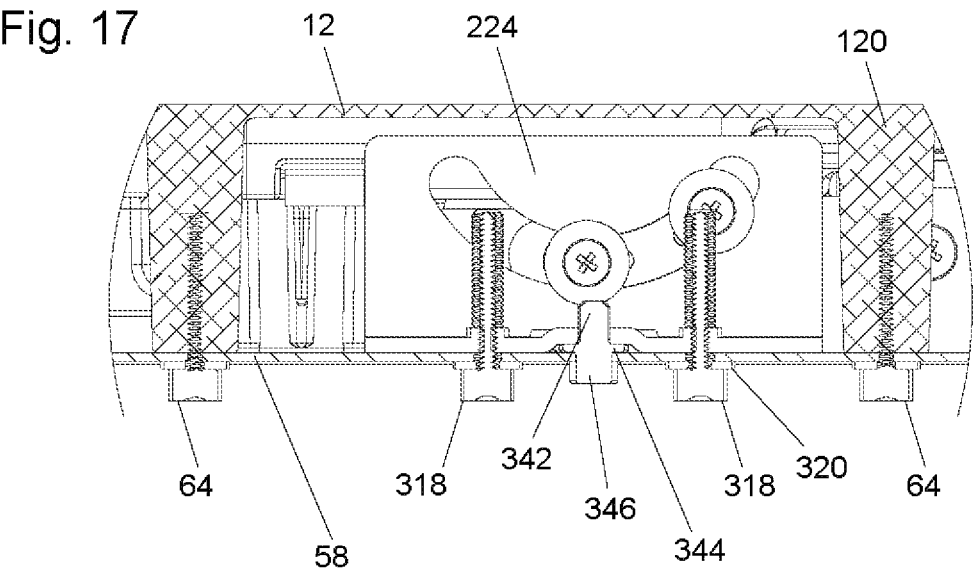
FIG. 17 shows a cross-sectional view of the connection between a rear trunnion bracket and a support structure.
Figure 18:
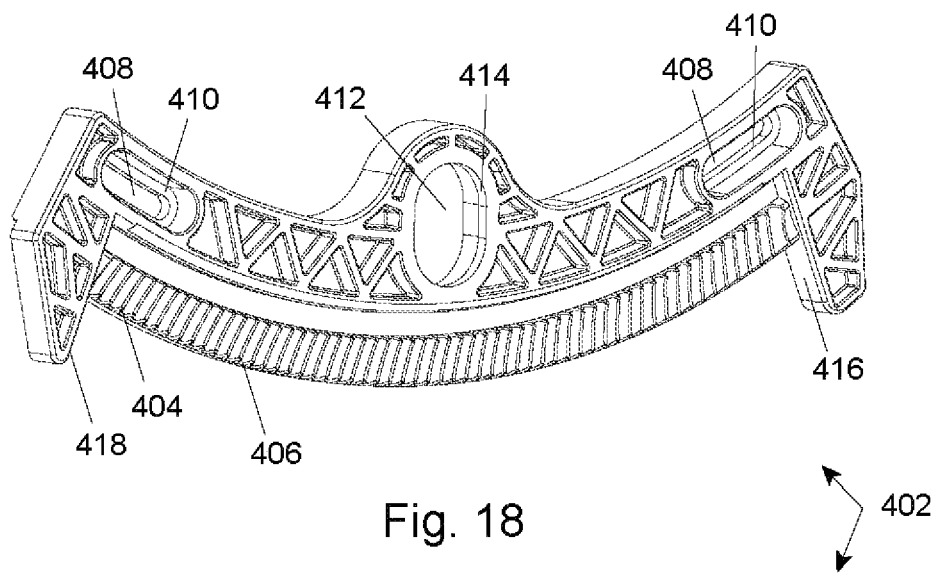
FIG. 18 shows a tilt rack isolated.
Figure 19:
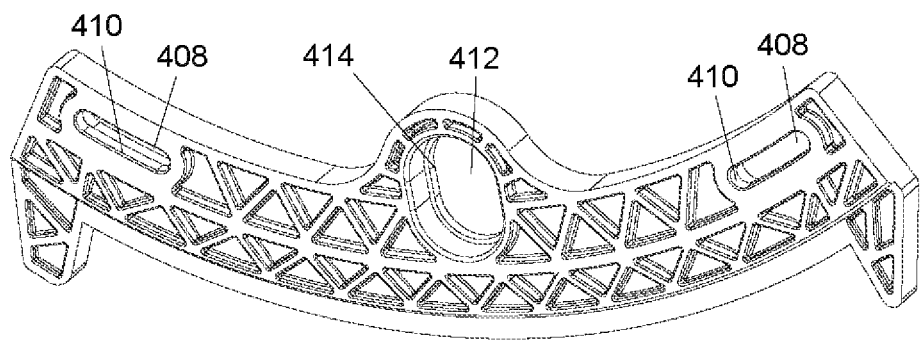
FIG. 19 shows another view of the tilt rack of FIG. 18.
Figure 20:
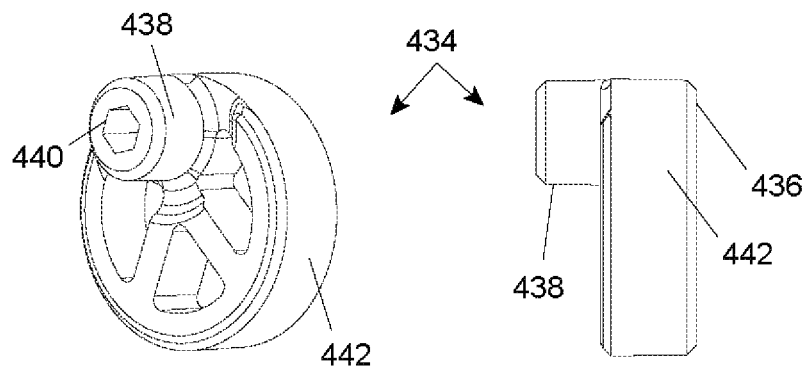
FIG. 20 shows an eccentric bushing.
Figure 21:
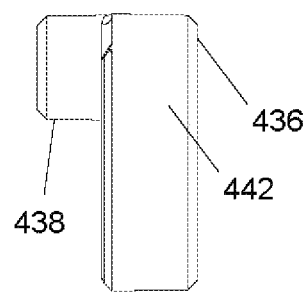
FIG. 21 shows a side view of the eccentric bushing of FIG. 20.
Figure 22:
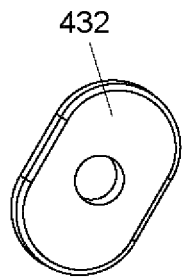
FIG. 22 shows a sliding nut.
Figure 23:
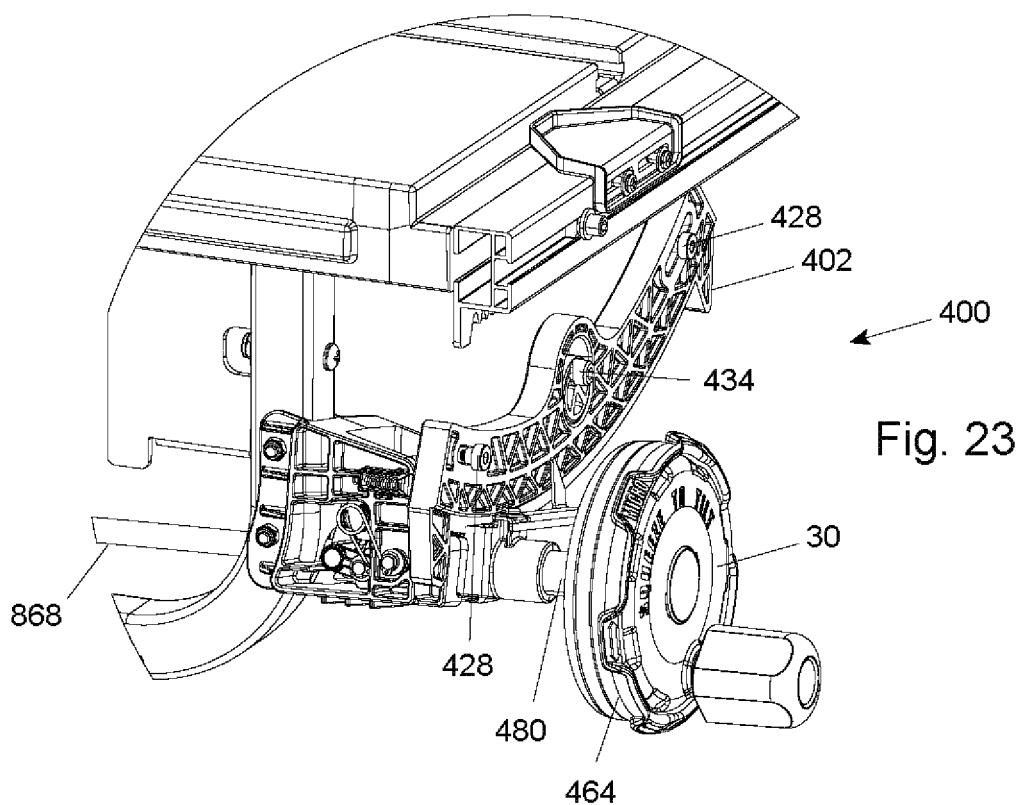
FIG. 23 shows a tilt mechanism and some associated components.
Figure 24:
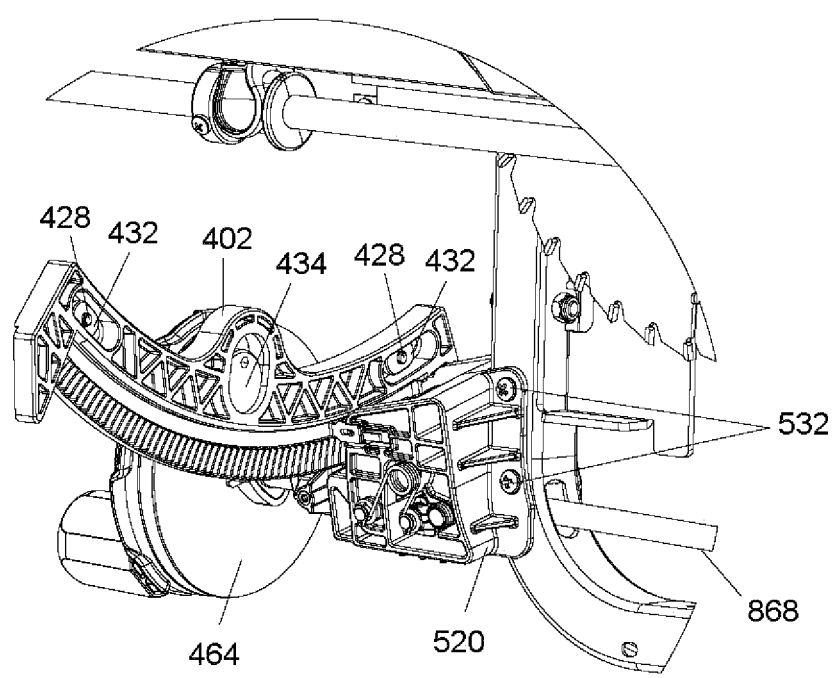
FIG. 24 shows another view of the tilt mechanism and components of FIG. 23.
Figure 25:
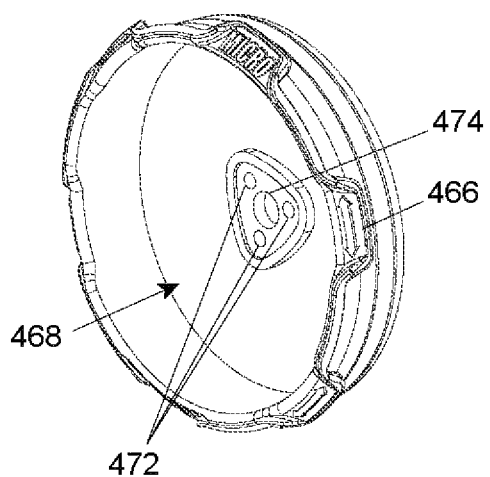
FIG. 25 shows a grip plate.
Figure 26:
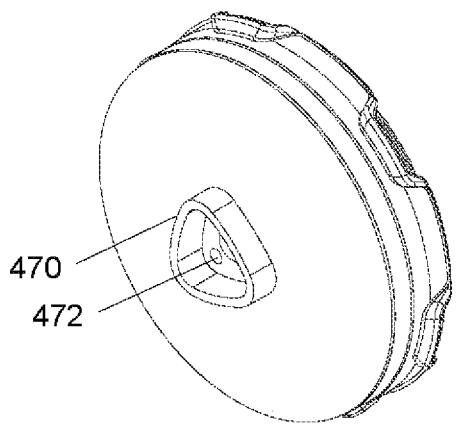
FIG. 26 shows another view of a grip plate.
Figure 27:
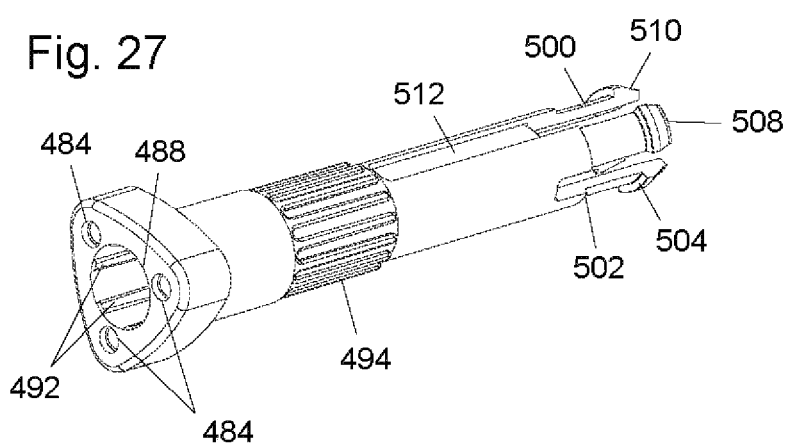
FIG. 27 shows a tilt mechanism shaft.
Figure 28:
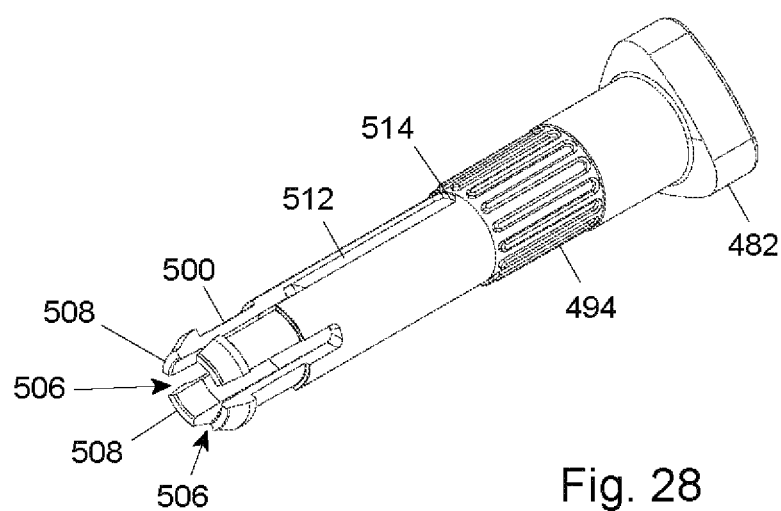
FIG. 28 shows another view of a tilt mechanism shaft.
Figure 32:
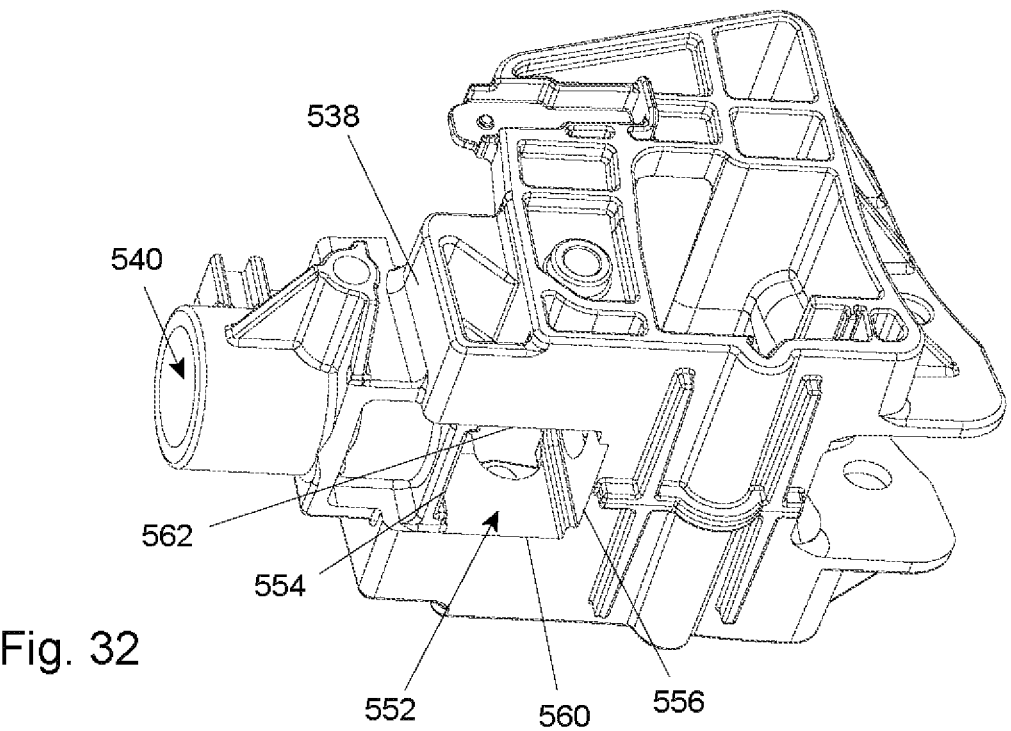
FIG. 32 shows an isometric view of the bevel housing of FIG. 29.
Figure 33:
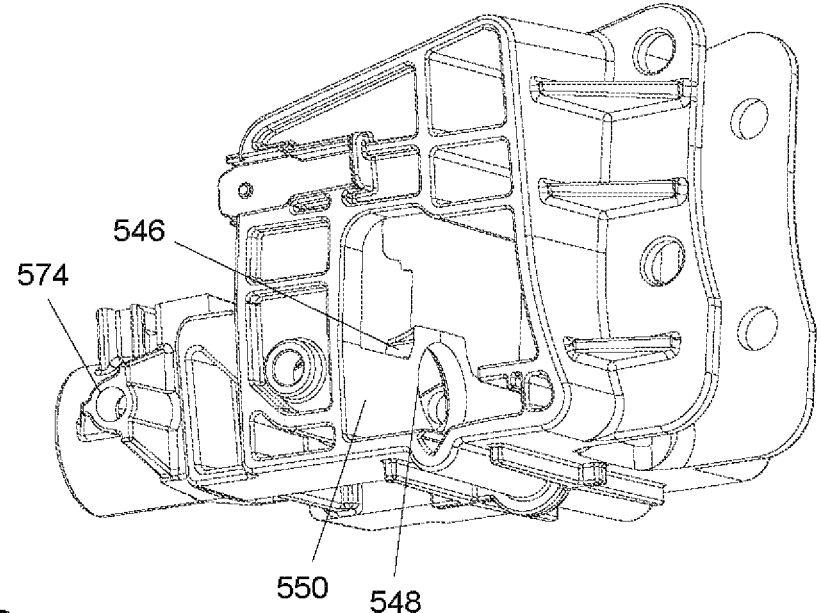
FIG. 33 shows another isometric view of a bevel housing.

The trunnion brackets are each connected to support structure 14 by two bolts 318, as shown in FIGS. 8, 16, and 17. Each bolt 318 passes through a washer 320, a hole 94 in the front or rear panel, and then threads into a hole 300 in a trunnion bracket, as can perhaps be most clearly seen in the exploded view of FIG. 8. Holes 94 are oversized so that when the bolts are loosened, some adjustment can be made in the position of the trunnion and blade with regard to the support structure and table. In this implementation, table 12 is attached directly to support structure 14, and the support structure is secured to the internal mechanism of the saw, but the table could be secured directly to the internal mechanism of the saw or to some other support instead of the support structure.

FIG. 17 shows a cross-sectional view of the connection between rear trunnion bracket 224 and rear panel 58. It can be seen that an adjustment bolt 340 (labeled in FIGS. 5 and 8) extends between support structure 14 and rear trunnion bracket 224, so a narrow section 342 extends through hole 302 in the bracket, a flanged section 344 extends between raised section 304 of the bracket and the upper surface of rear panel 58, and a wider section 346 extends through hole 96 in the rear panel (labeled in FIG. 2). Adjustment bolt 340 is eccentric, with the centers of sections 342 and 346 offset from one another. To adjust the position of bracket 224 relative to support structure 14 (and thus table 12), a user would loosen bolts 318, insert a hex wrench into section 346 of bolt 340, turn the eccentric bolt to the necessary position, and retighten bolts 318.

In an alternate embodiment, adjustment bold 340 may be replaced with a cylindrical pin, which would be press-fit into a boss 126 at the front and/or back of the table. Examples of optional bosses 126 are labeled in FIG. 7.

Table saw 10 also includes an elevation mechanism to raise or lower the blade to cut workpieces of varying thicknesses, as will be discussed later. The elevation mechanism includes a handwheel 30 and a user turns the handwheel to raise and lower the blade.

Table saw 10 further includes a tilt mechanism 400 to adjust the angle or tilt of the blade relative to the table in order to make beveled or angled cuts. FIGS. 8-56 show different views of saw 10 with various components removed to more clearly show the tilt mechanism and various components of tilt mechanism 400 isolated.

Tilt mechanism 400 includes a rack 402 mounted in the saw to front panel 56 and secondary front panel 68. Rack 402 is shown isolated in FIGS. 18 and 19. The rear face of the bottom of the rack includes an arcuate or curved section having teeth 404 with gullets 406 between the teeth. Rack 402 may be made from hard plastic or any other suitable material. The rack includes two arcuate, somewhat horizontally oriented openings 408 and an elongate, somewhat vertically oriented opening 412. Each hole 408 includes a lip or extended edge 410 around its periphery at the front face of the rack (i.e. the face which contacts the support structure, which is the side facing forward in FIG. 19). Hole 412 includes a lip or extended edge 414 around its periphery at the rear face of the rack (i.e. the side facing forward in FIG. 18). The rack is connected to support structure 14 by a pair of screws 428 (labeled in FIGS. 5, 23, and 24), which pass through holes in secondary front plate 68, holes 430 in front plate 56 (labeled in FIG. 2), and thread into a pair of sliding nuts 432 (shown isolated in FIG. 22). The sliding nuts are shaped to fit and slide within holes 408, so edges 410 are trapped between nuts 408 and screws 428 to secure the rack to the support structure. An eccentric bushing 434 (shown isolated in FIGS. 20 and 21) fits within elongate hole 412 near the center of rack 402. The lip 414 around the rear edge of hole 412 presses against a rear face 436 on the eccentric bushing, thus holding the bushing in place against support structure 50. Bushing 408 includes a projection 438, which extends through hole 448 in the support structure. The position of the rack relative to the support structure can be adjusted by loosening screws 428 in nuts 432, turning eccentric bushing 434, and retightening the screws. Since projection 438 is held in a fixed position relative to the support structure, rotation of the bushing will push the rack to one side or the other. This allows a user to adjust the tilt limit stops formed by the tab 416 and 418 at either end of the rack. Tabs 416 and 418 limit the travel of tilt mechanism 400 because the tilt mechanism contacts the tabs at the limits of its travel.

Tilt mechanism 400 further includes an engagement mechanism 460 positioned behind handwheel 30 and mounted to trunnion 150. The engagement mechanism is configured to retractably engage rack 402.

The engagement mechanism includes a user engageable mechanism in the form of a grip plate 464, which is connected to a shaft 480. The grip plate and shaft are shown isolated in FIGS. 25-28. In the presently depicted embodiment, the tilt mechanism may be thought of as being concentric with the elevation mechanism. Grip plate 464 in the tilt mechanism is configured to fit around elevation handwheel 30, and an elevation control shaft 868 passes through shaft 480 and a housing 520 in the tilt mechanism. However, it will be appreciated that the tilt and elevation mechanisms could be positioned separately on the saw. Positioning the tilt and elevation mechanisms concentrically is aesthetically pleasing and is convenient for a user, since both the elevation and tilt of the blade can be adjusted without a user having to significantly reposition their hand. Grip plate 464 may be generally circular and may include bumps 466 to increase friction with a user's hand, but may alternatively have a textured surface, a smooth surface, or some other surface. The grip plate also includes a depression or recessed area 468, shaped to accommodate elevation handwheel 30.

The front end of shaft 480 includes a keyed section 482, which is configured to fit within a corresponding section 470 of grip plate 464. Bolts or screws thread through holes 472 in the grip plate and holes 484 in the shaft to non-rotatably connect the shaft and grip plate. Elevation control shaft 868 passes through a through-hole 474 in grip plate 464 and a through-hole 488 extending along the length of shaft 480. A bushing 490 (labeled in FIG. 51) is disposed at or near the front of hole 488, to decrease friction between elevation shaft 868 and bevel shaft 480. It can be seen in at least FIG. 27 that hole 488 may include splines 492 or some other textured surface to more securely hold bushing 490 within the opening. A splined section 494 is positioned partway along shaft 480. An annular groove or cutout 500 is positioned at the rear of the shaft. The cutout defines a front shoulder surface 502 and a rear shoulder surface 504. A plurality of spaced-apart cutouts 506 extend partway from the rear toward the front of the shaft, leaving a plurality of spaced-apart spring fingers 508 at the rear end of shaft 480. An optional ramp surface 510 may be formed on the ends of the fingers to facilitate assembly of the tilt mechanism. One or more grooves 512 are disposed along shaft 480, generally parallel to its long axis. In the presently depicted embodiment, shaft 480 includes two grooves 512, which align with two diametrically opposed cutouts 506. However, it will be appreciated that other numbers or positions of grooves 512 could also be used. If a groove 512 does not align with a cutout 506, the groove must extend to the end of the shaft, as will become apparent.

Tilt mechanism 400 further includes housing or support bracket 520 positioned behind the handwheel and mounted to trunnion 150. Housing 520 is shown isolated in FIGS. 29-33, and FIG. 31 shows a cross-section of the housing along the line A-A in FIG. 30. The housing includes a somewhat box-like section 522, a somewhat cylindrical section 524, and two wing sections 526, which are configured to extend partway around trunnion 150. Sections 526 may be reinforced with ribs, such as ribs 528. A pair of bolts 532 extend through a pair of holes 530 in each section 526 and holes 170 in the trunnion (labeled in FIG. 10) to connect the housing to the trunnion, and the bolts may be secured with nuts or by some other method. This can perhaps be seen most clearly in FIGS. 23 and 24. A surface 534, which may be thought of as the rear wall of housing 520, includes a somewhat U-shaped cutout 536, which aligns with hole 172 (labeled in FIG. 10) in the trunnion, thus providing clearance for at least elevation control shaft 868. Generally cylindrical section 524 extends from what may be thought of as a front wall 538 of the housing, and section 524 may be thought of as the primary support structure for tilt mechanism shaft 480. It can be seen in at least FIG. 32 that the front wall only extends partway up relative to the rest of the housing. Generally cylindrical section 524 includes a through hole 540, which is shaped to fit closely around shaft 480. Splines 542 extend from the rear edge of hole 540 partway toward the front of the hole, and they are configured to selectively engage splined section 494 of the tilt mechanism shaft, as will be discussed later. The rear face of section 524 forms what may be thought of as a wall or contact surface 544. A secondary wall 546, which extends up to approximately the same height as cylindrical section 524, is positioned behind, but spaced apart from, the cylindrical section. Secondary wall 546 includes a circular hole 548, which is sized to fit closely around shaft 480, and which may be thought of as a secondary shaft support surface. A somewhat square opening or cutout 552 is disposed between cylindrical section 524 and secondary wall 546, in what may be thought of as the bottom of housing 520. Opening 552 includes a front shoulder surface 554 in wall 544 and a rear shoulder surface 556 in secondary wall 546. Each shoulder surface is shaped somewhat like an upside-down U, and the top of each "U" forms a limit surface 558. A left side wall 560 and right side wall 562 define the sides of opening 552.

Figure 34:
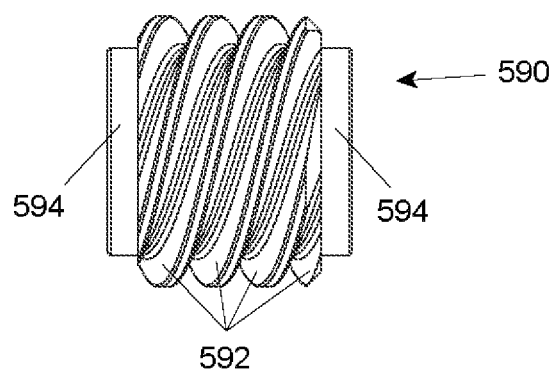
FIG. 34 shows a worm gear.
Figure 35:
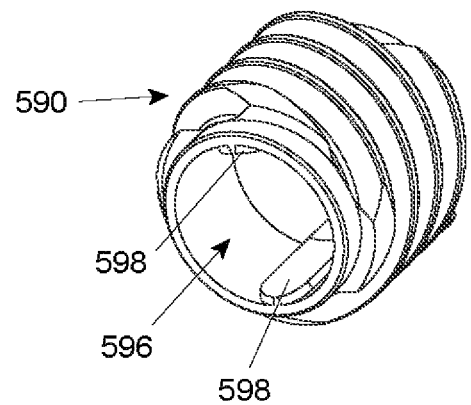
FIG. 35 shows another view of a worm gear.

A worm gear 590, shown isolated in FIGS. 34 and 35, is shaped to fit around shaft 480 and within opening 552. The worm gear includes threads or teeth 592, non-threaded shoulders 594, and a through-hole 596 sized to fit around shaft 480. A plurality of splines 598 extend within through-hole 596, and the splines are shaped to fit snugly within grooves 512 in shaft 480. When tilt mechanism 400 is assembled, worm gear 590 is inserted up into hole 552 in the housing, and shaft 480 is then inserted through hole 540 in cylindrical section 524, worm gear 590, and hole 548 in the secondary wall. Worm gear 590 fits closely within hole 548, with shoulders 594 on the worm gear close to or touching shoulders 554 and 556 in the hole. Splines 598 in the worm gear are configured to slide within grooves 512 in the shaft, so shaft 480 can move forward and backward relative to the worm gear without the worm gear moving, but rotation of shaft 480 will cause worm gear 590 to rotate. It will be appreciated that other methods of connecting shaft 480 and worm gear 590 are also possible, as long as the shaft is allowed to move forward and backward relative to the gear, but not rotate relative to the gear.

Figure 36:
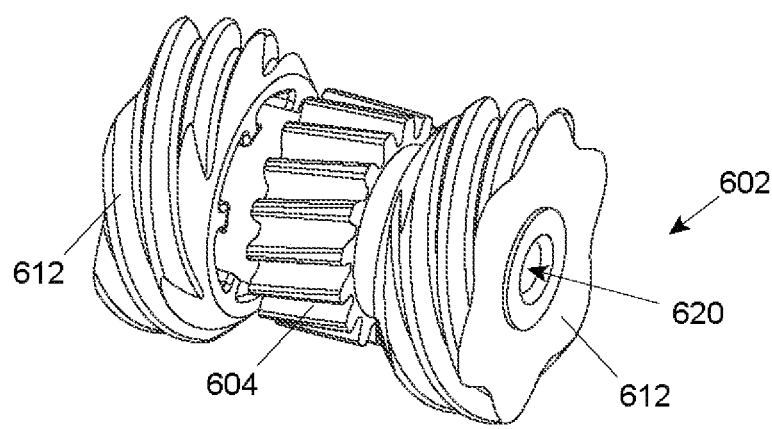
FIG. 36 shows a transfer gear.
Figure 37:
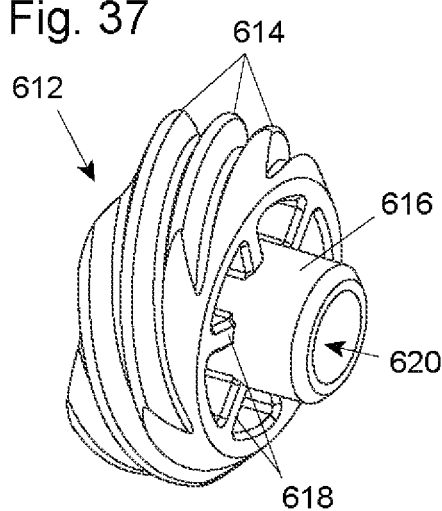
FIG. 37 shows part of the transfer gear of FIG. 36.
Figure 38:
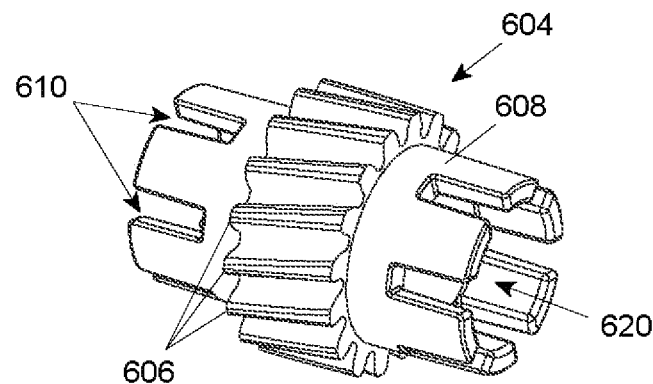
FIG. 38 shows another part of the transfer gear of FIG. 36.

Tilt mechanism 400 further includes a transfer gear 602 supported within housing 520. When the tilt mechanism is in what may be thought of as a first, or neutral position, worm gear 590 meshes with a transfer gear 602, so rotation of worm gear 590 causes transfer gear 602 to rotate. The transfer gear is shown isolated in FIG. 36, and FIGS. 37 and 38 show portions of transfer gear 602 isolated. The transfer gear includes a first or sector gear section 604 with teeth 606, which mesh with worm gear 590 and one or more second or worm gear sections 612, with worm teeth 614 which are perpendicular relative to the teeth 606 on section 604, and which mesh with the teeth rack 402. Cylindrical projections 608 extend from one or both sides of teeth 606, and the projections include a plurality of cutouts 610, which are shaped to fit over a plurality of splines 618 in second sections 612, as can be seen in FIGS. 36 and 37. Each worm gear section includes a cylindrical projection 616, which fits into a wider portion of a hole 620 in sections 608 of sector gear section 604. This configuration prevents the worm gear and sector gear sections of transfer gear 602 from rotating relative to one another. Of course, the gear could also be formed as a single piece. Sections 604 and 612 each include a through-hole 620, which is used to mount the gear for rotation relative to housing 520, as will be discussed below.

Figure 39:
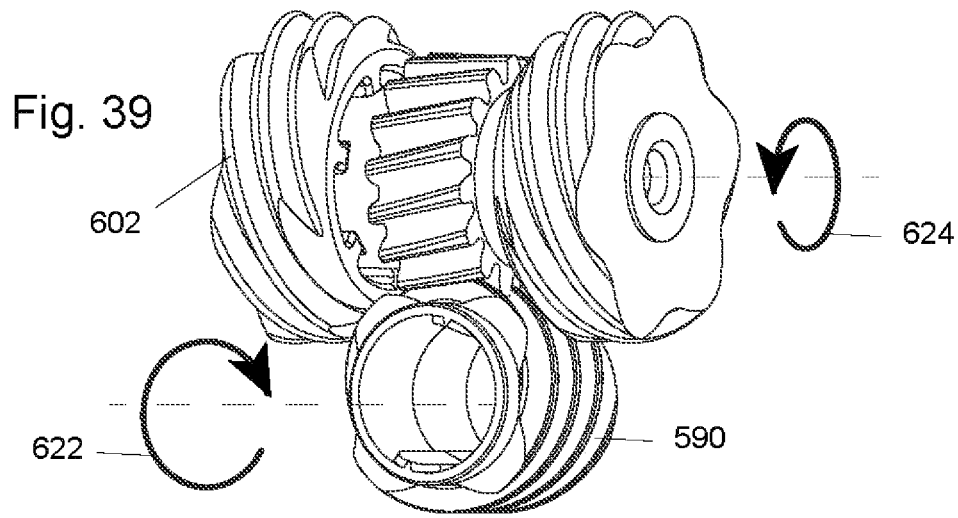
FIG. 39 shows the interaction between a worm gear and transfer gear.

When a person turns grip plate 464 and shaft 480, worm gear 590 causes first section 604 to turn, which rotates second sections 612 and causes them to crawl along rack 402, thus tilting the trunnion and blade. In the present embodiment, sections 604 and 612 are formed separately, but it will be appreciated that the transfer gear could also be a single, unitary piece. FIG. 39 shows the interaction between worm gear 590 and transfer gear 602, with an arrow 622 showing the direction of rotation of worm gear 590 and an arrow 624 showing the corresponding direction of rotation of transfer gear 602. It will be appreciated, of course, that reversing the direction of rotation of worm gear 590 (and arrow 622) will also reverse transfer gear 602 (and arrow 624). In FIG. 39, gears 590 and 602 are shown from the front, and worm gear 590 is being rotated in a clockwise direction, which may also be thought of as being rotated "to the right." This causes transfer gear 602 to rotate "forward" or toward the front of the saw, and will cause the transfer gear to move to the right along rack 402 (relative to a user facing the front of the saw). This provides an intuitive movement for a user to control the tilt of the blade, since rotating the grip plate to the right (clockwise) will cause the bevel mechanism to crawl to the right along the rack, and rotating the grip plate to the left (counter-clockwise) will cause the bevel mechanism to crawl to the left along the rack. Thus, a user would rotate the grip plate in the desired bevel direction, which is a simple and intuitive movement.

Figure 40:
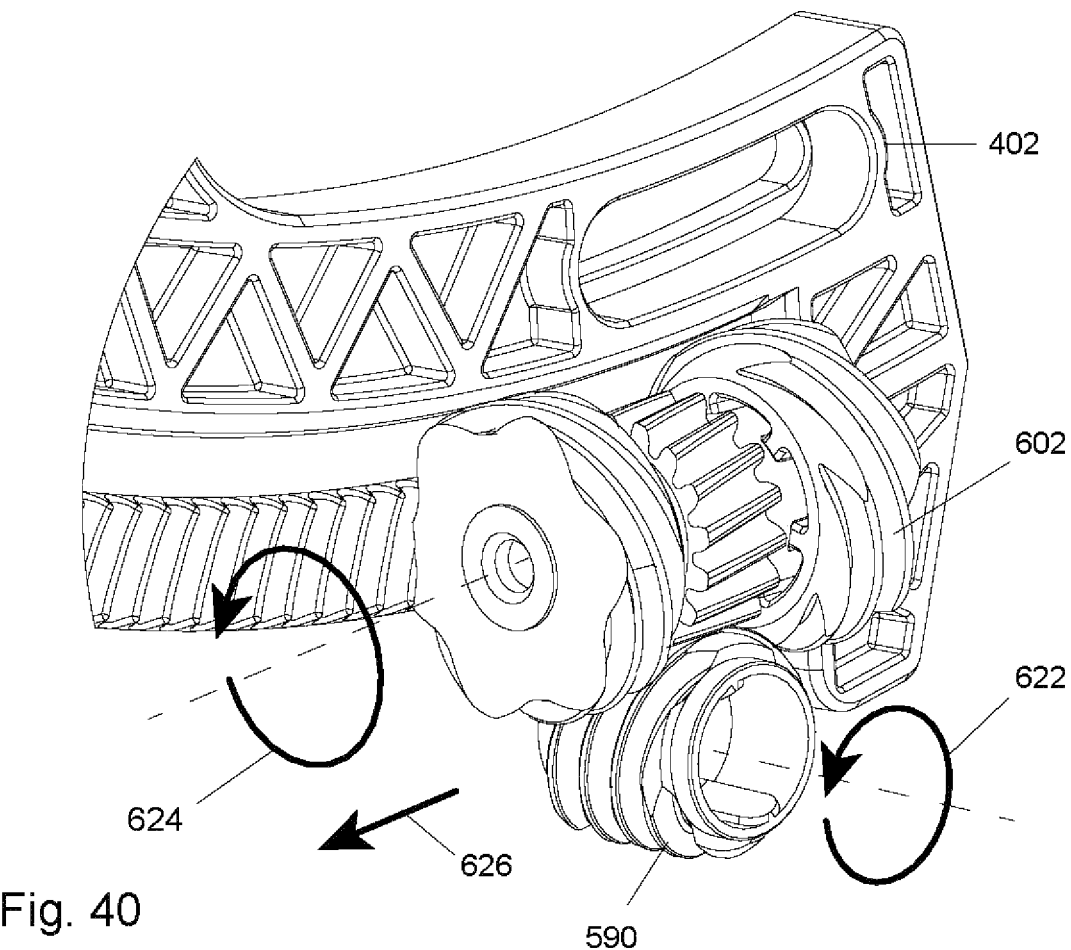
FIG. 40 shows a rack, worm gear, and transfer gear.
Figure 41:
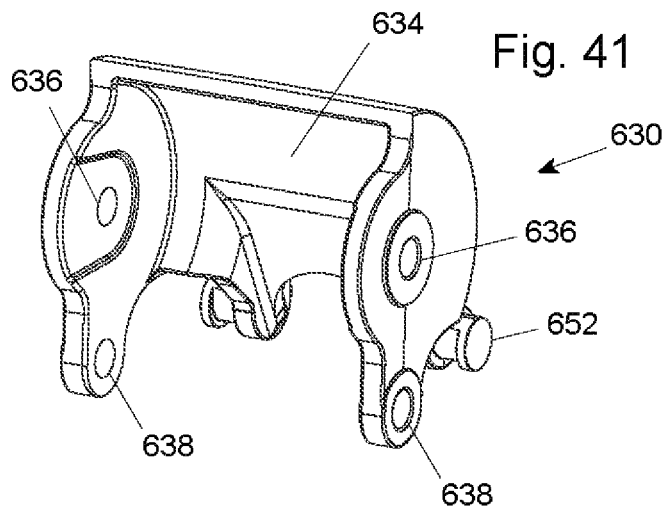
FIG. 41 shows a gear carrier.
Figure 42:
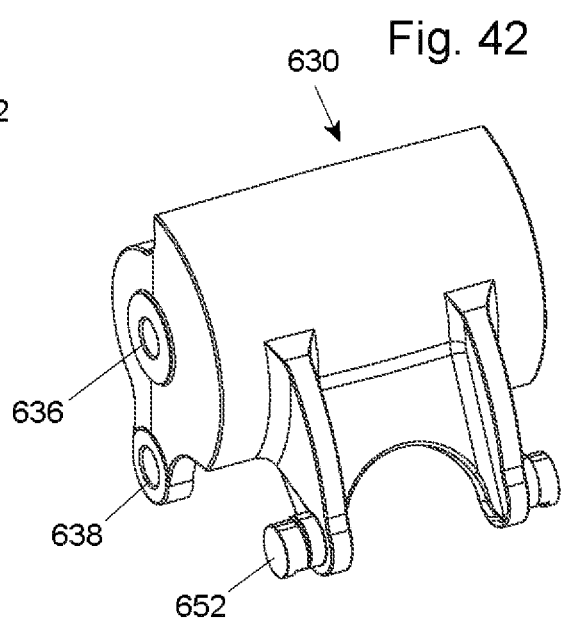
FIG. 42 shows another view of a gear carrier.
Figure 43:
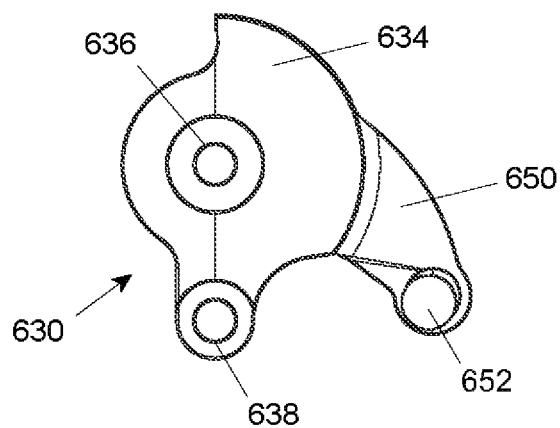
FIG. 43 shows a side view of a gear carrier.
Figure 44:
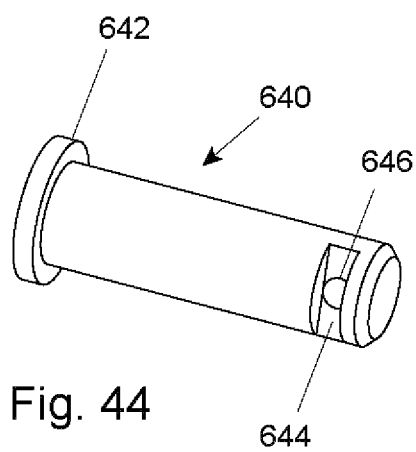
FIG. 44 shows a pin for a gear carrier.

FIG. 40 shows rack 402, transfer gear 602, and worm gear 590, with arrow 622 again showing the direction of rotation of worm gear 590, arrow 624 again showing the corresponding direction of rotation of transfer gear 602, and an arrow 626 showing the resulting lateral motion of transfer gear 602 relative to rack 402. In FIG. 40, the gears and rack are viewed from the back. Of course, rotating worm gear 590 in the opposite direction will also cause arrows 622, 624, and 626 to reverse.

In the present embodiment, many rotations or turns of grip plate 464 are required to move the trunnion and blade from a fully vertical to a fully beveled position. This allows a user to precisely adjust the tilt of the blade to any desired position, but it may be inconvenient when making large adjustments. Thus, it is advantageous to provide a method of disengaging transfer gear 602 from rack 402, so a user can manually tilt the blade to a desired angle or position by simply moving grip plate 464 to the right or left without having to rotate it. Transfer gear 602 is mounted for rotation in housing 520, which also supports shaft 480 and worm gear 590. A selectively engageable gear carrier 630 supports transfer gear 602 within the housing via a transfer gear shaft 632 (labeled in FIG. 49), which passes through hole 620 in the gear and a pair of holes 636 in the carrier. Carrier 630 is shown isolated in FIGS. 41-43. It includes an optional semicircular section 634, which is configured to extend partway around transfer gear 602, a pair of holes 636 for shaft 632, and a pair of holes 638 which are used to pivotally connect carrier 630 to housing 520 by a pair of pins 640. A pin 640 is shown isolated in FIG. 44. It includes a head 642, a notch or recess 644, and a hole 646. Each pin is inserted through a hole 638 in the carrier, then through a hole 570 in housing 520. When the end of a spring 648 is inserted through hole 646 (as can be seen in at least FIG. 52), the carrier and housing are sandwiched between the heads of the pins and the ends of the springs. Alternatively, the end of spring 648 may be wrapped around notch 644 in the pin. Thus, carrier 630 is allowed to rotate relative to housing 520, but it is restricted from other movement. Alternatively, e-clips or retaining rings could be used to secure pins 640, and springs 648 could be attached to the pins using other methods.

Figure 45:
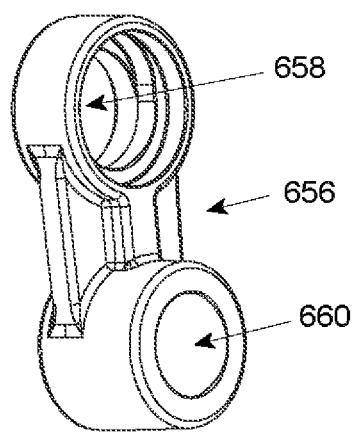
FIG. 45 shows a link member isolated.
Figure 46:
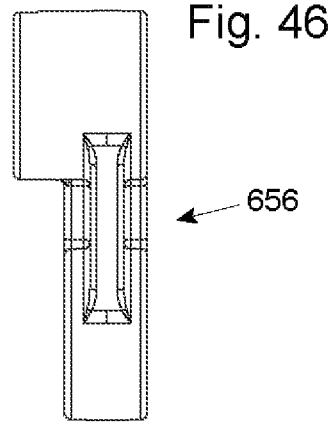
FIG. 46 shows a side view of the link member of FIG. 45.

A pair of arms 650 extend back from the main body of the carrier, and each arm includes a pin 652, which may be, but does not have to be, integrally formed with the carrier. A somewhat U-shaped space is defined by arms 650. Pins 652 are used to pivotally connect carrier 630 to a pair of link members 656, which, in turn, are pivotally connected to a carriage 664. FIGS. 45 and 46 show a link member 656 isolated. Each link member includes a narrow section with a hole 658 and a wider section with a hole 660. The hole 658 in each link member is shaped to fit around pin 652 in gear carrier 630. Pins 652 and holes 658 are shaped so the link member can be placed around pin 652 with the link member held above its final, assembled position, and then the link member can be rotated down to the position shown in at least FIG. 52. Alternatively, an e-clip could be secured to the end of pin 652, but the present embodiment decreases manufacturing cost by decreasing the number of parts and simplifying the assembly process. Hole 660 in each link member is shaped to fit around a cylindrical projection or pin 666 on either side of a guide or carriage 664, which is shown isolated in FIGS. 47 and 48.

Figure 49:
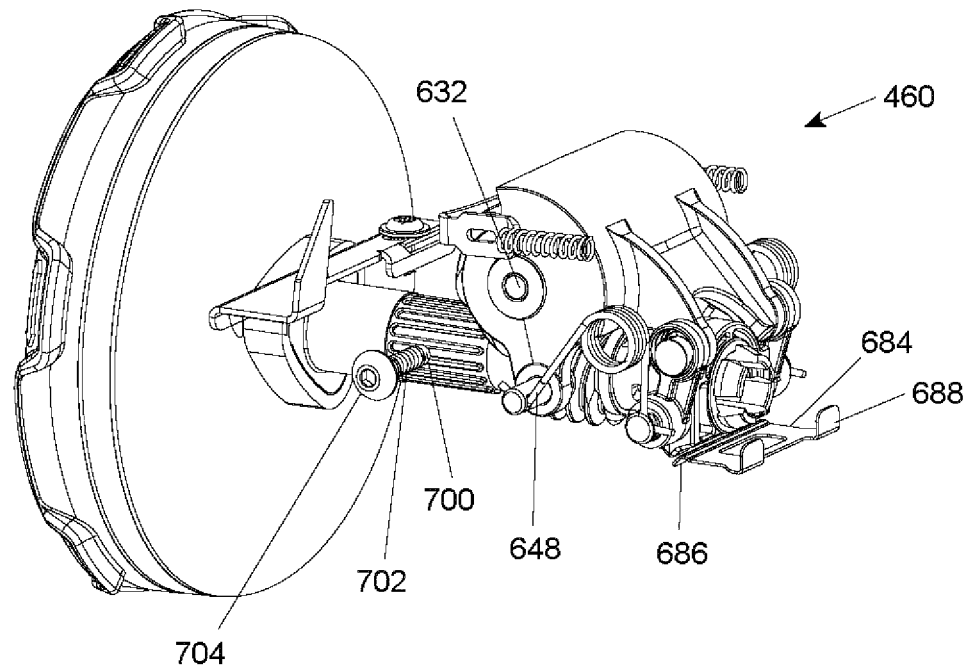
FIG. 49 shows a bevel mechanism with some components removed.
Figure 50:
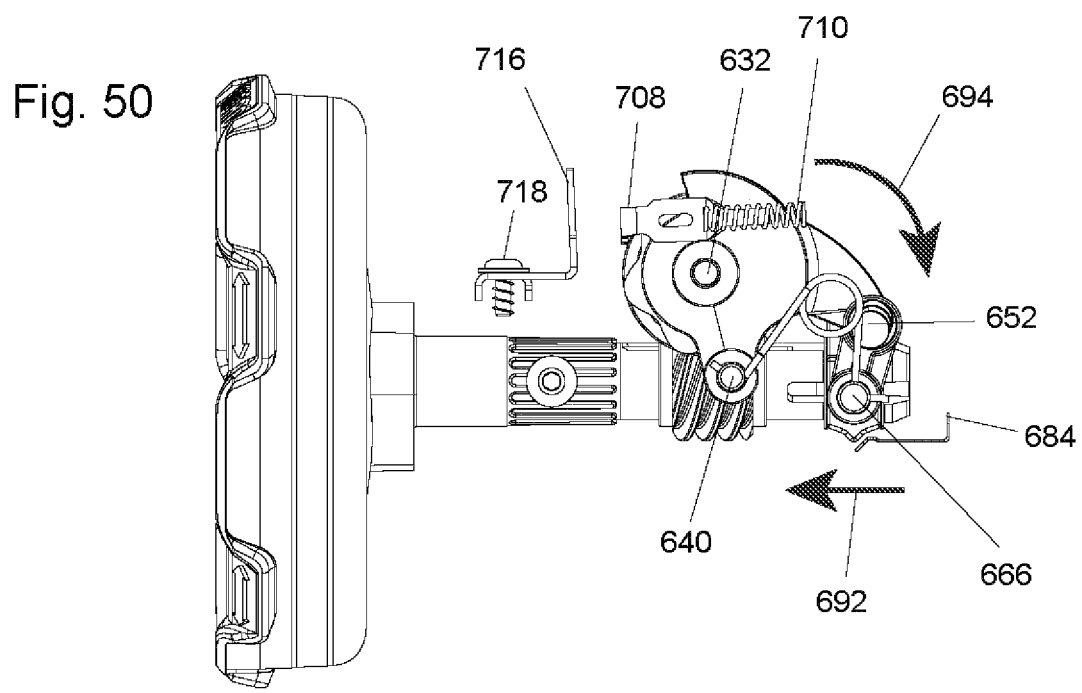
FIG. 50 shows a side view of a bevel mechanism with some components removed.

Carriage 664 also includes a hole 670, which is shaped to fit around shaft 480. In the present embodiment, carriage 664 fits around section 500 of the shaft labeled in FIG. 27), forming a snap-fit connection, since arms 508 will bend or flex slightly and then snap back into place, trapping carriage 664 between shoulders 502 and 504, with a pair of washer 672 and 674 disposed between the front and rear shoulders, respectively, and the carriage. Washers 672 and 674 are labeled in FIGS. 52 and 56, respectively. In this manner, shaft 480 is allowed to rotate relative to carriage 664, but not move forward or backward relative to the carriage. As stated above, a pair of torsion springs 648 extend between a fixed position relative to housing 520 (pins 640) and carriage 664 (which can more forward and backward relative to the housing). The springs bias the carriage, and thus shaft 480, backward (toward trunnion 150). FIGS. 49 and 50 show bevel mechanism 400 with housing 520 removed and FIGS. 51-56 show various side and cross-sectional views of the bevel mechanism.

Figure 47:
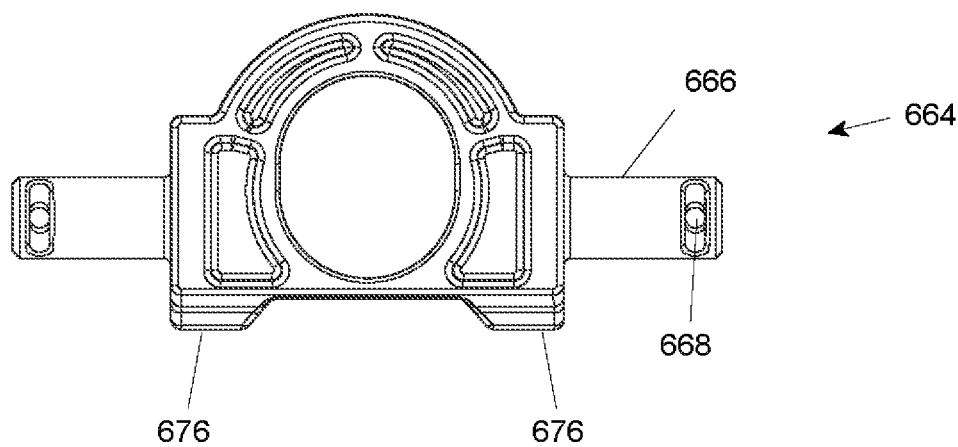
FIG. 47 shows a carriage isolated.
Figure 48:
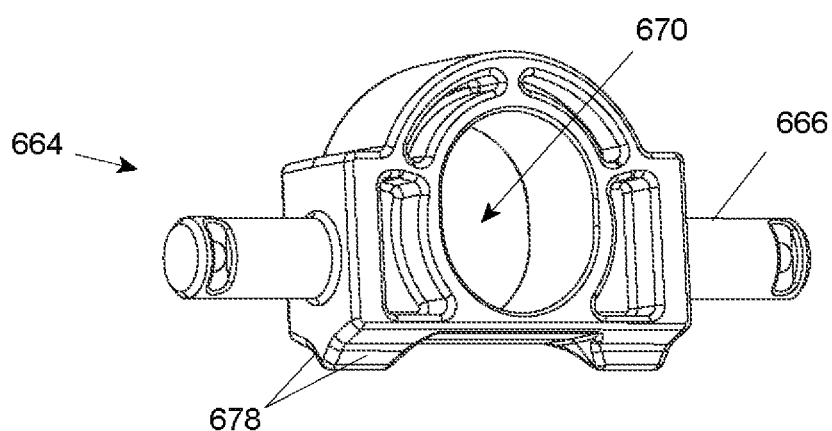
FIG. 48 shows another view of a carriage.

It can be seen in at least FIG. 47 that the base of carriage 664 includes two legs 676, which are somewhat triangular in shape and include ramp surfaces 678. The ramp surfaces are configured to ride across a detent leaf spring 684. The spring includes a face or ramp 686, which fits partially into a cutout 580 in the base of housing 520. The back end of the spring includes tabs 688 which fit into a cutout 582 in the rear wall of the housing. The detent spring helps to bias the tilt mechanism toward either the neutral position or a locked position, because it helps to form an over-center lock, as will be explained.

This arrangement enables tilt mechanism 400 to be securely held in a neutral, or first position (shown in at least FIGS. 53 and 54) when the grip plate is in a neutral or first position. In this position, transfer gear 602 operatively engages rack 402, and worm gear 590 operatively engages transfer gear 602. Furthermore, in this neutral configuration, pins 652 in the gear carrier (holes 658 in link members 656) are slightly further forward than pins 666 in the carriage (holes 660 in the link members), while shaft 632 (shown in dotted lines in FIG. 54) in carrier 630 is slightly further forward than pins 640 at the base of the carrier. Thus, transfer gear 602, which is mounted on shaft 632, is pushed up against (or biased towards engagement with) rack 402, because the force of springs 648 pushing pins 666 in the carriage away from pins 640 at the base of the carrier, which will tend to push pins 652 up, which, in turn, will push shaft 632 forward along an arcuate path centered around pins 640.

Figure 53:
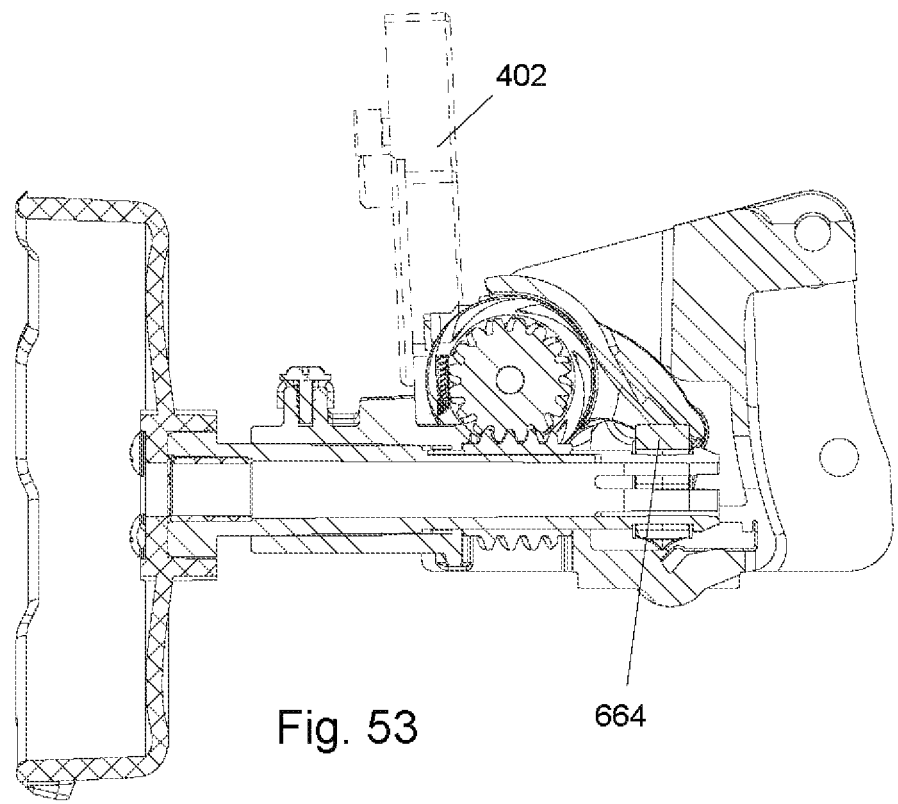
FIG. 53 shows a cross section of a bevel mechanism.
Figure 54:
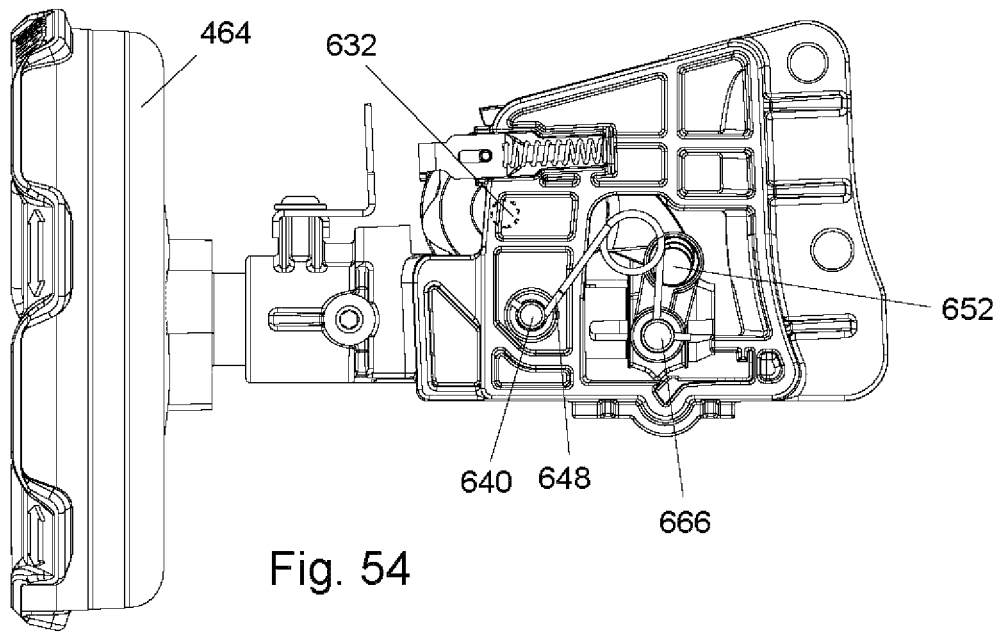
FIG. 54 shows a bevel mechanism.

In other words, in the neutral position shown in FIGS. 53 and 54, transfer gear 602 is biased toward engagement with rack 402, since, as springs 648 try to expand, they push carriage 664 back, which pushes the bottom of the link members 656 back. In this neutral position, rotation of grip plate 464 in a clockwise direction (from the perspective of a user of the saw) would cause the tilt mechanism to crawl to the right along rack 402, thus beveling the blade to the left, and counterclockwise rotation or the grip plate would cause the tilt mechanism to crawl to the left along the rack, thus beveling the blade to the right (closer to vertical).

As stated, two torsion springs 648 extend between pins 640 in housing 520 and carrier pins 666, and the springs biases shaft 480 (and thus grip plate 464) backward (toward the saw), which biases the transfer gear forward (into contact with rack 402). This may be thought of as a micro-adjust position, since the tilt mechanism is configured to easily provide small, accurate adjustments in position. This position is shown in FIGS. 53 and 54, with FIG. 53 showing a cross section of FIG. 54, about halfway across the tilt mechanism. FIG. 53 includes tilt rack 402 shown in dashed lines, in order to clearly show the interaction between the worm gear, transfer gear, and rack. It can be seen that the ramp surfaces on carriage 664 rest against the ramp surface on the detent spring, and this interaction helps to bias the tilt mechanism to be stable in the neutral position.

Figure 51:
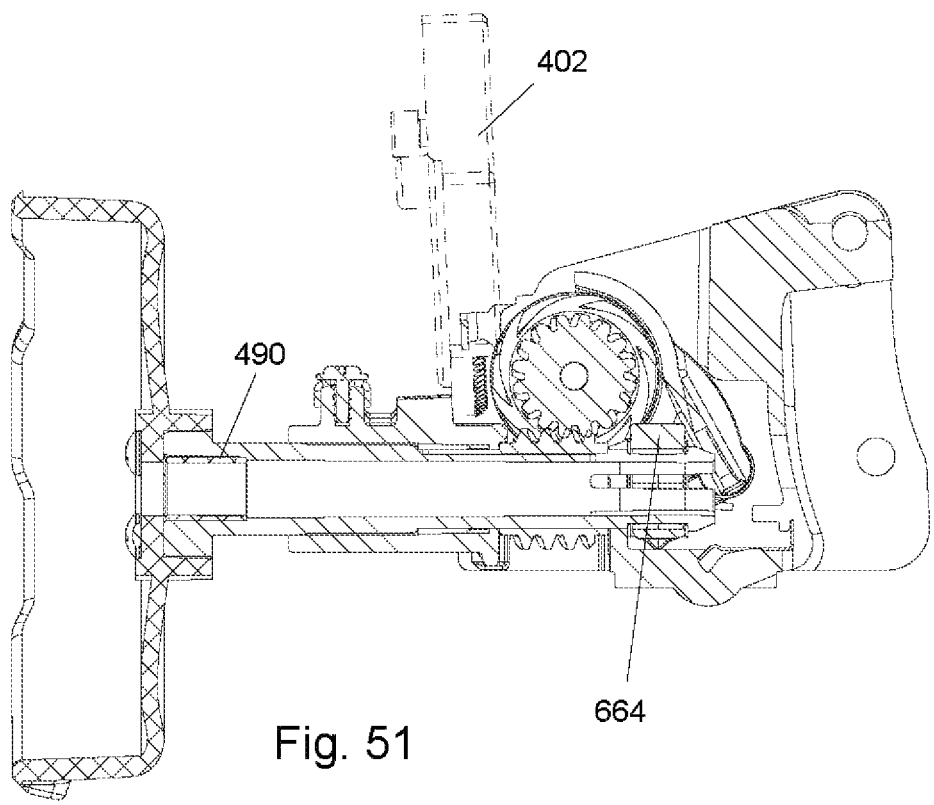
FIG. 51 shows a cross section of a bevel mechanism.
Figure 52:
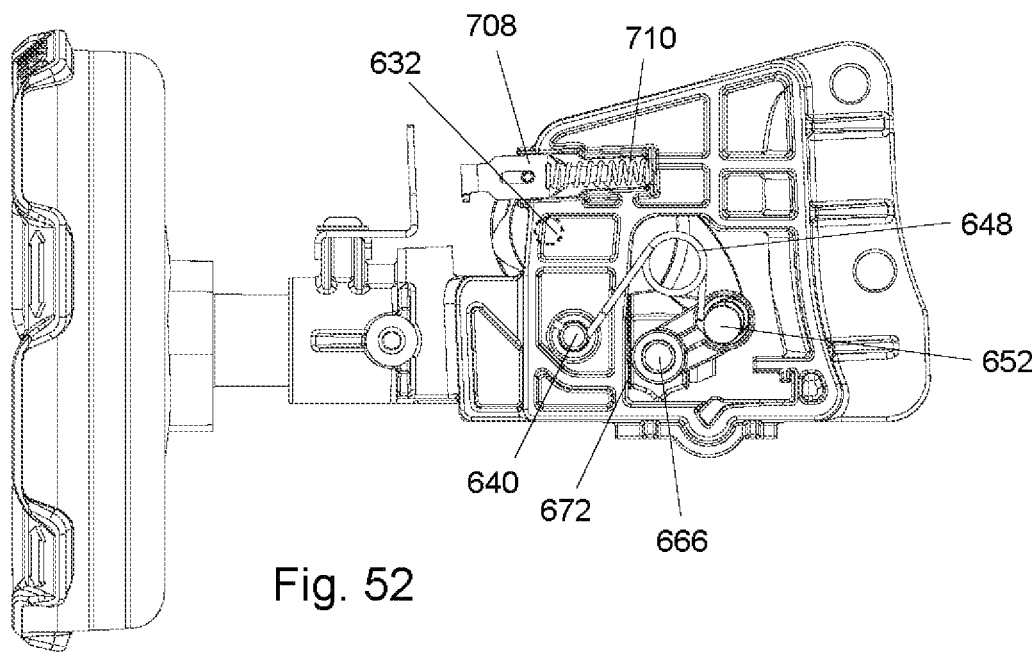
FIG. 52 shows a bevel mechanism.

However, as stated, it could be cumbersome to simply rotate grip plate 464 to move the tilt mechanism along its full range of motion. Thus, tilt mechanism 400 is configured so a user can disengage the transfer gear, move the blade to the desired tilt, and re-engage the transfer gear automatically, without a user having to do anything other than let go of the grip plate. This disengaged position may be thought of as a macro-adjust position, since the tilt mechanism is configured to provide large adjustments. The macro-adjust position is shown in FIGS. 51 and 52, with FIG. 51 showing a cross section and including a dashed-line rack 402.

To disengage transfer gear 602 from rack 402, a user would pull grip plate 464 forward. FIG. 50 shows tilt mechanism 400 with housing 520 removed, and it includes an arrow 692 showing the movement of carriage 664 and an arrow 694 showing the corresponding motion of gear carrier 630 (and gear 602). One advantage of placing elevation handwheel 30 concentrically within the grip plate, is that the elevation handwheel provides a surface against which a user could brace their hand when pulling the grip plate forward. Of course, pulling grip plate 464 forward (away from the rest of saw 10), will pull shaft 480 forward as well. Since carriage 664 cannot move forward or backward relative to shaft 480, the carriage (and its integrally formed pins 666) is pulled forward relative to trunnion 150. This, in turn, pulls the bottom ends of the link members forward, thus pulling the top ends of the link members arcuately down around an axis centered on pins 666. This pulls pins 652 on gear carrier 630 arcuately down around an axis centered on pins 640 (which connect the gear carrier to housing 520). Since transfer gear 602 is supported in carrier 630 by shaft 632 (labeled in dotted lines in FIGS. 52, 54, and 56, since it is not otherwise visible behind housing 520), the transfer gear is pulled out of contact with the teeth on rack 402. In this position, a user could rotate the grip plate, thus rotating worm gear 590 and transfer gear 602, but the tilt mechanism would not move, since the teeth on the transfer gear would not be engaging the rack. When the grip plate is pulled forward, washer 672, in front of carriage 664, contacts rear face 550 of secondary wall 546 in housing 520, thus preventing further forward movement of the grip plate and providing a clear tactile indication to the user that the system is unlocked and may be beveled freely. Thus, a user would pull grip plate 464 forward to disengage transfer gear 602 from rack 402, move the grip plate to the left or right, and release the grip plate, allowing springs 648 to return the tilt mechanism to its normal position (shown in FIGS. 53 and 54), with the transfer gear and rack fully engaged. The tilt mechanism is not stable in the macro-adjust position; it will automatically re-engage and hold the trunnion and blade in the beveled position upon release of the grip plate by a user. Once the tilt of the blade has been adjusted, the interaction between transfer gear 602 and rack 402 prevents the system from backdriving or shifting unexpectedly.

Figure 55:
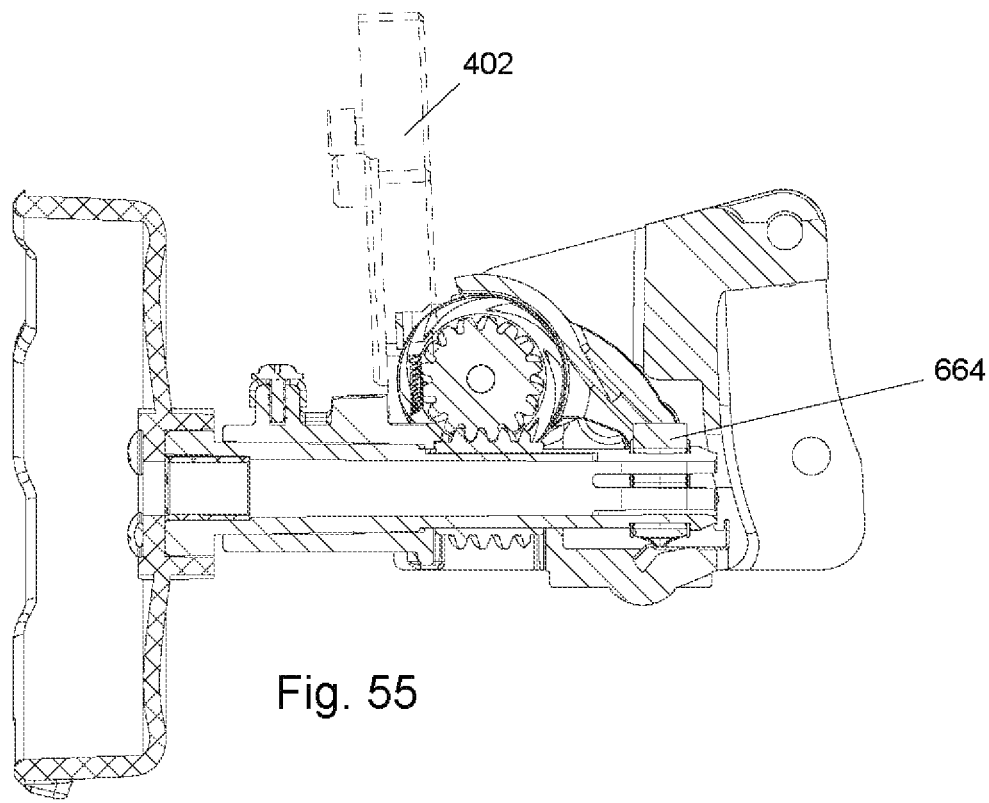
FIG. 55 shows a cross section of a bevel mechanism.
Figure 56:
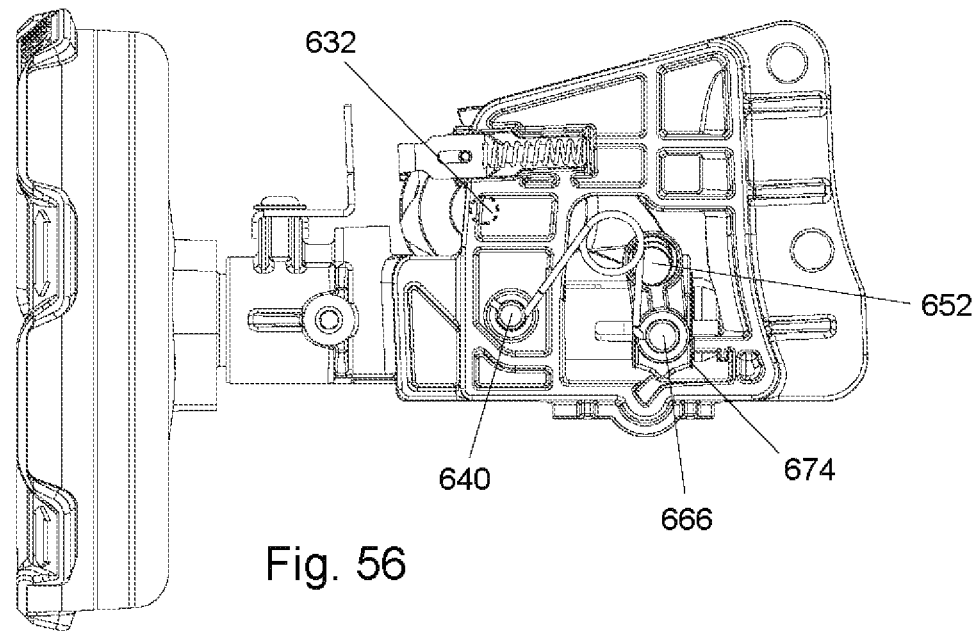
FIG. 56 shows a bevel mechanism.
Figure 57:
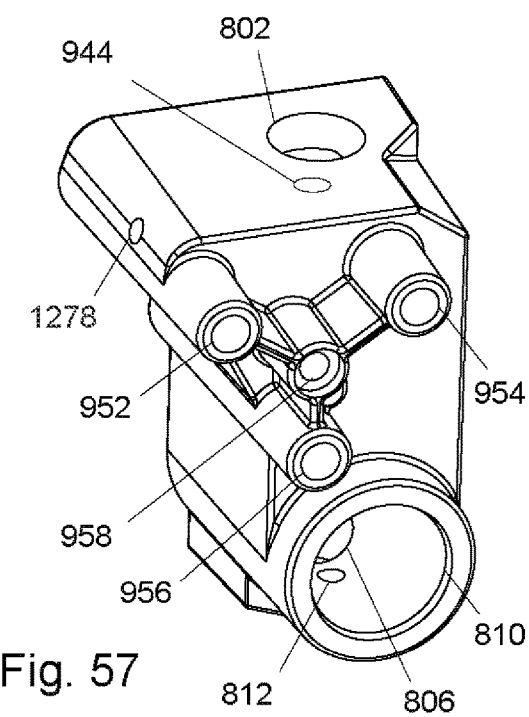
FIG. 57 shows an elevation carriage isolated.
Figure 58:
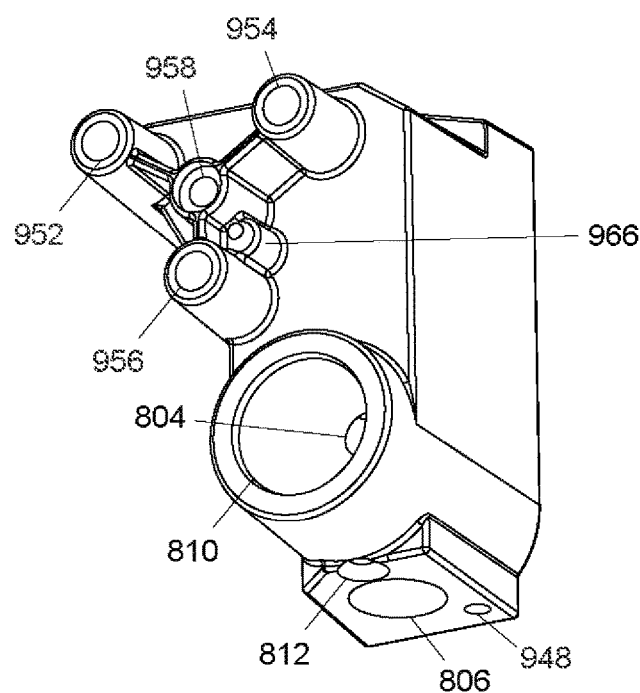
FIG. 58 shows another view of the elevation carriage of FIG. 57.

However, the position of the handwheel may also be locked so that it cannot be accidentally turned. This position may be thought of as the locked position, and it is shown in FIGS. 55 and 56, with FIG. 55 showing a cross section of the tilt mechanism, and rack 402 shown in dashed lines. The tilt mechanism may be locked in place by a user pushing the handwheel backward, toward the saw. The locking mechanism used to lock the tilt mechanism includes splined section 494 on shaft 480 and splines 542 in housing 520. When the user pushes the handwheel and shaft backward, splines in the shaft mesh with splines in the housing, thus preventing the handwheel and shaft from rotating relative to the housing (which prevents worm gear 590 from rotating, thus preventing gear 602 from moving). When the shaft moves backward, ramps 678 on carriage 664 pass up over the ramp 686 in leaf spring 684 and slide backward until washer 674 contacts surface 568 near the back of housing 520. In this position, pins 666 on carriage 664 are behind pins 652 in gear carrier 630. This over-center configuration, together with leaf spring 686, makes tilt mechanism 400 stable in both the locked and normal positions.

A ball detent mechanism may be included in tilt mechanism 400 to provide an audible indication of the change in tilt of the blade. As grip plate 464 and shaft 480 are rotated, the splines in section 494 in the shaft move across the ball detent, which creates a "click" sound. The spacing of the splines can be chosen to provide any desired increment indication, such as 0.1 degree or 0.5 degree changes in the tilt of the blade. The ball detent mechanism includes a detent ball 700, a spring 702 to bias the ball towards the splines, and a screw 704 to control the pressure on spring 702. These components are shown in FIG. 49 without housing 520, and they may be installed in hole 574 in the housing (labeled in FIGS. 29 and 31).

Tilt mechanism 400 may further include an optional biasing member 708, which fits in a pair of recesses 576 in housing 520 (one on each side of the housing) and is biased out toward rack 402 by a pair of springs 710, which fit in the recesses and around the ends of the biasing member. A small boss 578 in each recess 576 fits within an opening on each side of the biasing member and prevents the member from moving too far forward or backward. Biasing member 708 presses against the rear face of rack 402, which helps to bias rack 402 away from transfer gear 602 when the tilt mechanism is in the macro-adjust position.

In the presently disclosed embodiment, the configuration of worm gear 590 and transfer gear 602 provides a mechanical advantage of approximately 3:1. However, the gears may be configured to provide any desired mechanical advantage. The desired mechanical advantage is a balance of providing an easily adjustable system, but without requiring a user to turn the handwheel too many times to fully bevel the blade.

Thus, it is an advantage of the present invention that the tilt of the blade can be easily adjusted in large increments by pulling the transfer gear out of contact with the rack, and then adjusted precisely by rotating the handwheel to cause the transfer gear to crawl slowly along the rack. These adjustments may be thought of as macro and micro adjustments, respectively.

Saw 10 typically includes a label 714 or other markings on the front of the support structure a shown in FIG. 1. Label 714 includes angle demarcations to indicate the degree the blade is tilted relative to the table top. A tilt indicator 716 (perhaps best seen in FIGS. 49 and 50) consisting of a narrow strip of metal with two right-angle bends is secured by a bolt 718 to a hole 572 in housing 520, which tilts along with the trunnion. The other end of the tilt indicator is used to point to the angle demarcations on label 714. For instance, when the blade is tilted to 45 degrees relative to the table top, pointer 716 would point to the 45 degree mark on label 714.

Figure 71:
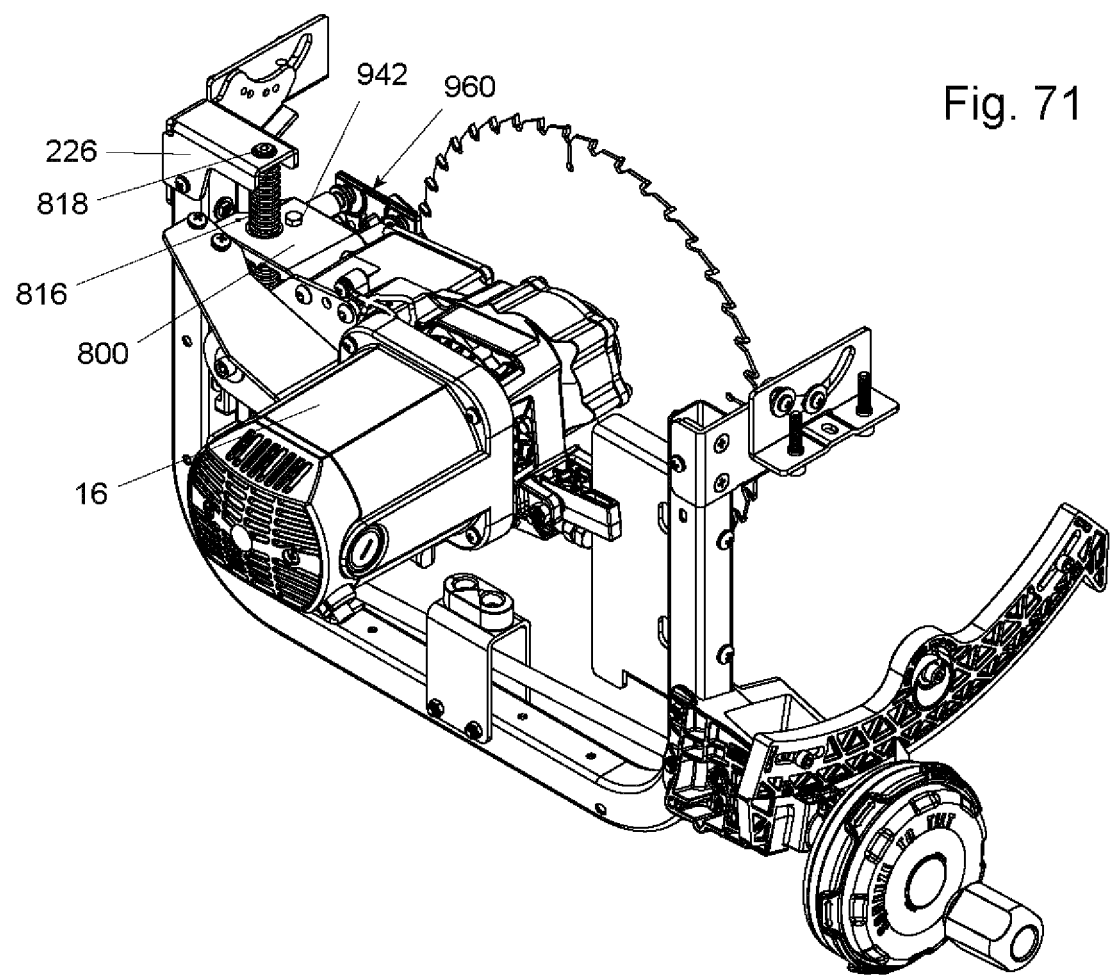
FIG. 71 shows an upper elevation limit stop.

Saw 10 also includes an elevation carriage 800 shown isolated in FIGS. 57-60. The elevation carriage is supported by the trunnion, as shown perhaps most clearly in FIGS. 71 and 85, and it tilts with the trunnion. The blade is supported by the elevation carriage, as will be described, so tilting the elevation carriage causes the blade to tilt. The elevation carriage is also configured to move up and down relative to the trunnion. Moving the elevation carriage up and down is what causes the blade to move up and down relative to table 12. The underside of the table (and table insert) may include recesses to allow the blade to rise to a predetermined height without the internal mechanism of the saw bumping into the underside of the table. The elevation carriage is somewhat rectangular in shape, and it includes a plurality of holes and other features, which will be discussed in detail below.

Elevation carriage 800 is supported in the saw by an elevation shaft 816 that is oriented vertically near the back of trunnion 150. The elevation carriage includes bosses 802, 804, and 806, situated at the top, middle, and bottom of the elevation carriage, respectively, as is perhaps shown best in FIG. 60. Shaft 816 passes through these bores to maintain the position of the elevation carriage. A bushing 808, which may be made from durable, low-friction plastic, or another material such as bronze, may be press-fit into bosses 802 and 806, and the bushings provide smooth surfaces so that the elevation carriage can travel up and down along the shaft.

Figure 61:
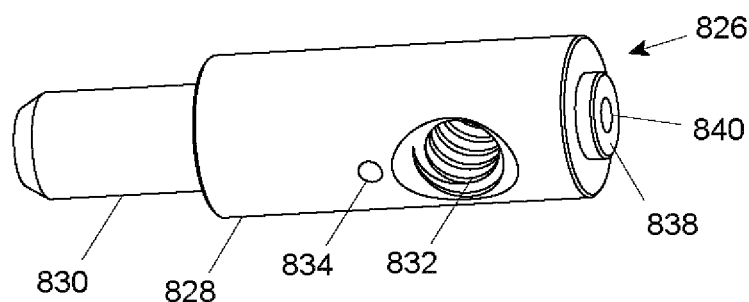
FIG. 61 shows a pivot shaft isolated.
Figure 62:
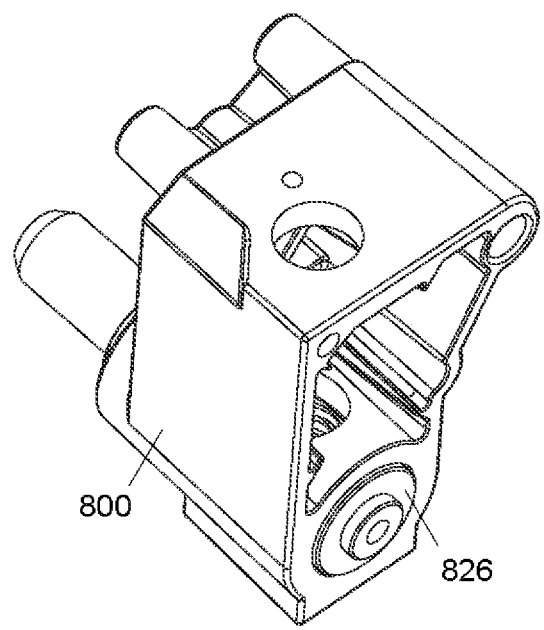
FIG. 62 shows a pivot shaft installed in an elevation carriage.

A pivot shaft 826 extends through a hole 810 in the elevation carriage, and it is shown isolated in FIG. 61. The pivot shaft includes a wide cylindrical section 828, a narrow cylindrical section 830, a threaded through-hole 832, and a small, threaded hole 834. When pivot shaft 826 is installed in elevation carriage 800, as shown in FIG. 62, hole 834 in the shaft aligns with a small, threaded hole 812 in the elevation carriage, and a bolt (not shown) may then be inserted to prevent the pivot shaft from moving relative to the elevation carriage. The through-hole in the pivot shaft lines up with holes 802, 804, and 806 in the elevation carriage, and the elevation shaft passes through the through-hole. Bushings 808, and holes 802, 804, and 806 in the elevation carriage are not threaded, so the only threaded component interacting with elevation shaft 816 is the pivot shaft. As the elevation shaft is rotated, the elevation carriage moves up or down on the shaft, since the elevation carriage is held from rotating relative to the elevation shaft. This will be described in further detail below.

Elevation shaft 816 is threaded at a shallow angle, and this design is advantageous because it forms a sort of anti-backdrive mechanism, since friction and the slope of the threads on shaft 816 keeps elevation carriage 800 and its accompanying components from slipping or drifting down unexpectedly due to gravity (this is known as backdriving). The top of the elevation shaft extends through a bronze bushing 818, which fits within hole 268 in rear bracket 226, as can be seen in at least FIG. 71. The base of the elevation shaft extends through a washer 820, a bushing 822, a hole 854 in an elevation bracket 844, and terminates in an elevation force transfer mechanism 904. The bushing 822 includes a wider section, which rests on top of elevation bracket 844, and a narrower section which extends through and slightly beyond hole 854 in the bracket. The non-threaded end of elevation shaft 816 extends slightly beyond the end of bushing 822.

Figure 63:
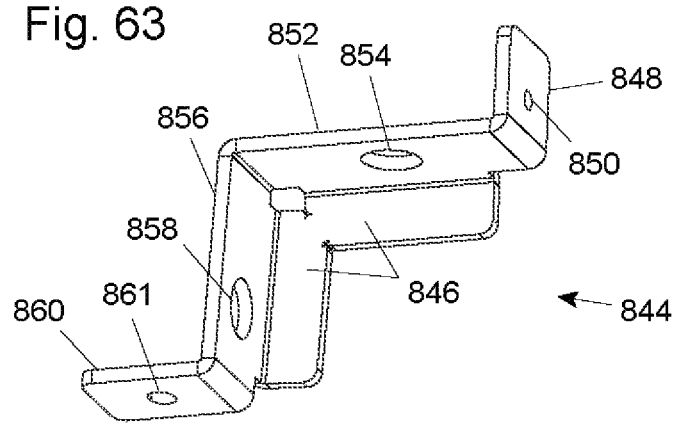
FIG. 63 shows an elevation bracket isolated.
Figure 64:
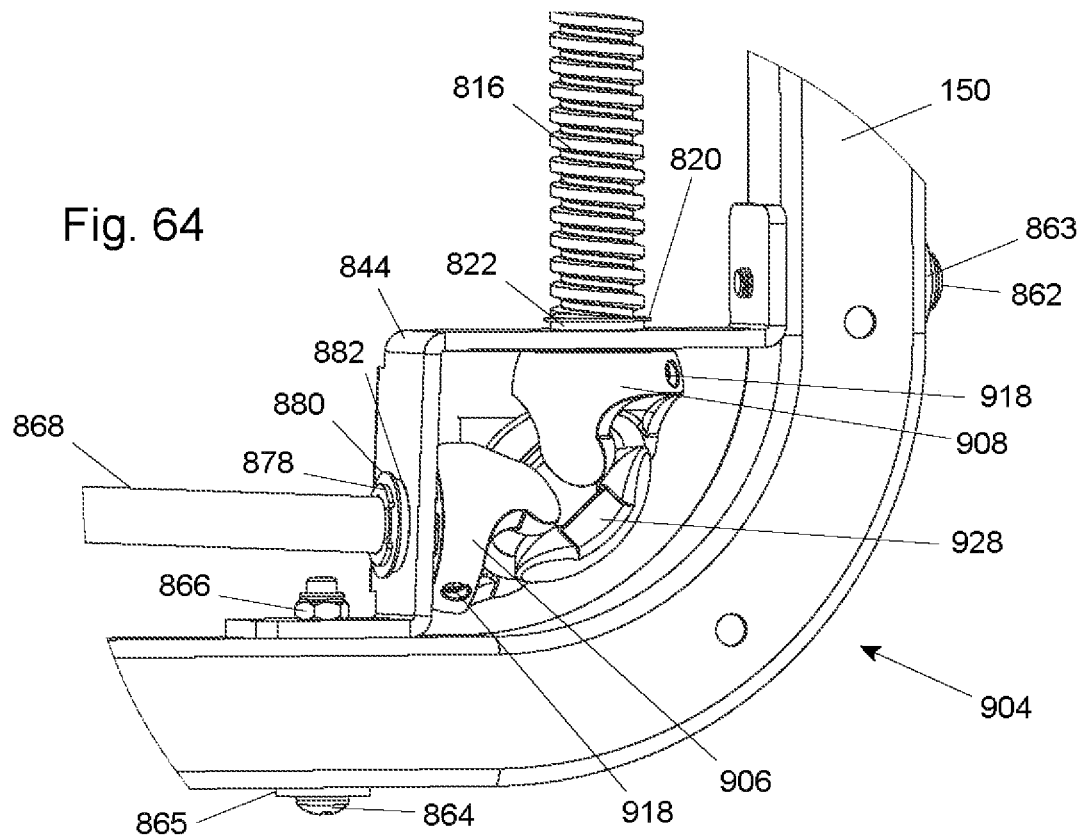
FIG. 64 shows a detail view of an elevation force transfer mechanism.

Elevation bracket 844, shown isolated in FIG. 63, is generally shaped like a W with generally right angles and is made from a single piece of bent sheet metal with sections 846, 848, 852, 856, and 860. The two wing sections 846 extend towards each other from generally vertical section 856 and generally horizontal section 852 on one side of the elevation bracket. The wing sections provide stability and rigidity to the bracket. It is advantageous to only provide them on one side of the bracket in order to allow for easy access to the elevation force transfer mechanism from the other side of the bracket. FIG. 64 shows elevation bracket 844 attached to trunnion 150 by a pair of screws 862 and 864. A hole 850 in the bracket is threaded, so screw 862 passes through a washer 863, hole 190 in the trunnion, and is threaded into hole 850 in the elevation bracket. Hole 861 is slightly oversized, to provide room for adjustment, so screw 864 passes through a washer 865, hole 184 in the trunnion, hole 861 in the bracket, and is secured by a nut 866. Elevation bracket 844 is positioned in what may be called a rear corner of the trunnion, or in other words, where generally horizontal bottom section 156 of the trunnion transitions into vertical section 154.

Figure 68:
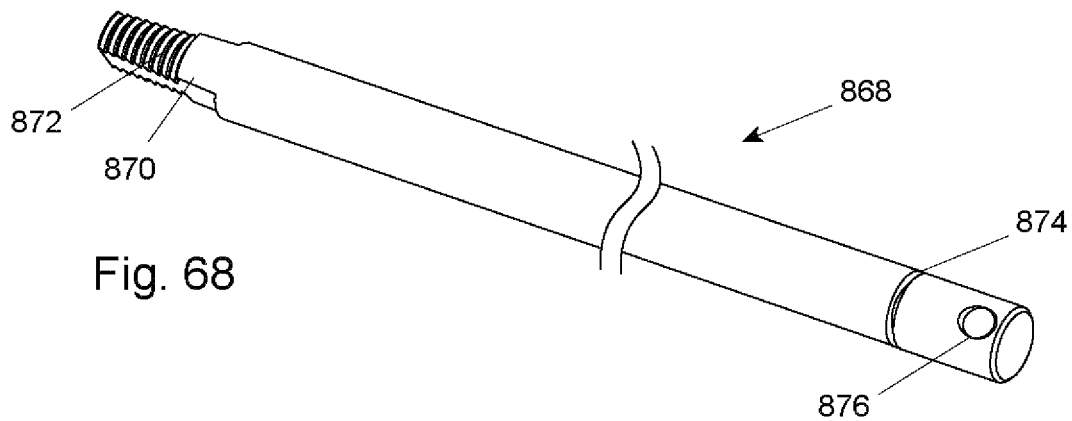
FIG. 68 shows an elevation control shaft.
Figure 69:
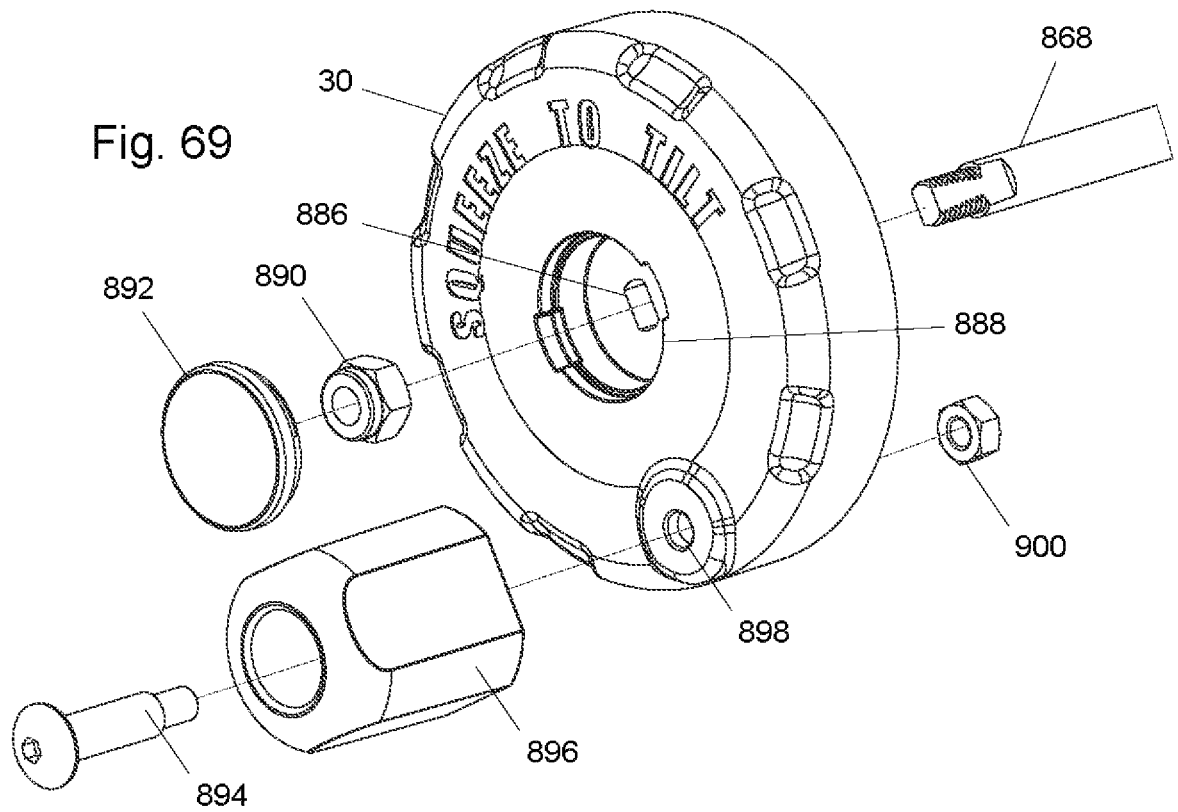
FIG. 69 shows an elevation handwheel and some additional components.

Handwheel 30 connects to elevation control shaft 868, which is shown isolated in FIG. 68, with the middle section removed for clarity. The elevation control shaft includes a somewhat square or keyed end 870 with threads 872, and an annular groove 874 and hole 876 at the distal end of the shaft. FIG. 69 shows an exploded view of the connection between handwheel 30 and elevation control shaft 868. Keyed end 870 of elevation control shaft 868 fits through a keyed hole 886 in the handwheel, and a nut 890 is threaded onto the end of the shaft to secure the handwheel to the shaft. Because handwheel 30 cannot rotate relative to shaft 868, rotation of handwheel 30 will rotate shaft 868. Nut 890 fits within a recess 888 in the front of handwheel 30, and a cover 892 may be provided to cover the recess and provide a smooth front face for the handwheel. A secondary handle 896 may be provided for a user to grasp and use to rotate handwheel 30, and a partially threaded bolt 894 extends through the secondary handle, a hole 898 in the handwheel, and is secured by a nut 900.

When the elevation mechanism is assembled, elevation control shaft 868 passes through an arcuate opening 74 in front panel 56 of support structure 14, tilt mechanism 400, hole 172 in trunnion 150, an e-clip 878, a washer 880, and a bushing 882, as can be seen in FIGS. 9 and 64. Bushing 882 has a wider section which rests against the front of bracket 844, and a narrower section which extends through, and slightly beyond, hole 858 in the bracket. After the elevation control shaft passes through bushing 882, it terminates in a driving yoke 906. Elevation bracket 844 is sandwiched between e-clip 878, which fits around groove 874, and driving yoke 906, and this prevents the elevation control shaft from moving forward or backward.

The driving yoke 906 at the end of elevation control shaft 868 opposite handwheel 30 is in operative contact with a center or coupling yoke 928, which in turn is in operative contact with a driven yoke 908 at the base of threaded elevation shaft 816. The driving yoke, coupling yoke, and driven yoke form a double universal joint assembly, which may be thought of as an elevation force transfer mechanism 904.

In other table saws, the connection between an elevation control shaft and a threaded elevation shaft would be formed by a pair of bevel gears. However, sawdust and other contaminants can become packed between the teeth on the gears, leading to misalignment and wear. A universal joint mechanism or "u-joint" provides benefits different than gears. For example, they provide a smooth feel as the operator turns the handle to raise or lower the blade, and dust is less likely to build up on the components and degrade performance as often happens with gears. In the presently depicted embodiment, saw 10 is provided with a double universal joint, which is comprised of two adjacent universal joints, with a connecting section disposed in the middle.

Figure 66:
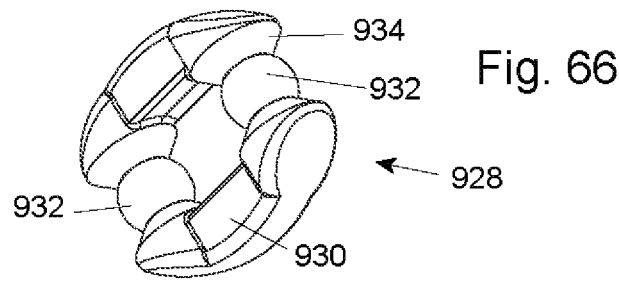
FIG. 66 shows another part of a universal joint.
Figure 65:
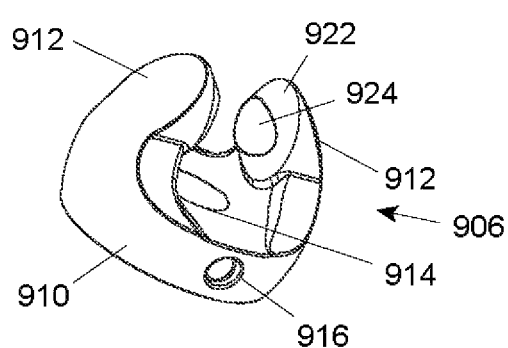
FIG. 65 shows part of a universal joint.
Figure 67:
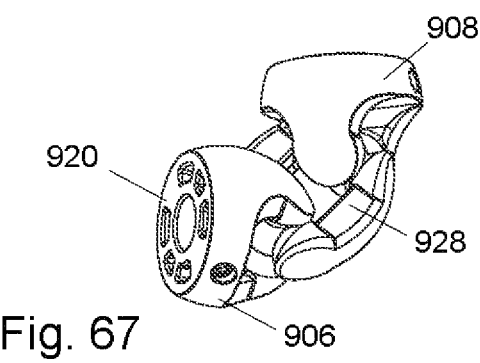
FIG. 67 shows a universal joint.

Driving yoke 906 is shown isolated in FIG. 65, center yoke 928 is shown isolated in FIG. 66, and the universal joint assembly is shown isolated in FIG. 67. In the presently disclosed embodiment, the driving yoke and driven yoke are identical, so only one is described in detail, but it will be appreciated that different, non-identical structures are also possible within the scope of the invention.

A driving or driven yoke is comprised of a short, generally cylindrical section 910 and two arms 912. A hole 914 extends through section 910, and provides clearance for elevation control shaft 868 or threaded elevation shaft 816. A through-hole 916 extends through section 910, generally perpendicular to hole 914. Hole 916 provides clearance for a spring pin 918, or some other method of attachment between the shafts and u-joints, such as a nut and bolt or set screws. The distal face 920 of the yoke may include a plurality of cutouts or indentations, in order to maintain a relatively constant thickness within the yoke, which is desirable when forming plastic parts. A pair of arms 912 extend from generally cylindrical section 910, and are positioned opposite one another. The arms are generally triangular in shape and they slope in somewhat toward one another. Each arm has a somewhat conical section 922 extending inward, with the apex of the cone removed in a somewhat "scoop" shaped indentation 924, which may also be a generally semispherical indentation. The arms are configured to fit around a pair of balls 932 on center yoke 928, as will be discussed, and they can be configured to flex outward slightly when the balls are inserted so that the arms apply some spring force against the balls.

It will be appreciated that generally cylindrical section 910 can be any desired shape, such as square or hexagonal, but the round shape is easy to manufacture and aesthetically pleasing. Furthermore, through-hole 914 could be any desired shape, as long as the end of the elevation control shaft and/or threaded elevation shaft could fit therein. For example, a hexagonal or splined hole and shaft combination could minimize the possibility of the shaft rotating relative to the hole.

A spring pin 918 passes through hole 916 in driving yoke 906 and hole 876 in the end of elevation control shaft 869 to non-rotatably connect the yoke to the elevation control shaft. A second spring pin 918 passes through hole 916 in driven yoke 908 and a hole in the end of elevation shaft 816, to non-rotatably connect the yoke to the elevation shaft.

Center yoke 928 is comprised of a pair of arms 930 connected by a ball 932 between each end of the arms. Each integrally formed ball 932 is supported by a pair of conical sections 934 extending from each arm. As can be seen in at least FIGS. 65 and 66, arms 912 and 930 are shaped similarly, but arms 930 are more rectangular in shape. Because arms 930 are connected by integrally formed balls 932, they are stronger, and less prone to breaking relative to arms 912, so they can be narrower without compromising the structural integrity of the assembly.

The elevation system and its force transfer mechanism can perhaps be most clearly seen in FIG. 64. Elevation control shaft is non-rotatably connected to driving yoke 906, the arms of which capture a ball 932 in center yoke 928, so the driving yoke and center yoke can move relative to one another. The ball 932 on the other side of the center yoke is captured by arms 912 on driven yoke 908, the distal end of which is non-rotatably connected to threaded elevation shaft 816. Thus, as handwheel 30 is rotated clockwise or counterclockwise, elevation control shaft 868 and driving yoke 906 rotate in the same direction, about what may be thought of as a first axis defined by the center of the elevation control shaft and through-hole 914 in the driving yoke. This rotation causes center yoke 928 to rotate in the same direction about an axis passing through the centers of the balls 932, which is approximately 45 degrees relative to elevation control shaft 868. The axis defined by an imaginary line drawn between the centers of balls 932 may be thought of as the second axis. Rotation of center yoke 928 causes corresponding clockwise or counter-clockwise motion of driven yoke 908, which in turn causes threaded elevation shaft 816 to rotate about what may be thought of as a third axis passing through the centerline of the threaded shaft. As explained above, rotation of threaded elevation shaft 816 causes elevation carriage 800 and the components connected thereto, such as the blade, riving knife, and motor, to change elevation relative to the table.

Figure 70:
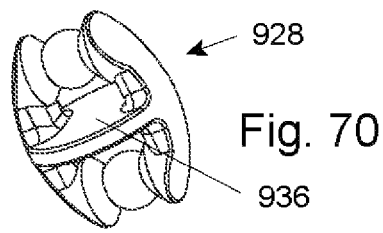
FIG. 70 shows an alternate embodiment of a universal joint.

In an alternate exemplary embodiment, center yoke 928 can be formed with a disc-shaped section 936, as shown in FIG. 70. In this case, the pairs of arms 930 would be connected directly to one another, so the center yoke would be shaped generally like an oval, with balls 932 forming the narrow ends, and arms 930 forming the elongate sides. It can be advantageous to include disc 936, since it adds rigidity and torsional strength to the part.

Figure 72:
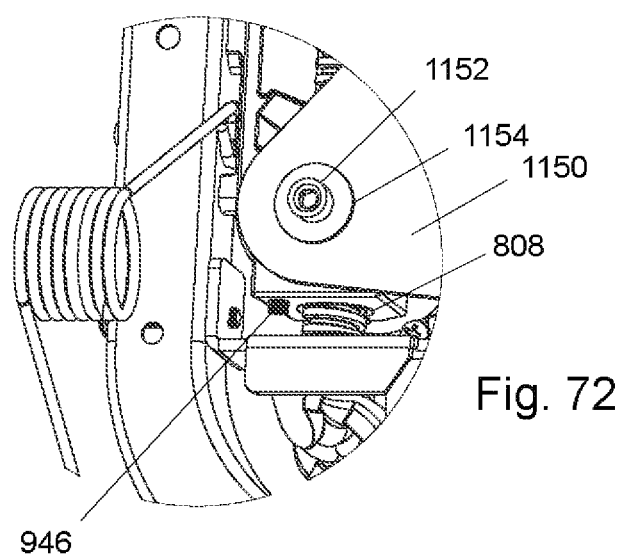
FIG. 72 shows a lower elevation limit stop.
Figure 83:
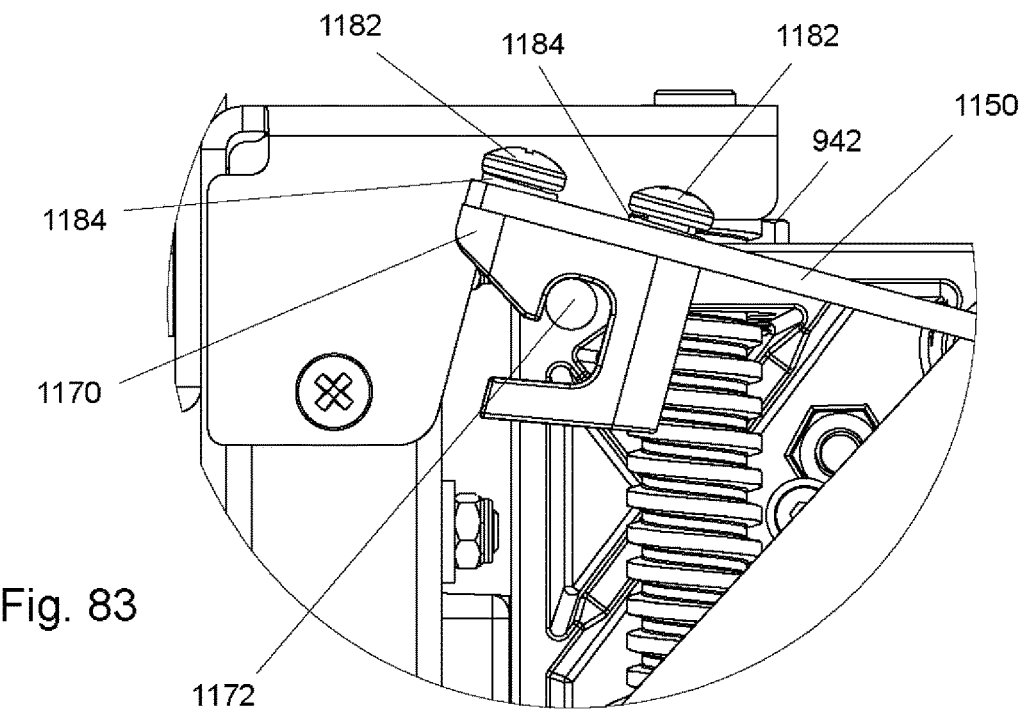
FIG. 83 shows a detail view of a retraction mechanism.

The distance elevation carriage 800 may travel up and down on shaft 816 is ultimately defined by the spacing between rear mounting plate 226 and elevation bracket 844. That distance, however, may be further defined by adjustable stops 942 and 946 shown in FIGS. 71 and 72. Stop 942 (labeled in FIGS. 71 and 75) comprises a bolt or set screw threaded into a hole 944 in elevation carriage 800, and the stop is positioned so the end of the screw will abut the underside of the rear mounting plate at the limit of the upward movement of the elevation carriage, as shown in FIG. 83. As shown in FIG. 72, stop 946 comprises one or more bolts or set screws threaded into one or more holes 948 in the bottom of the elevation carriage. The set screw is positioned so that it will abut the top of the elevation bracket at the limit of the downward movement of the elevation carriage. The distance the elevation carriage may slide up or down is thus defined by how far the stops or set screws extend.

Further features relating to elevation carriage 800, shown isolated in FIGS. 57-60, will now be discussed. The elevation carriage is a die-cast aluminum component. It is shaped somewhat like a rectangle with a generally triangular section removed from one corner. The top and bottom of the elevation carriage include holes 802 and 806, respectively, for bushings 808, as discussed above. It is advantageous to space the holes (and bushings) as far apart as possible, in order to provide additional stability to prevent rotation of the motor and blade out of plane with the elevation carriage 800 and threaded elevation shaft 816.

Figure 169:
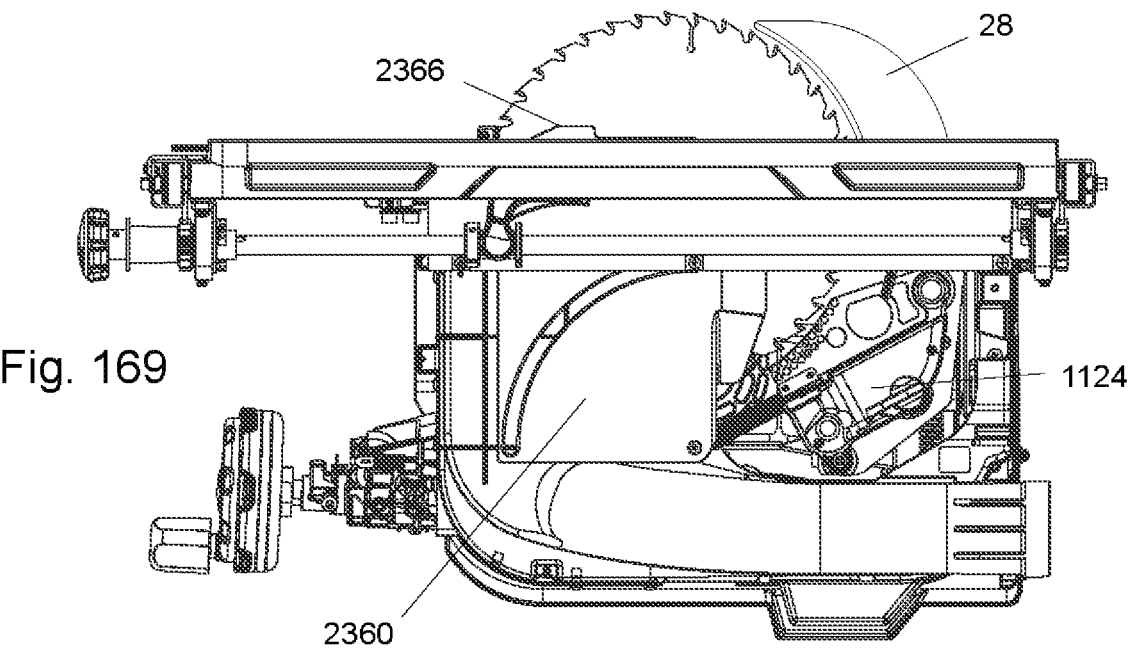
FIG. 169 shows a side view of a dust shroud assembly with some additional components with an access door pivoted out of the way.

The upper, right side of the elevation carriage includes four bosses 952, 954, 956, and 958, which are used to mount a riving knife clamp assembly 960. A blade guard, spreader, and/or riving knife may be positioned adjacent the rear edge of the blade to shield the blade and/or to prevent a work piece from catching the rear of the blade. FIG. 1 shows a blade guard 26 supported by elevation carriage 800, and FIG. 169 shows a riving knife 28 supported by the elevation carriage. Riving knife 28 or blade guard 26 raises, lowers, and tilts with elevation carriage 30, and therefore, maintains a constant position relative to the blade. Various mechanisms for mounting a blade guard, spreader, and/or riving knife to an elevation carriage in a table saw are described in U.S. Pat. No. 10,118,308, titled "Systems to Mount and Index Riving Knives and Spreaders in Table Saws," which is incorporated herein by reference.

Bosses 952, 954, and 956 are used to attach bolts for riving knife clamp 960, and boss 958 is used to attach an adjustment bolt for the clamp. A nut on the adjustment bolt fits in recess 962 in on the left side of the elevation carriage, and a pin is press-fit into a hole 964 next to recess 962, so the edge or head of the pin overlaps the nut, preventing the nut from moving out of the recess. A projection 966 is provided on the right side of the carriage to provide clearance for the end of the press-fit pin.

Figure 73:
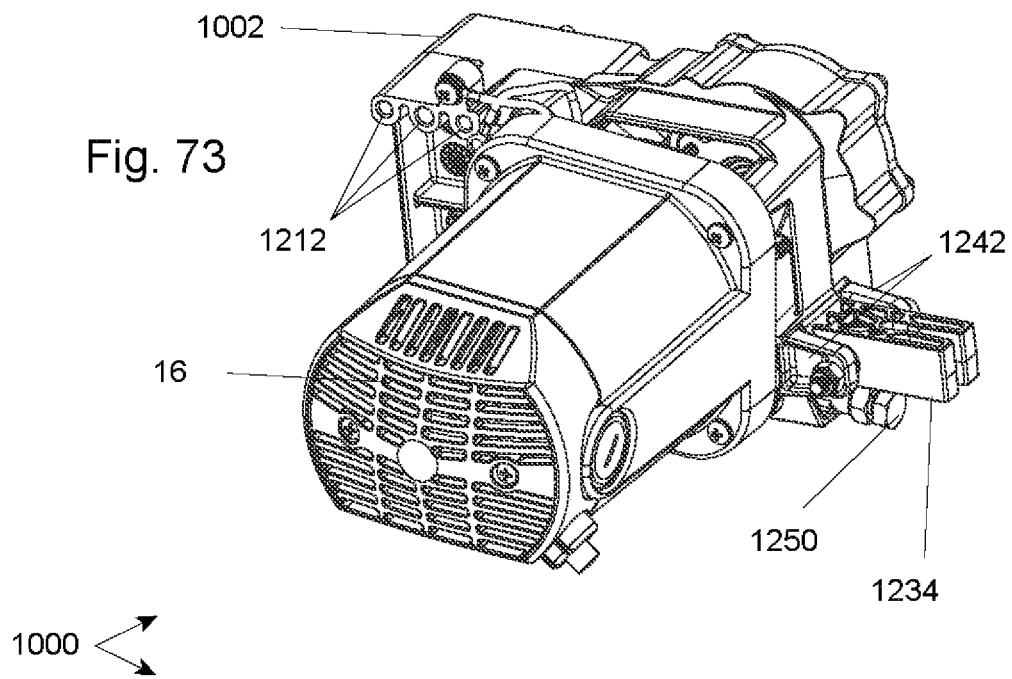
FIG. 73 shows an arbor block assembly.
Figure 74:
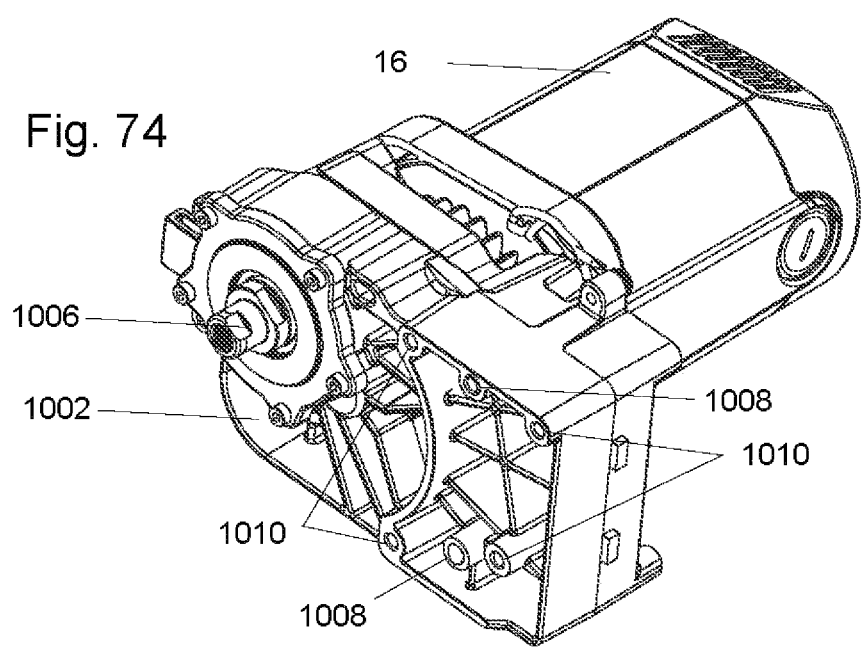
FIG. 74 shows another view of an arbor block assembly.

Elevation carriage 800 also supports an arbor block 1002 and a motor 16, shown isolated in FIGS. 73 and 74. The arbor block, in turn, supports an arbor 1006 on which the blade is placed. The arbor is supported in bearings so it can turn to spin the blade. In the presently disclosed embodiment, arbor block 1002 is die cast from aluminum. Arbor block 1002 is mounted to pivot shaft 826 in elevation carriage 800 via two brackets, so that the arbor block assembly can pivot up or down relative to the shaft (and thus relative to the elevation carriage and table 12). Arbor block 1002 may also include or be thought of as a gearbox through which the motor drives the blade at a desired angular velocity.

Figure 75:
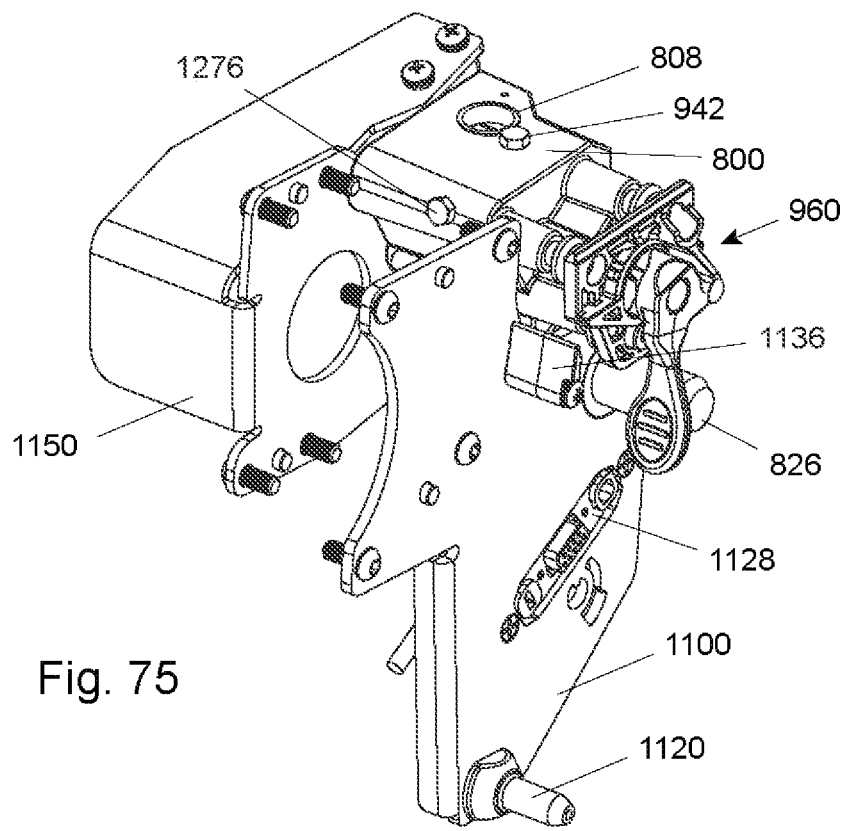
FIG. 75 shows an elevation carriage, retraction bracket, and brake cartridge mounting bracket.

A brake cartridge bracket 1100 extends between the arbor block and pivot shaft on the right side of the elevation carriage (relative to the front of the saw) and a retraction bracket 1150 extends between the arbor block and shaft on the left side of the elevation carriage (relative to the front of the saw). Pivot shaft 826 is labeled in at least FIG. 62 and it extends from one side of the elevation carriage to the other. The pivot shaft, shown isolated in FIG. 61 and discussed above, includes a narrow section 830, a washer section 838, and a threaded hole 840 in the washer section. FIG. 75 shows elevation carriage 800, pivot shaft 826, brake cartridge bracket 1100, and retraction bracket 1150 isolated.

Figure 76:
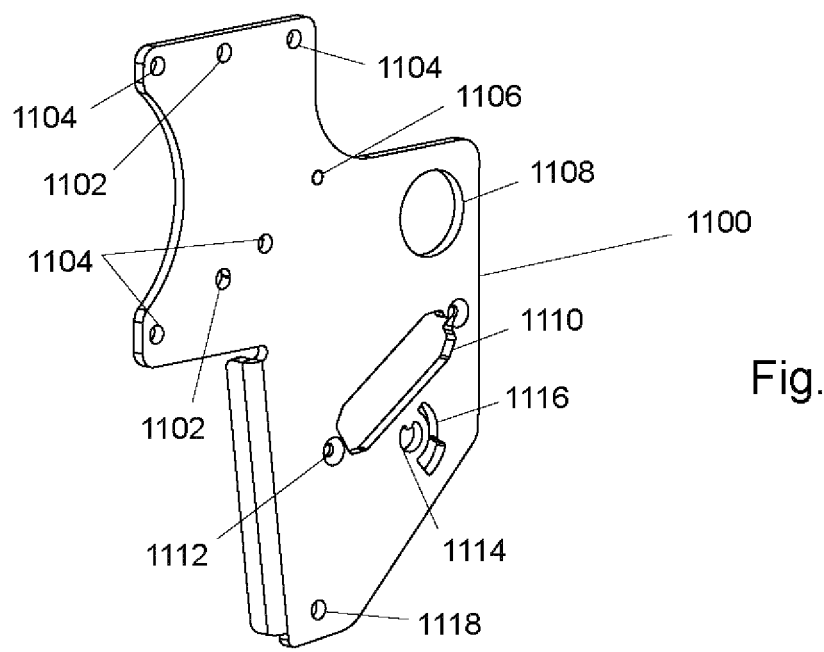
FIG. 76 shows a brake cartridge mounting bracket isolated.
Figure 91:
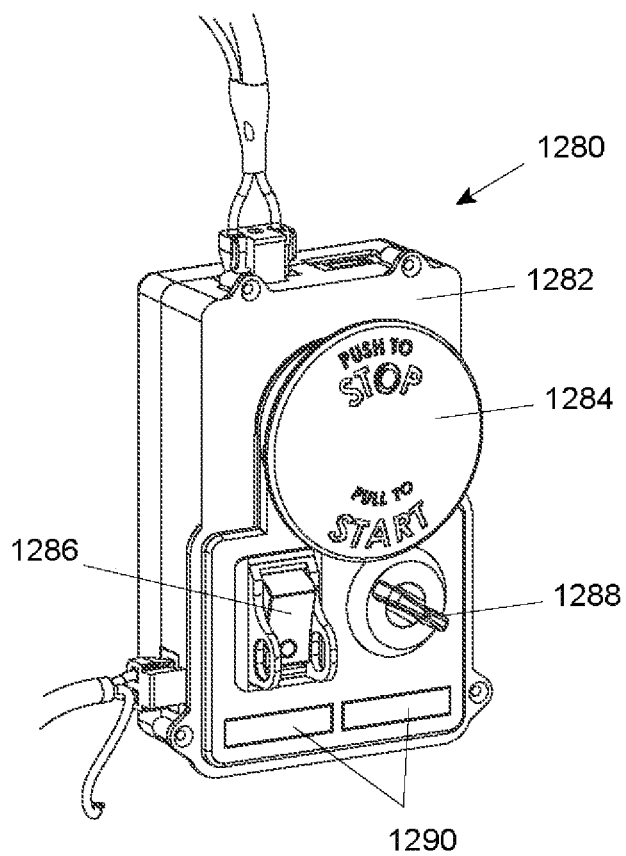
FIG. 91 shows a switchbox isolated.

Brake cartridge bracket 1100, shown isolated in FIG. 76, is used to support a brake cartridge when table saw 10 includes an active injury mitigation system with a brake cartridge. It is pivotally attached to elevation carriage 800 via pivot shaft 826, which passes through a hole 1108 in brake cartridge bracket 1100 and hole 810 in elevation carriage 800, as shown in at least FIG. 75. Brake cartridge bracket 1100 is formed from a single piece of sheet metal with holes 1102-1118. Holes 1102 and 1104 align with corresponding holes 1008 and 1010 in the arbor block (labeled in FIG. 74), and are used to connect the arbor block to the brake cartridge bracket by a combination of screws and pins, which are shown in FIG. 75. Hole 1110 in the brake cartridge bracket is shaped to allow a protrusion of a plug or socket, such as that on a brake cable board housing 1128, to pass through it. Hole 1110 is shaped generally like a rectangle with the corners removed and it has a notch in the rear end (relative to the front of the saw), through which a screw passes in order support a plug or socket, such as a brake cable board housing 1128, that connects to a switchbox, such as switchbox 1280 shown in FIG. 91. Additional support for brake cable board housing 1128 is provided by a second screw which passes through hole 1112 in brake cartridge bracket 1100. A plastic positioning pin 1120 is attached to the brake cartridge bracket through hole 1118. The brake cartridge bracket and plug are positioned so that a brake cartridge 1124 automatically engages the plug when the brake cartridge is seated on shaft 826 and plastic positioning pin 1120. Hole 1110 is slightly oversized to allow some play for brake cable board housing 1128 to allow its D-Sub connector to contact the accompanying D-Sub connector in brake cartridge 1124.

In the depicted embodiment, pivot shaft 826, positioning pin 1120, and brake cartridge bracket 1100 provide a single, fixed position for brake cartridge 1124, as shown in at least FIG. 169. In some table saws, the system to mount a brake cartridge in the saw allows for the position of the brake to be adjusted so that the brake can be moved closer to or further from the edge of the blade. The depicted embodiment, in contrast, provides a stationary or fixed mount and the position of the brake cannot be adjusted. This simplifies the design and reduces the manufacturing cost of the saw. This also simplifies the operation of the saw because a user does not need to adjust the position of the brake cartridge relative to the blade. This also prevents a user from positioning the brake cartridge further from the blade than it should be, which might happen by mistake or inadvertence in a system where the position of the brake cartridge was adjustable. The design and function of brake cartridge 1124 are described in detail in U.S. Pat. No. 8,459,157, issued Jun. 11, 2013, which is herein incorporated by reference. An adjustable blade limit pin may be provided in a hole 1106 in brake cartridge bracket 1100, as may be seen in at least FIG. 75. The limit pin is positioned to prevent a user from installing a blade which is too large and which might be too close to the cartridge.

Figure 77:
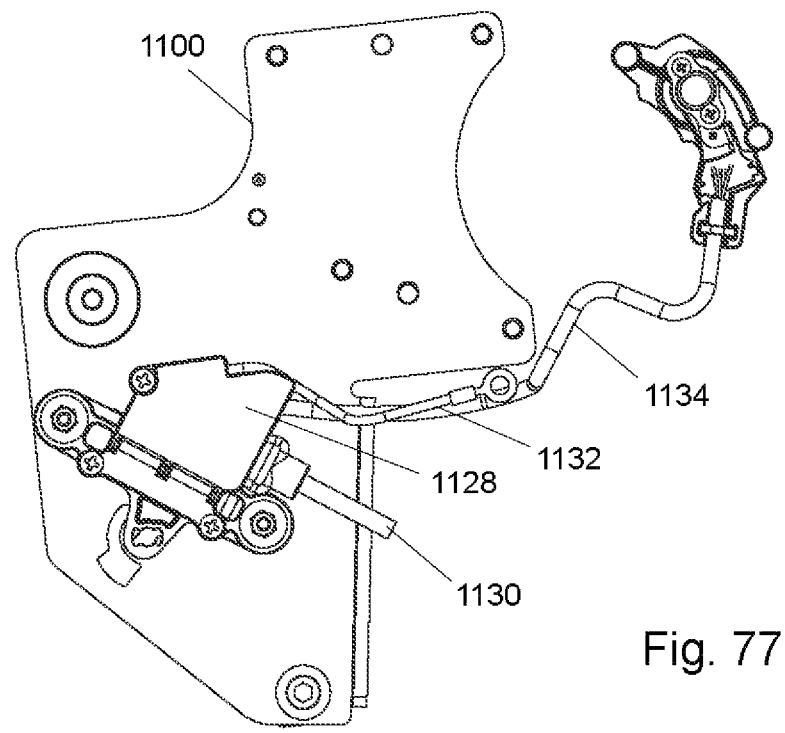
FIG. 77 shows a brake cartridge mounting bracket and a brake cable board housing.
Figure 78:
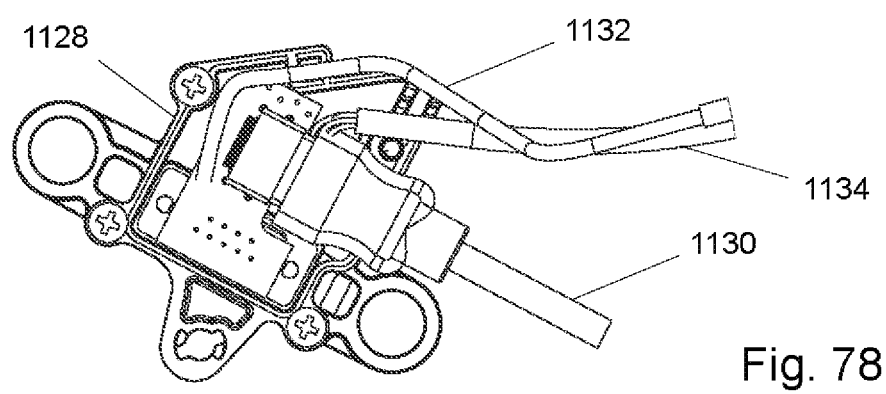
FIG. 78 shows a brake cable board housing with some additional components.

FIG. 77 shows a brake cable board housing 1128 attached to the side of brake cartridge bracket 1100 on the side opposite where brake cartridge 1124 attaches. The housing 1128 is on the left side, relative to the front of the saw. Brake cable board housing 1128, shown isolated in FIG. 78, has a D-sub connector which connects with brake cartridge 1124, and three cables 1130, 1132, and 1134. Cable 1134 contains wires relating to a Hall Effect sensor to monitor blade rotation, detection signal monitoring, and grounding. Cable 1134 may also connect to a conductive coupling used in some implementations of active injury mitigation technology. Conductive couplings for power tools with active injury mitigation technology are described in PCT Patent Application No. PCT/US17/34566, titled "Detection Systems for Power Tools with Active Injury Mitigation Technology," filed on May 25, 2017, and naming Stephen F. Gass, John P. Nenadic, and Louis R. Slamka as inventors, the disclosure of which is herein incorporated by reference. Cable 1134 described above may correspond to cable or wire 274 in the PCT patent application, and the discussion concerning cable or wire 274 in the PCT application applies to cable 1134 herein. Cable 1130 connects to the switchbox. Internal circuitry and/or programming related to active injury mitigation technology may be housed in the brake cartridge, and/or in brake cable board housing 1128. In the depicted embodiment, it can be advantageous to form the cable board housing from two parts that mate with something like a tongue and groove connection in order to minimize dust permeability.

Figure 79:
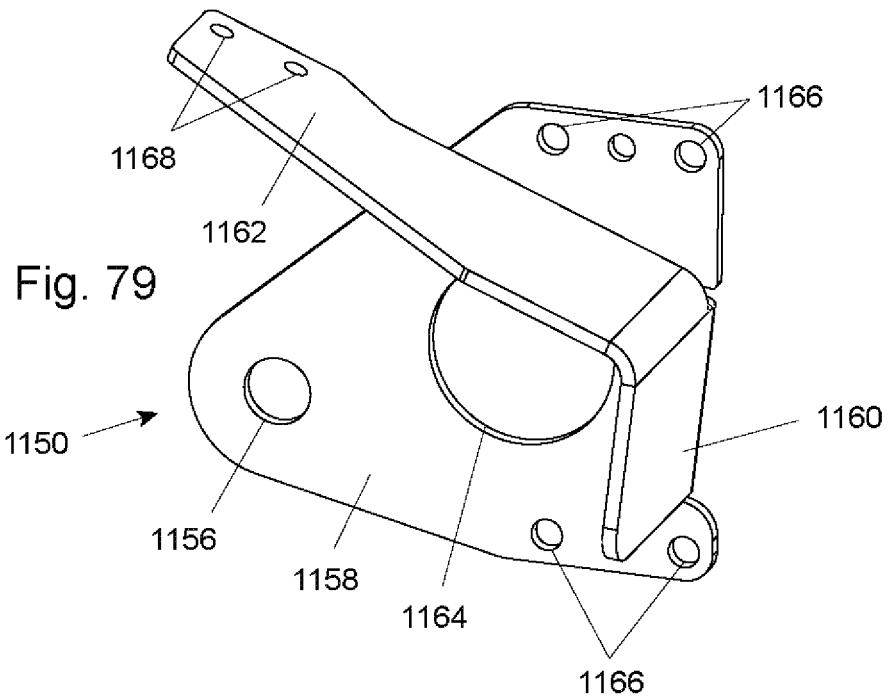
FIG. 79 shows a retraction bracket isolated.

Retraction bracket 1150, shown isolated in FIG. 79, is pivotally attached to pivot shaft 826 (and thus elevation carriage 800) via a bolt 1152 which passes through a washer 1154 (both labeled in FIG. 72), a hole 1156 in the retraction bracket, and hole 840 in the pivot shaft. Smaller cylindrical section 838 on the pivot shaft fits within hole 1156 in the retraction bracket, so the bracket pivots around the section, held between the wide section 828 of the shaft and washer 1154.

The retraction bracket is made from bent, stamped sheet metal, and it may be thought of as having a main section 1158 shaped somewhat like a triangle, with a first section 1160 bent about 90 degrees relative to the main section, and a second section 1162 bent approximately 70 degrees relative to the first section. A large hole 1164 is disposed near the center of main section 1158 in order to decrease the weight of the part. A plurality of holes 1166 are used to bolt the retraction bracket to arbor block 1002, using bolts and pins (shown in FIG. 75) which align with a plurality of holes 1212 in the arbor block.

Figure 59:
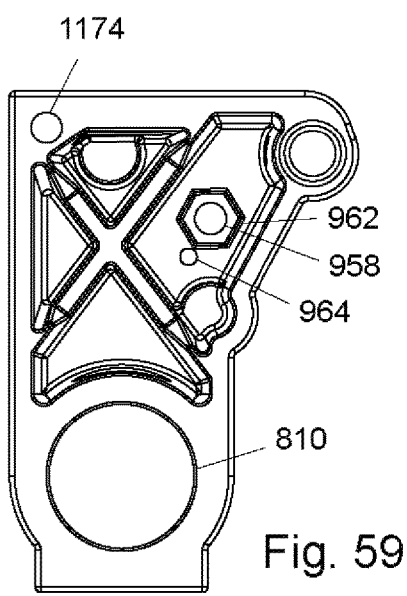
FIG. 59 shows a side view of the elevation carriage of FIG. 57.
Figure 60:
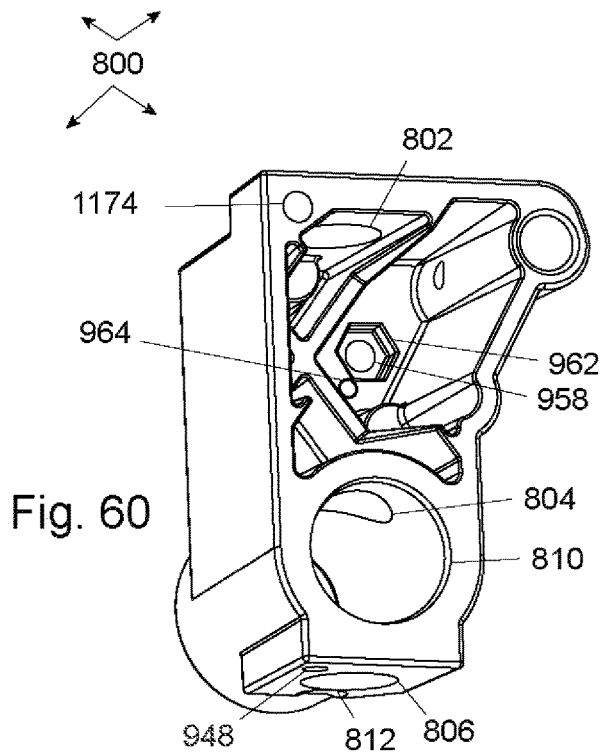
FIG. 60 shows yet another view of the elevation carriage of FIG. 57.
Figures 80, 81, 82:
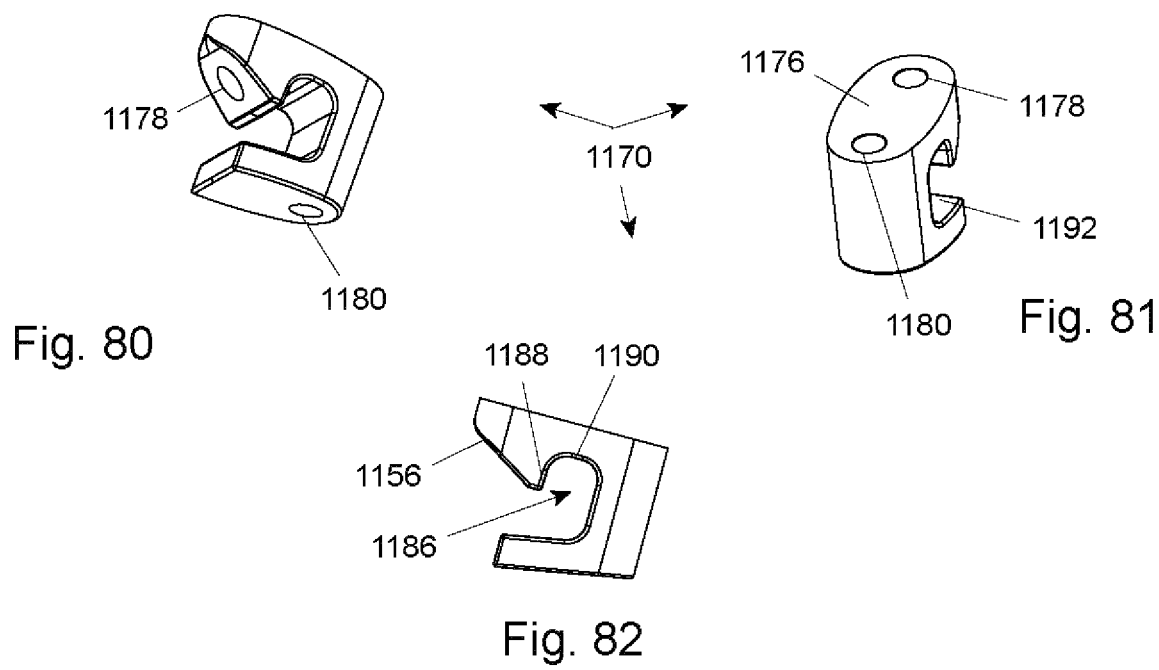
FIG. 80 shows a catch isolated.
FIG. 81 shows another view of the catch of FIG. 80.
FIG. 82 shows a side view of the catch of FIG. 80.
Figure 84:
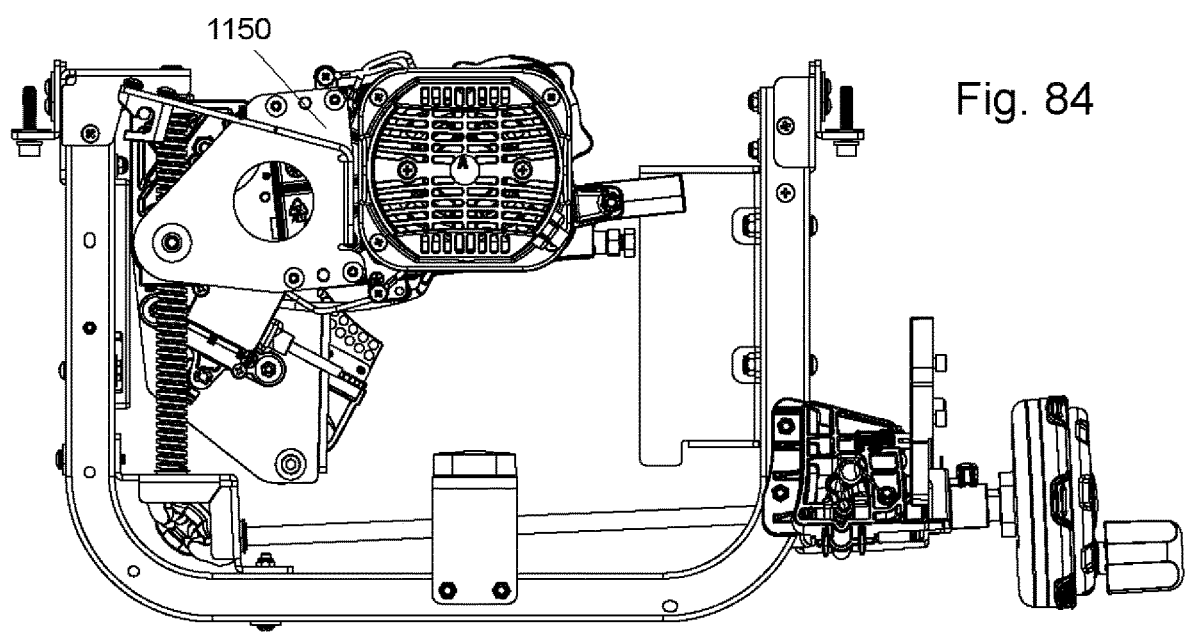
FIG. 84 shows a retraction mechanism with additional components.
Figure 85:
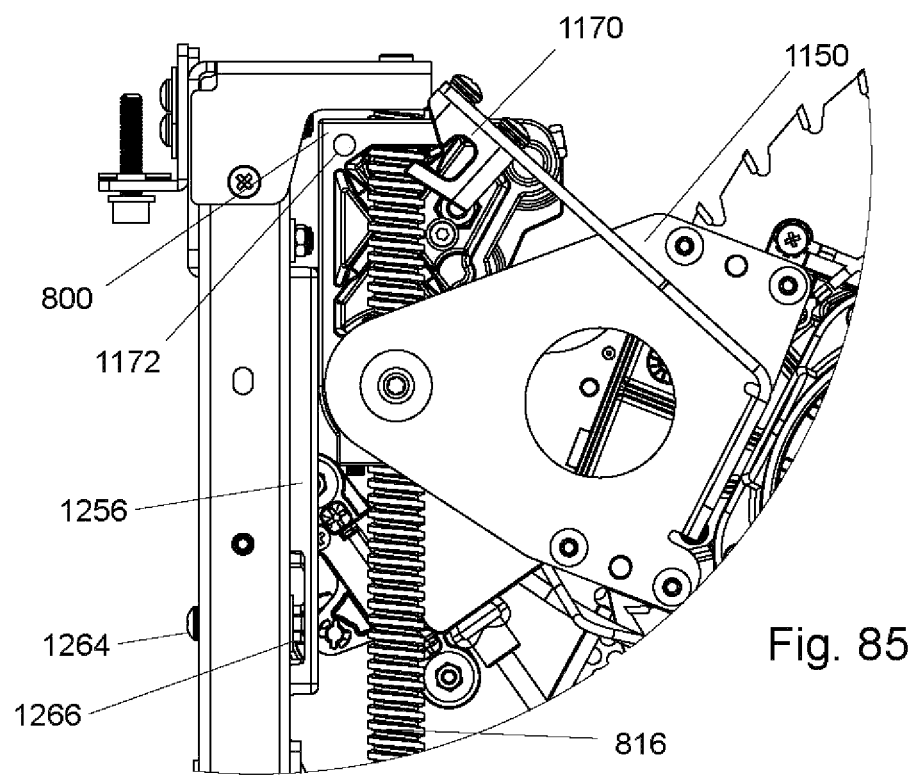
FIG. 85 shows a detail view of a retraction mechanism in the retracted position.

A catch 1170 is connected to the distal end of second section 1162 (see FIG. 83), and it extends somewhat around a retraction pin 1172, which is a hardened, steel pin, press fit into a hole 1174 in the elevation carriage (labeled in FIGS. 59 and 60). The catch is shown isolated in FIGS. 80-82. In the presently described embodiment, the catch is made from a hard, non-brittle plastic such as 30% glass-filled nylon. The catch includes a flat section 1176, which fits against retraction bracket 1150 and includes holes 1178 and 1180, which are used to bolt the catch to the bracket. A pair of bolts 1182 pass through a pair of lock washers 1184, a pair of holes 1168 in the retraction bracket, and holes 1178 and 1180 in the catch. A somewhat hook-shaped cutout 1186 in the catch defines a first cam surface 1188 and a second cam surface 1190. The first cam surface is angled approximately 87 degrees relative to second section 1162 of the retraction bracket. The second cam surface is angled approximately 40 degrees relative to the second section of the retraction bracket. The second section 1162 of the retraction bracket functions as a leaf spring, holding catch 1170 against retraction pin 1172. Thus, second section 1162 may also be thought of as a spring or spring section. The angle of the bend between first section 1160 and second section 1162 of the retraction bracket can be selected to provide any chosen amount of force on pin 1172. The interaction between catch 1170 and retraction pin 1172 biases retraction bracket 1150 toward elevation carriage 800, which holds the motor and blade up anywhere along their normal range of fully elevated to fully lowered positions until the active injury mitigation system is activated and the motor and blade are retracted under the table, as will be discussed later. FIGS. 83 and 84 show the retraction mechanism in its normal position where the blade is not retracted, and FIGS. 85 and 86 show the retraction mechanism in its retracted position.

In order to simplify the following discussion, the arbor block and gearbox, along with brake cartridge bracket 1100 and retraction bracket 1150, are referred to collectively as an arbor block assembly 1000. During normal use, blade 18, motor 16, and arbor block assembly 1000 are prevented from pivoting down, or retracting, by the interaction of retraction pin 1172 and catch 1170. However, when brake cartridge 1124 engages and stops the blade, the angular momentum of the blade can create a downward force which typically is sufficient to pull catch 1170 up and off of pin 1172 by flexing section 1162 of the retraction bracket. Arbor block assembly 1000 then pivots down around an axis defined by pivot shaft 826, which causes the blade to retract below the table. In this system, section 1162 acts like a spring and flexes up, toward the underside of the table, when the angular momentum of the blade carries the catch up and forward, off of the retraction pin. A third cam surface 1192 prevents the spring section from flexing too far up, while providing another cam or ramp surface to guide the catch off the pin.

After retraction, arbor block assembly 1000 can be reset to its normal, operational position by simply moving the assembly up, either by hand or by the elevation control on the saw, until catch 1170 snaps back around retraction pin 1172. A bolt 1276 (labeled in FIG. 75) may be threaded into a hole 1278 in arbor block 800 to provide a pivot limit stop for the arbor block 1002, to prevent a user from pivoting it up too far.

Figure 86:
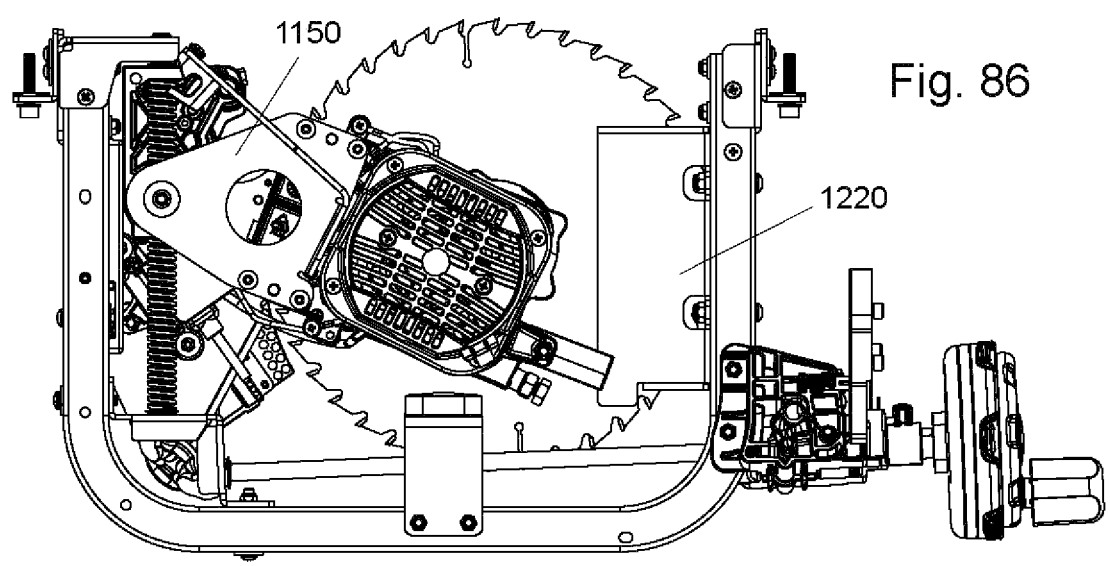
FIG. 86 shows a retraction mechanism in the retracted position with additional components.
Figure 87:
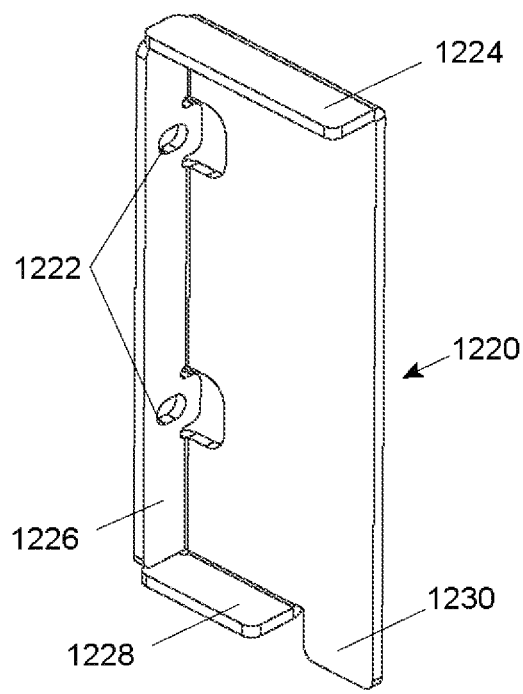
FIG. 87 shows an alignment bracket isolated.

An alignment bracket 1220, labeled in FIG. 86 and shown isolated in FIG. 87, is attached to the back of vertical section 152 of trunnion 150 via two screws, which pass through holes 1222 in alignment bracket 1220 and holes 168 in trunnion 150. The alignment bracket provides stability and alignment. It helps to keep the motor, arbor, and blade from tilting out of alignment with the trunnion, especially when the blade is tilted for angled cuts and during retraction of the arbor block assembly and blade. Alignment bracket 1220 is formed from a single piece of bent sheet metal, with a top edge 1224 folded over 90 degrees to one side, and with a side edge 1226 folded over 90 degrees to add rigidity. The bottom of alignment bracket 1220 is divided in two unequal portions, and the portion 1228, which is closer to the front of the saw, is bent at 90 degrees toward the side such that it is parallel with top edge 1224 and perpendicular to the main section of the bracket and the side edge 1226. The rear portion 1230 of the bottom of alignment bracket 1220 extends down until it is somewhat below the top of the hand wheel 30. Folded sections 1224, 1226, and 1228 add stability to alignment bracket 1220, and section 1230 allows elevation carriage 800 to have an increased vertical range of movement.

Figure 88:
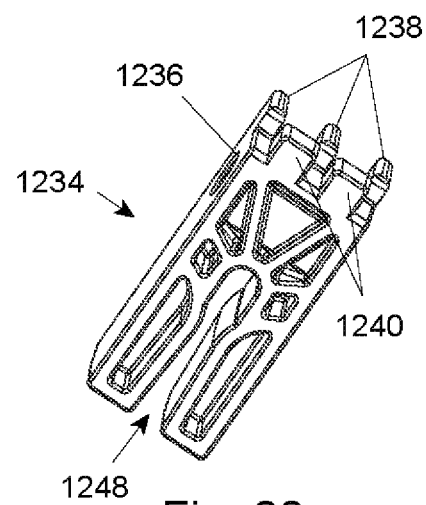
FIG. 88 shows an alignment block isolated.
Figure 89:
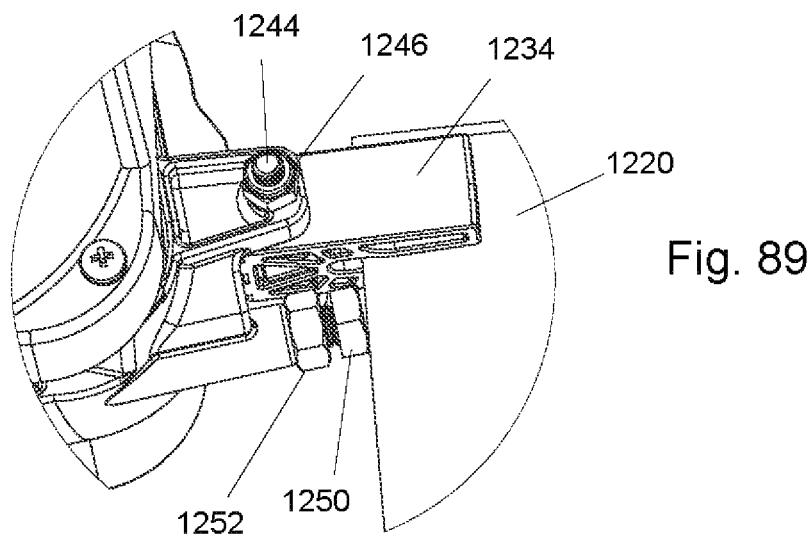
FIG. 89 shows an alignment bracket and alignment block.

In the depicted embodiment, the end of arbor block 1002 near alignment bracket 1220 is supported by an alignment block 1234, which is shown in at least FIGS. 73 and 89 and is shown isolated in FIG. 88. A threaded hole 1236 passes through the alignment block near its rear and is used to attach the alignment block to the arbor block. The rear of the alignment block has a generally horizontal channel defined by three top projections 1238 and two bottom projections 1240, configured to fit over a corresponding edge on arbor block 1002. The end of arbor block 1002 adjacent alignment bracket 1220 includes two mounting arms 1242, each with a through hole, and the base of the alignment block fits on a ledge between mounting arms so that the holes in the arms align with the threaded hole 1236 near the rear of the alignment block. A bolt 1244 passes through a hole in one of the two arms on the arbor block, then goes through hole 1236 in the alignment block and extends through the hole in the other arm on the gearbox. A self-locking nut 1246, such as a nylon insert lock nut, is then threaded onto the bolt to hold the bolt still. With this configuration, turning bolt 1244 causes alignment block 1234 to move along the bolt, and thereby adjusts the lateral position of the arbor block and blade relative to the alignment block.

Alignment block 1234 includes a notch 1248, which is configured to fit over the rear edge of alignment bracket 1220 (as shown in FIG. 89) to prevent the arbor block assembly 1000, and blade from moving laterally, and to guide the alignment block as it moves up and down along the rear edge of alignment bracket 1220 when elevation carriage 800 moves up and down and when the motor, arbor block assembly 1000, and blade retract.

The clearance between notch 1248 and alignment bracket 1220 is chosen to provide enough space so that the alignment block is held against most lateral movement, but not so much that it locks against the rear edge of alignment bracket 1220 and prevents the arbor block assembly and blade from moving up and down. In the depicted embodiment, arbor block assembly 1000 retracts in an arc and, therefore, will move toward and away from the rear edge of alignment bracket 1220 when it retracts and is reset. Retraction of the motor and arbor block assembly can involve significant forces, so alignment block 1234 is made from 30 percent glass filled nylon in order to be strong enough to accommodate the forces involved in retraction.

As described above, elevation shaft 816 supports the weight of arbor block assembly 1000. However, a substantial amount of force applied to the elevation shaft could cause it to bend, for example, if the saw was dropped on its front or rear edge. It can be seen in at least FIG. 89 that a bolt 1250 is provided on gearbox 1002 just below alignment block 1234. A nut 1252 is placed on bolt 1250 before it is threaded into the arbor block, so the position of the bolt can be adjusted until the head of the bolt is almost touching the rear edge of alignment bracket 1220. If saw 10 is dropped or some other force pushes the arbor block assembly forward, bolt 1250 will contact the alignment bracket, thus distributing the force and preventing elevation shaft 816 from bending.

Figure 90:
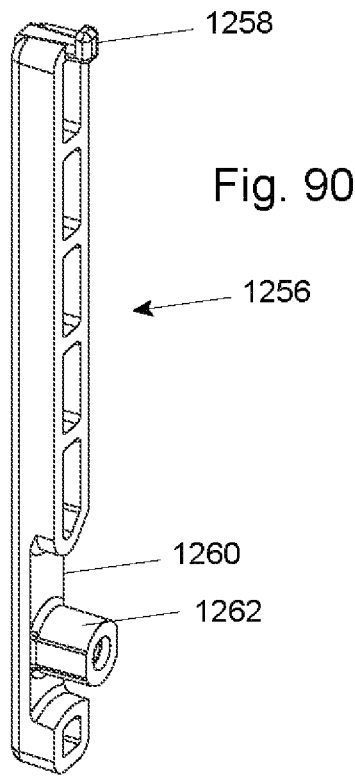
FIG. 90 shows a trunnion bar isolated.

To provide additional support for the elevation shaft, a trunnion bar 1256 may be connected to trunnion 150 behind elevation carriage 800. The trunnion bar may be seen in at least FIGS. 9 and 85, and it is shown isolated in FIG. 90. The trunnion bar may be made from any suitable material, such as plastic, and it may be provided along the length of the elevation carriage's travel, extending close to, but ideally not touching, the elevation carriage. A hook section 1258 extends from the top of the trunnion bar and fits in a hole 196 in trunnion 150. The base of the trunnion bar includes a cutout 1260 with a projection 1262, which is configured to fit in hole 192 in trunnion 150. A washer 1266 is disposed around the projection, and a bolt 1264 extends through hole 192 in the trunnion and threads into the projection to secure the projection to the trunnion. The hook at the top of the bar holds the top against the trunnion and prevents the bar from rotating around bolt 1264. In the event of a substantial rearward force on the internal mechanism of the saw, even if elevation shaft 816 flexed slightly backward, the rear edge of elevation carriage 800 would contact trunnion bar 1256, thus spreading the force throughout the saw.

In the depicted embodiment, the arbor and motor are designed to pivot down to retract the blade and thereby help mitigate injury in the event a user accidentally contacts the spinning blade. More specifically, table saw 10 includes an active injury mitigation system designed to stop and retract the blade in the event of an accident where a person contacts the spinning blade. The system includes a brake cartridge 1124 positioned adjacent the blade, as shown in FIG. 169. Upon detection of contact, brake cartridge 1124 will engage and stop the blade to minimize any injury, and in doing so, cause the blade to drop or retract until the arbor block assembly contacts a rubber bumper or stop 1270 mounted on the trunnion, shown in at least FIG. 9. The rubber bumper 1270 is attached to a metal bumper mount 1272, which is in turn attached to bottom section 156 of trunnion 150 by screws passing through holes in metal bumper mount 1272 and holes 180 in the trunnion.

Table saws are typically started and stopped by a user flipping or triggering some type of switch on the saw. Such switches should be designed and positioned so they are easy and intuitive to use, but also so they are protected and so they can be repaired or replaced easily, if necessary. A switchbox having these characteristics is shown at 1280 in FIG. 1. Switchbox 1280 switches power to motor 16 and, in the depicted embodiment, motor 16 is a direct drive universal motor. The switchbox is mounted to in hole 72 in front panel 56 of support structure 14, and it includes switches used to turn the saw on and off and to perform other functions. The switchbox is shown isolated in FIG. 91, and it includes a main body 1282, a start/stop button 1284, an on/off switch 1286, a bypass switch 1288, and a plurality of LEDs 1290.

An insert 20 fits into an opening in table 12. The opening is sometimes called a "throat" or "blade opening" and the insert is sometimes called a "throat plate." The opening is typically large enough for a user to perform some types of service or maintenance to the saw through the opening, such as changing the blade. An opening in the table around the blade, however, means the table cannot support a workpiece next to the blade, so the insert is placed in the opening around the blade to support a workpiece adjacent the blade. As seen in FIG. 1, insert 20 fits in opening 24 in table 12. The insert includes a slot or channel 22 through which the blade extends. The insert is removable so a user can access internal components of the saw through the blade opening (for example, a user can remove the insert to change the blade, to access the mount for a riving knife or spreader, or to change out a cartridge used in an active injury mitigation system). In the depicted exemplary embodiment, insert 20 and corresponding opening 24 are generally rectangular in shape. This allows the throat plate opening to extend closer to the edges of the table, thus increasing the capacity of the hole and the accessibility of the internal components of the saw. The perimeter of insert 20 is shaped to closely fit within opening 24, and the insert is designed to be coplanar, or nearly coplanar, with the work surface so that a work piece may slide smoothly across the table and insert without interference and without shifting. It is advantageous to make the top surface of the insert generally flat and planar, in order to provide a smooth, continuous surface.

Figure 6:
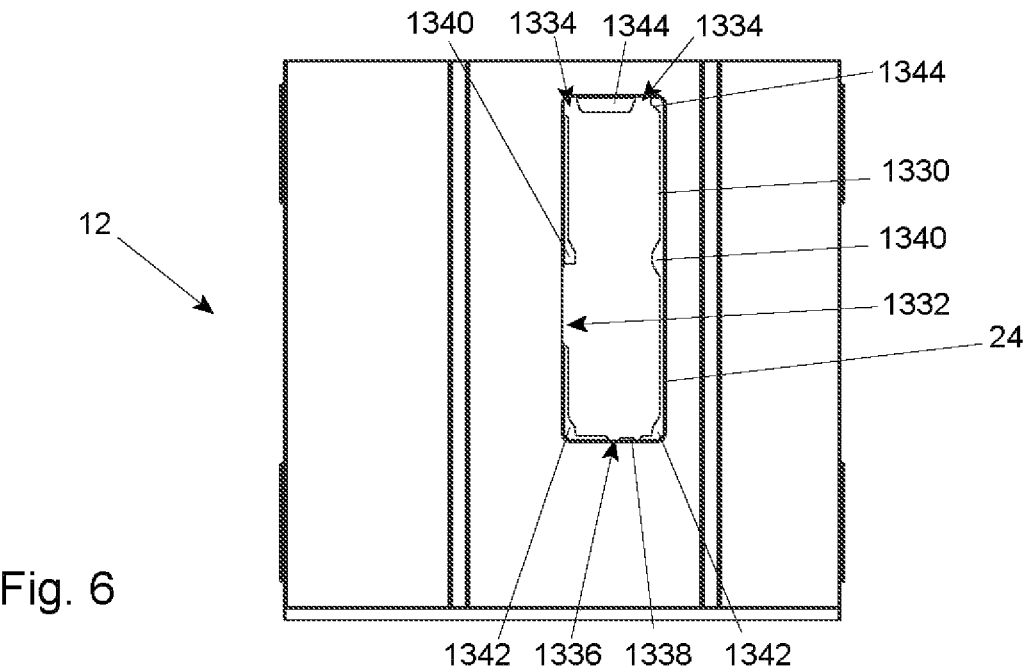
FIG. 6 shows a top view of a table.
Figure 7:
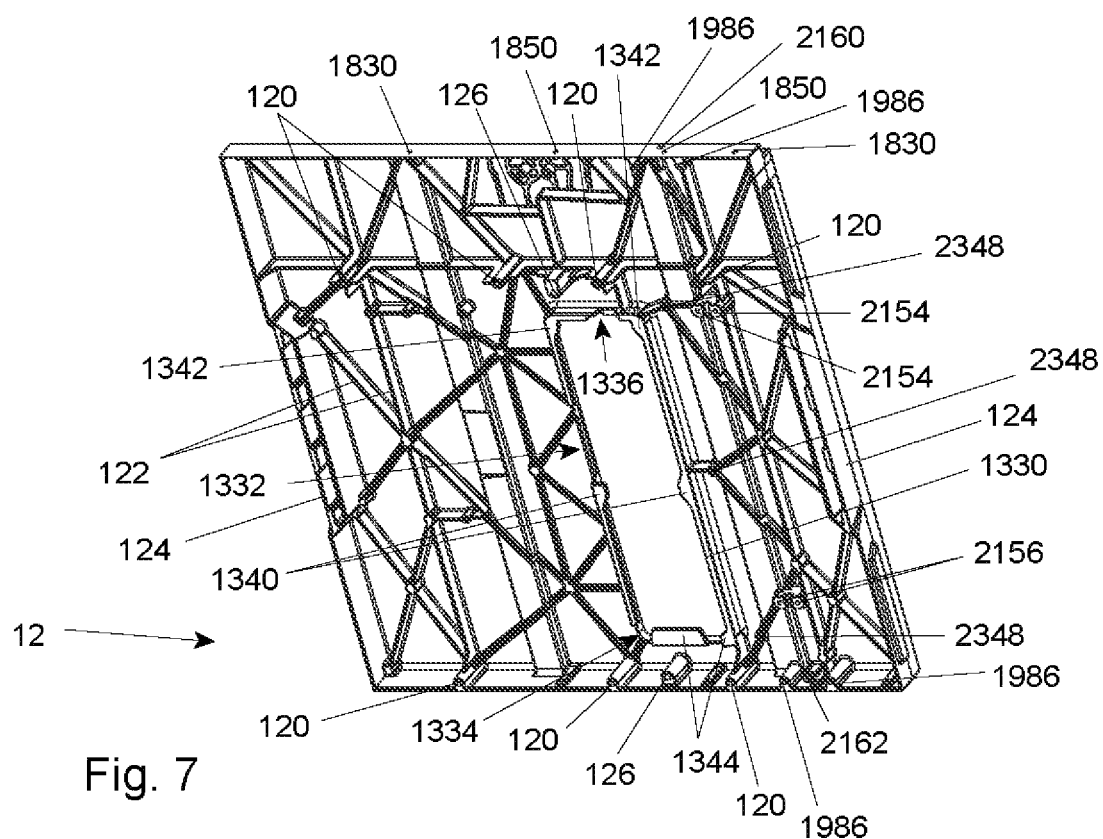
FIG. 7 shows a bottom view of the table of FIG. 6.

The table, which is shown isolated in FIGS. 6 and 7, includes the opening 24 with a plurality of support surfaces, which may be thought of as ledges, tabs, or support tabs, extending a short distance into opening 24 from the underside of the edge of the opening. These support surfaces provide fixed reference points for adjustable screws in the underside of the insert, as will be discussed. In the presently disclosed embodiment, a narrow ledge 1330 extends around most of the periphery of opening 24, with a large gap 1332 on the left side, which provides clearance for the motor and other components. Two gaps 1334 in ledge 1330 are provided along its rear edge, to provide clearance for tabs 1404 on the rear edge of the insert. A gap 1336 is positioned at the front of narrow ledge 1330, to provide clearance for a locking mechanism 1460 to secure the front edge of the insert, as will be discussed. A tab 1338, which is positioned closer to the top of table 12 than the other tabs, extends within gap 1336. Two tabs 1340 extend from opposite sides of opening 24, near the middle of the opening, and two tabs 1342 extend near the front of the opening. Two additional support tabs 1344 are positioned at the rear edge of the opening, alternating with gaps 1334. Tabs 1340, 1342, and 1344 support insert 20 during normal use when the insert is installed in the saw. The position of the insert relative to table 12 can then be adjusted by turning a set of four screws 1400, which thread through holes in the insert and rest on tabs 1340 and 1342. One or more set screws 1402 can be threaded into hole(s) in the rear of the insert and adjusted to contact tabs 1344 at the rear of opening 24. Set screw 1402 is used to provide support for what would otherwise be an unsupported corner 1412 of the insert, in order to prevent corner 1412 from bending or moving down during use. It is important that the rear edge of the insert not be substantially lower than the table, because a work piece could catch on any edge or corner formed between the insert and table.

The rear of the insert can be held down and/or locked in place in many ways. In the depicted embodiment, tabs 1404 (labeled in FIG. 93) extend from the rear of the insert and fit under the ledges formed by gaps 1334. The overlap locks down the rear of the insert and prevents the rear of the insert from rising up. The front of the insert is held in place by a mechanical locking mechanism in the form of a sliding lock member actuated by a lever or tab.

FIGS. 96-100 show a mechanism to hold down the front of an insert that is simple to operate and that does not require a tool to install, lock, unlock, or remove. FIGS. 92 and 93 show the top of insert 20 with the hold-down mechanism installed therein. The insert includes an opening or indentation 1414 sized to accommodate both the hold-down mechanism and a user's finger. In the depicted embodiment, a finger lever 1462 is configured to be pulled toward the front of the saw to release the insert from the blade opening because pulling the lever in that direction is a convenient, intuitive movement when a finger is inserted into indentation 1414. Finger lever 1462 is shown actuated (angled up) in FIG. 93, and un-actuated (generally horizontal) in FIG. 92. An additional benefit of the configuration of finger lever 1462 is that, should a user forget to press the lever back down to lock the insert in place, a piece of wood or other material to be cut would pass across finger lever 1462 and push it down into the un-actuated, locked position.

FIGS. 96-100 show hold-down mechanism 1460 isolated from insert 20. Finger lever 1462 bends down and becomes a plurality of lock teeth 1464, and a dowel portion 1466 is interposed between lever portion 1462 and lock teeth 1464. Lock teeth 1464 fit into a plurality of generally rectangular openings 1468 in a lock block 1470. Lock block 1470 is connected to the bottom of insert 20 by a screw 1472, which passes through a washer 1474 and into a portion of insert 20 which extends down into an elongated opening 1476 in lock block 1470. The downward extension of insert 20 allows for translation of lock block 1470 in the forward and backward directions, but not sideways or vertically.

When finger lever 1462 is pushed down into indentation 1414, lock teeth 1464 push lock block 1470 toward the front of the saw, and front edge 1478 of said lock block 1470 overlaps with corresponding ledge 1330 on table 12, as shown in FIG. 100. Lock teeth 1464 engage with rectangular openings 1468 in lock block 1470 and function like a rack and pinion gear to move lock block 1470 forward and backward. The interaction between lock teeth 1464 and lock block 1470 can be seen in FIG. 99, which shows a cross section of FIG. 98 along the line A-A in FIG. 98. This prevents the front of insert 20 from rising up during use. In order to remove the insert, a user would place a finger into indentation 1414 and pull finger lever 1462 up toward the front of the saw. This would cause front the edge 1478 to retract and cease to be in contact with table 12. The user could then lift the front of insert 20 out of opening 24, slide tabs 1404 out of contact with the table, and remove the insert from opening 24.

The hold-down mechanism depicted in FIGS. 96-100 includes a two-position detent 1480 on each side of lock block 1470. The detents fit into two indentations 1420 on each side of insert 20, two of which are labeled in FIG. 100. The engagement between the detents 1480 on lock block 1470 and the indentations 1420 in insert 20 (labeled in FIG. 100) prevents the hold-down mechanism from moving unexpectedly between the locked and unlocked positions.

As shown in FIGS. 92-95, insert 20 has a slot 22, which runs from a wider opening 1408 at the rear of the insert to near the front. The insert depicted in FIGS. 92-95 is a zero-clearance insert, so slot 22 is cut by the blade, as is known in the art. Slot 22 connects with opening 1408 at the rear of the slot (the rear of the slot is the portion of the slot furthest away from the front of the table saw when the insert is in the blade opening). Opening 22 allows room for a riving knife 28 or splitter to extend up through the insert, as shown in FIG. 1. Wear plates, such as wear plates 1406 (labeled in FIG. 93) can be provided on insert 20 to provide a surface for anti-kickback pawls to rest against. Anti-kickback pawls are generally made from metal, and are usually biased down toward the insert, which can lead to scratches or dents in the insert. The wear plates provide a hard surface for the pawls to contact, in order to protect the rest of the insert.

Inserts as described herein, when used in a saw having active injury mitigation technology, can be made of phenolic, wood, or plastic. Such materials are non-conductive, which is preferable for active injury mitigations systems, but phenolic and wood are both relatively expensive. In the presently disclosed embodiment, insert 20 is made from plastic, such as glass filled nylon or glass filled ABS. Plastic is lighter and less expensive than phenolic or wood, but it is more prone to bending or warping, since it is not as rigid. Insufficient rigidity of the insert, particularly in the region adjacent the blade, can lead to a dangerous situation for a user. Pressure is often applied both to push the work piece down and forward. However, such force, particularly when applied to a small or narrow work piece, can cause the insert to warp or bend down. This, in turn, could allow a work piece to kick back toward a user, presenting a safety hazard. To address this issue, the underside of the insert can be provided with ribs, such as ribs 1422 (labeled in FIG. 95). Since the edges of the insert are supported by screws 1400 and 1402 resting on tabs 1340, 1342, and 1344, an edge 1424 on the right side of blade slot 22 is the least-supported section of the insert, and therefore the most prone to bending or deflecting. Thus, it can be advantageous to provide an extra rib or other support structure along edge 1424, in order to provide additional strength and rigidity in that area. Such a support structure may be thought of as a reinforcement, and such a structure will prevent the unsupported section of the insert from moving substantially down when the weight of a workpiece is on that section.

Figure 112:
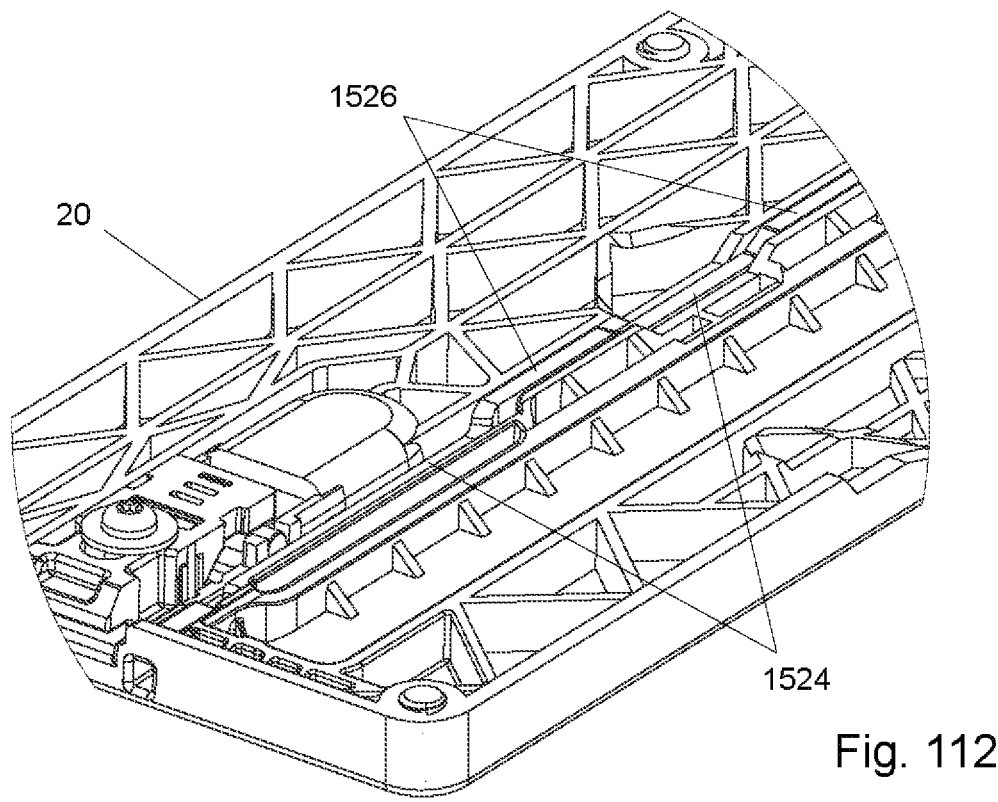
FIG. 112 shows a detail view of the underside of the insert and rib of FIGS. 110 and 111.

A rigid member can be provided along edge 1424, to increase the rigidity of the insert, as can be seen in at least FIG. 94. The rigid member 1440 may also be thought of as a bar, a support structure, a support surface, a rod, or a reinforcement member. Bar 1440 is shown isolated in FIGS. 101 and 102, and an alternate bar 1520 is shown isolated in FIG. 110. Both bars are shaped generally like an elongate, narrow rectangle, which extends almost the full length of the insert. A bent section or offset portion 1522 may be positioned near one end of exemplary bar 1520, as shown in FIGS. 110-112. In such an embodiment, bar 1520 may be thought of as being curved away from the blade. This allows the bar to be taller in some areas, and therefore stronger, which provides additional support for the insert. Bar 1520 includes two shorter sections 1524 and two taller sections 1526, which are perhaps most clearly shown in FIG. 112, which shows a sectional view of the underside of an insert 20 with bar 1520 installed therein. The first shorter section 1524 extends close to the blade, so it must be relatively short in order to avoid contacting the blade. The second shorter section 1524 is positioned near the middle of the bar to provide clearance for the arbor, motor, and other components. A short projection 1442 is disposed at one end of each bar, a longer projection 1446 is positioned at the other end of each bar, and a small detent notch 1448 can be provided on the side of the bar which contacts the underside of the insert, as with bar 1440. Bar 1440 is shown installed in insert 20 in at least FIGS. 94 and 95.

Figure 103:
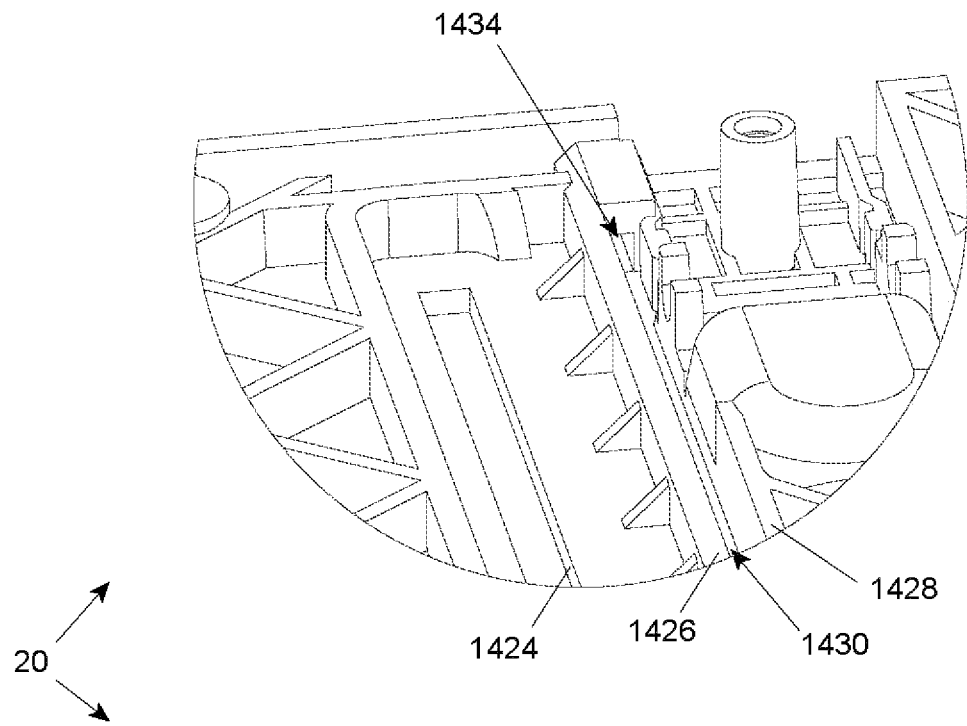
FIG. 103 shows a detail view of the underside of the insert of FIG. 92.
Figure 104:
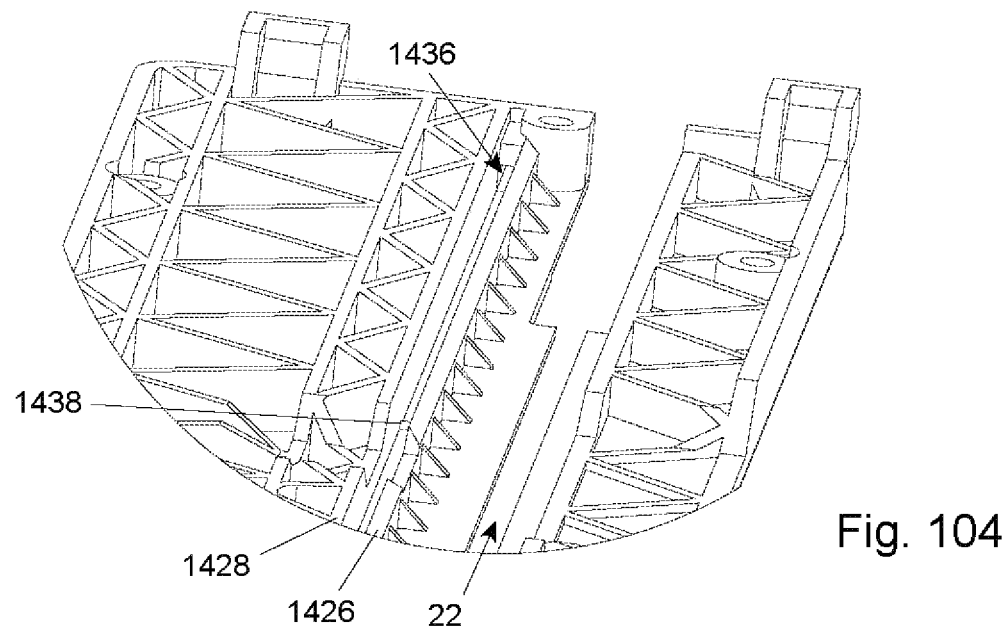
FIG. 104 shows another detail view of the underside of the insert of FIG. 92.

The bottom surface of the insert includes ribs to provide structural rigidity, such as ribs 1422 identified in FIG. 95. The ribs extend in different directions to provide rigidity both across the width of the insert and along the length of the insert. Some sections of the insert may not have ribs in order to provide clearance for components of the table saw, such as an arbor block or riving knife mount, which can extend close to the bottom of the insert when the blade is raised to its full elevation and/or tilted. Additionally, an elongate section in the center of the insert does not have ribs in order to provide an area for blade opening 22. Ribs in a table insert can have varying heights, as seen in FIG. 95, to provide clearance or extra rigidity. Two elongate ribs 1426 and 1428 extend most of the length of the insert, to the right side of blade slot 22, defining an opening 1430 therebetween (labeled in FIG. 103). The ribs include shorter regions 1432, which align with elongate notch 1444 or short section 1524 in bars 1440 or 1520, respectively. The front edges of ribs 1426 and 1428 are connected, to form a front hollow region, opening, or pocket 1434. The rear edges of the two ribs are similarly connected, forming a rear pocket 1436. The ends of bars 1440 or 1520 fit within and overlap with pockets 1436 and 1438, securing the bar to the insert. When force is applied to the top of the insert, it could normally cause the middle section to flex or deflect down. The bars provide a support surface to contact the underside of the insert, so force applied to the top of the insert is distributed along the length of the bar, the ends of which are supported by pockets 1434 and 1436. Either bar can be configured so it always contacts the underside of the insert (the "top" of opening 1430), so it sits just below the underside of the insert, allowing a very slight amount of flex before the insert contacts the bar, or the bar can be configured to contact the insert at intermittent points along the length of opening 1430. It is advantageous to position the rigid member so it is as close to as possible, or touching, the underside of the insert, in order to minimize any flex or give in the top plane of the insert. A small detent bump 1438 (labeled in FIG. 104) can extend between ribs 1426 and 1428, and it is configured to interact with the optional notch 1448 in the bar, in order to prevent the bar from sliding forward or backward once it is installed in the insert. It will be appreciated that pockets 1434 and 1436 could be replaced by brackets connected to the insert or some other method of attachment.

The bar is installed in insert 20 by inserting projection 1442 into rear pocket 1436 with the bar held at an angle relative to the insert (i.e. 30 degrees), sliding the bar further into the pocket and through hole 1416 (labeled in FIGS. 93 and 95), lowering the bar into opening 1430, and sliding it forward, so projection 1446 fits within front pocket 1434. Hole 1416 in the rear of the insert provides clearance for the bar to be moved far enough back that front projection 1446 clears the edge of front pocket 1434. In this position, the projections are both trapped within the pockets. The bar tends to be stable in this position, but it is advantageous to provide detent 1438 and detent notch 1448 to prevent the bar from shifting. Additionally, when insert 20 is installed in the table saw, the perimeter of the insert fits closely within opening 24 in the table, which does not leave clearance for projection 1442 to extend out of hole 1416 in the insert.

A semicircular cutout 1450 can also be provided on the bar, extending partially into or all the way through the bar. Cutout 1450 provides clearance for dowel portion 1466 of the locking mechanism, if the dowel portion is configured to extend beyond the edge of projections 1418 in the insert. The contact between cutout 1450 and dowel portion 1466 helps to hold the bar in place in the insert, as can be seen in FIGS. 94 and 95.

It can be seen in FIG. 111 that insert 20 may also be provided with an opening 1528 at what will be the front of blade slot 22 (once it is cut). This opening can help prevent chipping or other deformation as the blade cuts the front edge of the slot.

More than one rigid member can also be used to reinforce insert 20. The rigid member(s) could be arcuate or zig-zag in shape, in order to provide support along a greater width of the insert. The rigid member(s) could also be glued, screwed, or otherwise connected to the insert. In an alternate embodiment, one or more rigid members or rigid plates could be overmolded within an insert.

Figure 105:
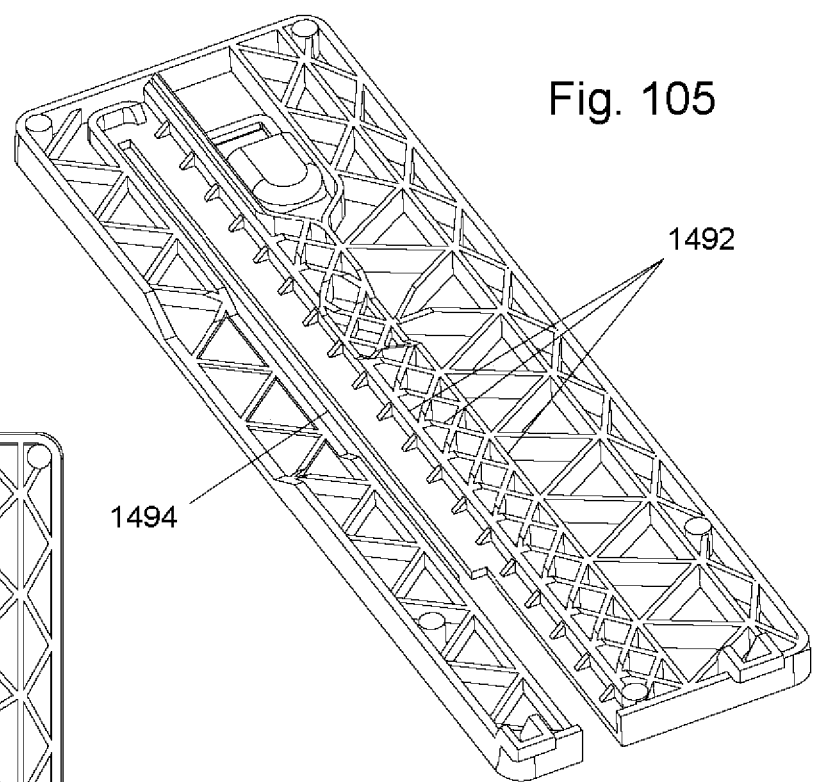
FIG. 105 shows an alternate embodiment of an insert for use with a table saw.
Figure 106:
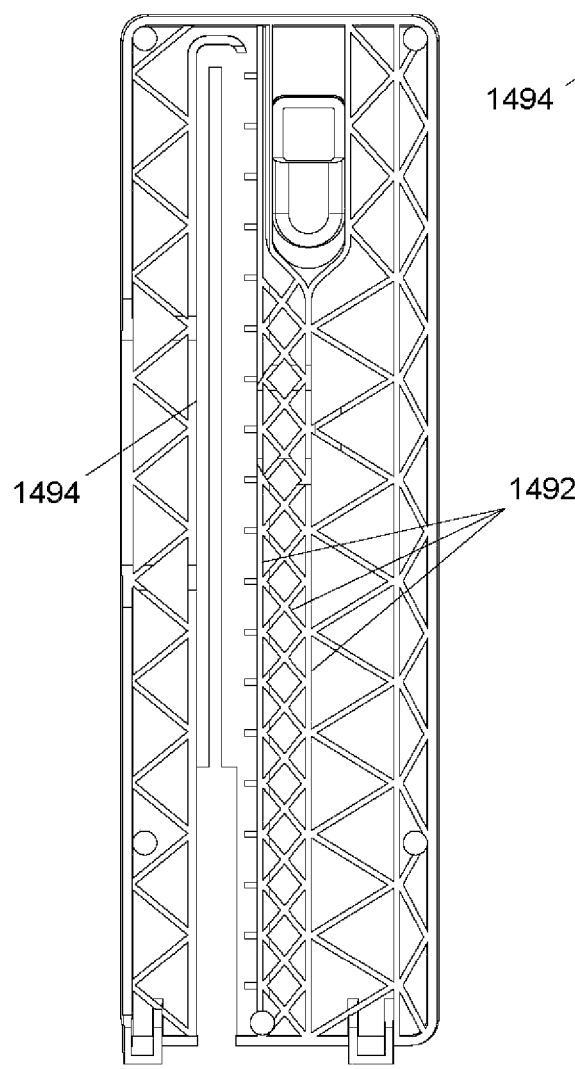
FIG. 106 shows another view of the insert of FIG. 105.

FIGS. 105 and 106 show an alternate exemplary embodiment of an insert 1490, which includes a rib or rib lattice structure 1492 extending along the right side of a blade slot 1494, in order to increase the rigidity of the insert. Rib structure 1492 can be shaped like a lattice or honeycomb, as shown in FIGS. 105 and 106, or it could be a solid, singular rib, or it could be some combination of solid and lattice areas. This configuration would be cheaper to manufacture than the previously discussed embodiments, since what may be thought of as the rigid member is integral with the rest of the insert and does not require an additional part or manufacturing step. However, a plastic rib or rib structure may not provide the desired amount of support along the length of the insert, depending on the type and thickness of the plastic used.

FIGS. 107-109 show another alternate exemplary embodiment of an insert 1500, which includes a non-integral rigid member 1502. Rigid member 1502 may be thought of as a bar, and can be formed from a generally rectangular metal bar or metal rod, bent to fit around both sides of a blade slot 1504. Bar 1502 is shown isolated in FIG. 109. It includes two long, generally straight sections 1506, connected at one end by a short section 1508. The other ends of sections 1506 bend about 90 degrees to become ends 1510. Section 1508 is sized to be long enough to keep sections 1506 close enough to the blade to provide support for the top plane of the insert, and to keep sections 1506 from contacting the blade. An elongate rib or ledge 1512, which can be, but does not have to be, integral with insert 1550, extends around blade slot 1504. Ledge 1512 extends down from the underside of the insert, and then bends about 90 degrees and extends a short distance in toward the center of the insert. A pocket or opening 1514 is thus formed between the underside of insert 1550 and ledge 1512, and bar 1502 is configured to fit within that opening. As can perhaps be most clearly seen in FIG. 107, ledge 1512 does not extend all the way to the rear edge of the insert, which provides a gap for ends 1510 of bar 1502 to fit in.

Figure 113:
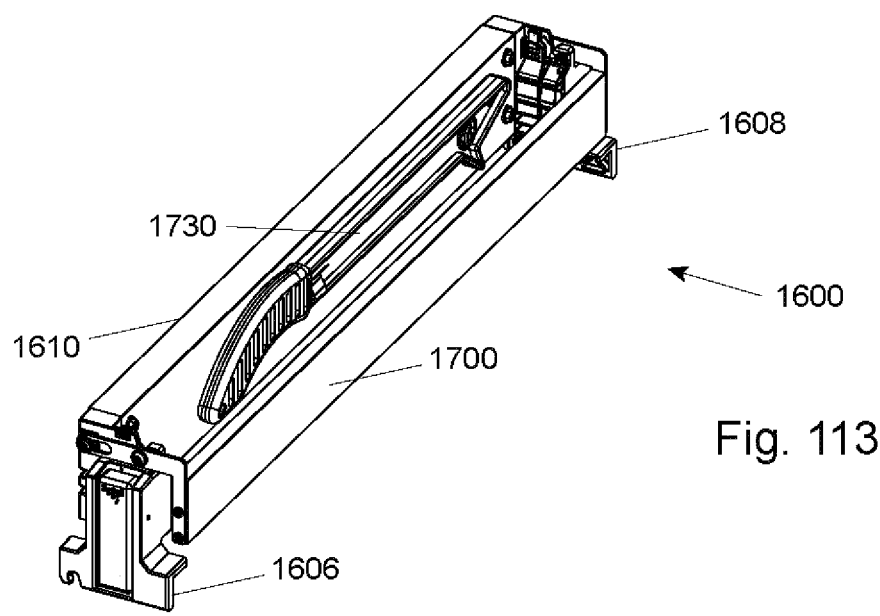
FIG. 113 shows a fence for use with a table saw.

Typically, a user of a table saw guides the work piece past the blade with a fence, such as a fence 1600 in FIGS. 1 and 113. The fence mounts to the top of the table saw and provides a fixed reference surface relative to the blade. The user can slide the work piece against and along the fence to make a cut. The fence helps keep the work piece moving in a straight path without shifting or rotating, and therefore, helps produce a straight cut. The fence can be positioned at various predetermined positions relative to the blade so that a work piece can be cut to different dimensions.

The fence typically clamps to a rail running along the front edge of the table saw, such as front rail 1602 in FIG. 1. The fence can be configured to be locked or clamped at discrete, predetermined locations along the front and rear rails. Alternatively, the fence can be configured to be locked or clamped anywhere along the rail, if desired. In the presently disclosed invention, the fence can be clamped at any desired location, but indexable positions are also provided. The fence may also rest on or clamp to a rail running along the rear of a table saw, such as rear rail 1604 in FIG. 1. Various fences are described in U.S. Pat. No. 9,757,871, titled "Fences for Table Saws," which is incorporated herein by reference. Fence 1600 is positioned on or over the top surface of table 12, and the fence extends from the front to the rear of the table. The fence is fully reversible, so it can be clamped to the front and rear rails with either end of the fence at the front of the saw. The fence may also be positioned on either side of the blade.

Figure 114:
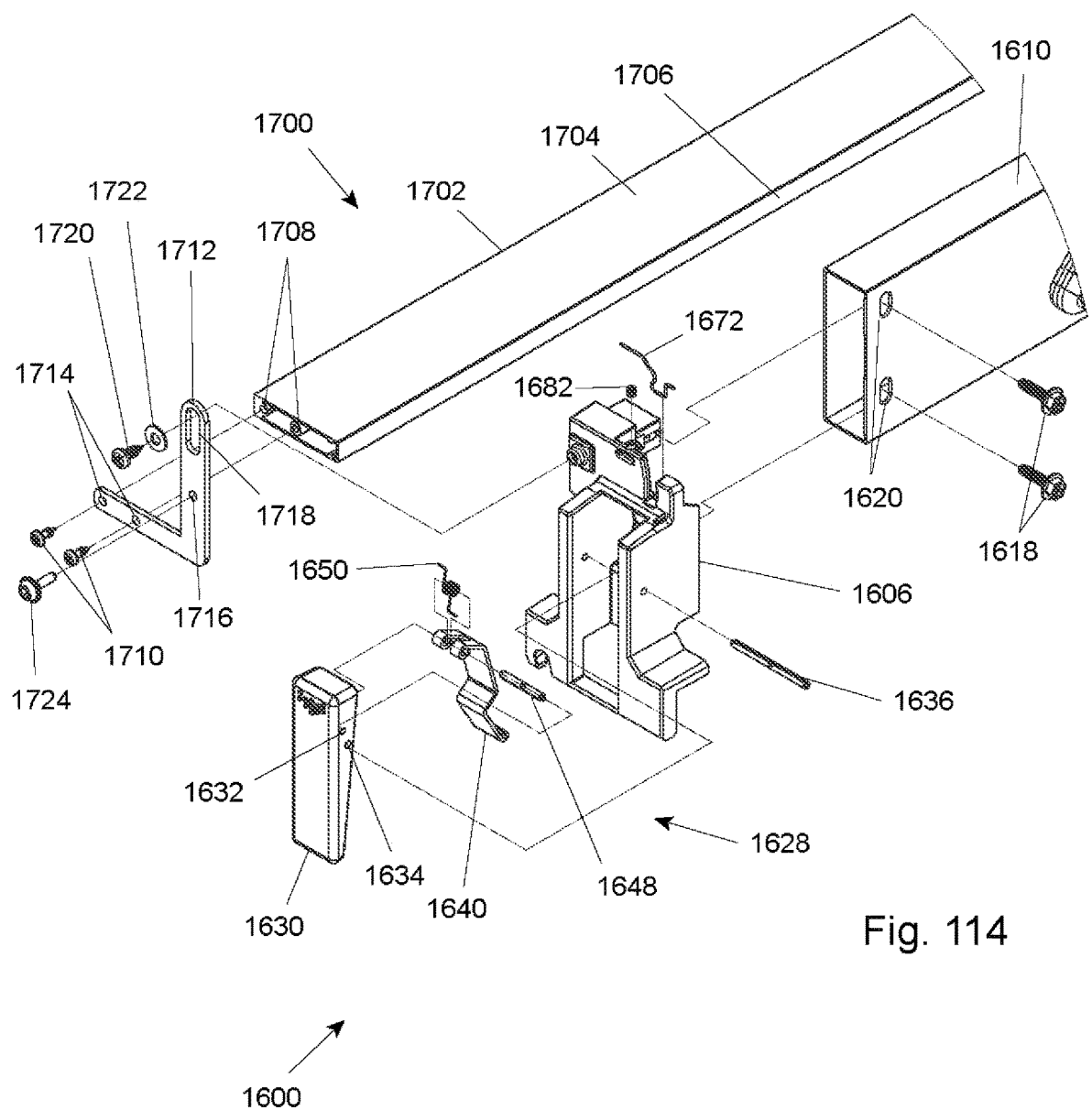
FIG. 114 shows an exploded view of the fence of FIG. 113.
Figure 115:
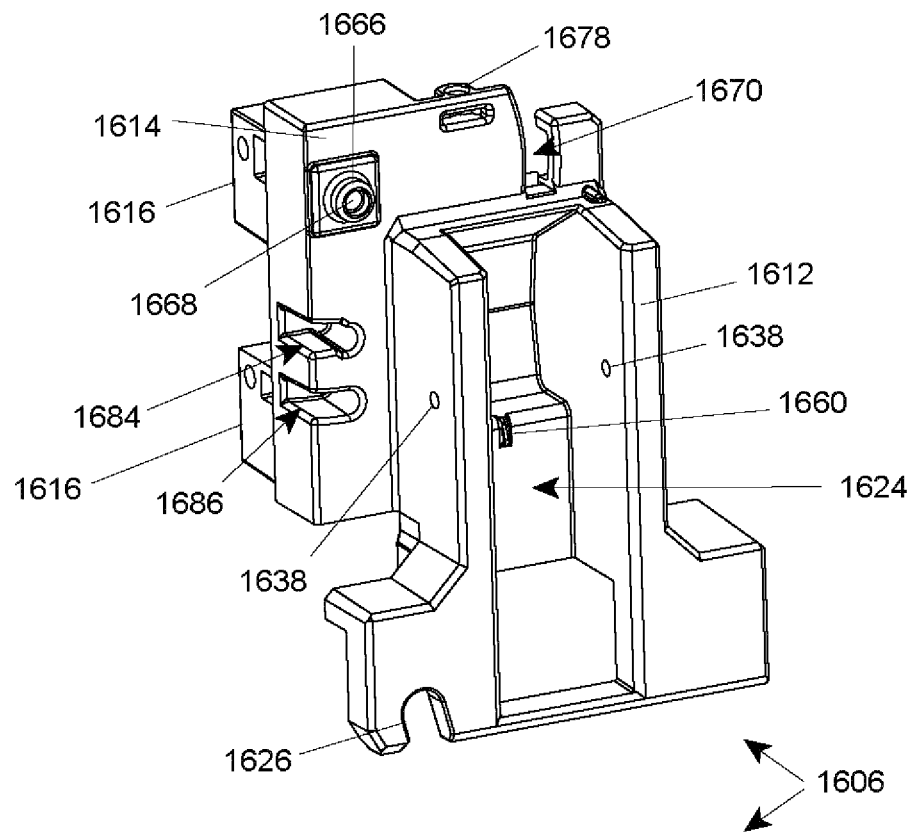
FIG. 115 shows a fence head isolated.
Figure 116:
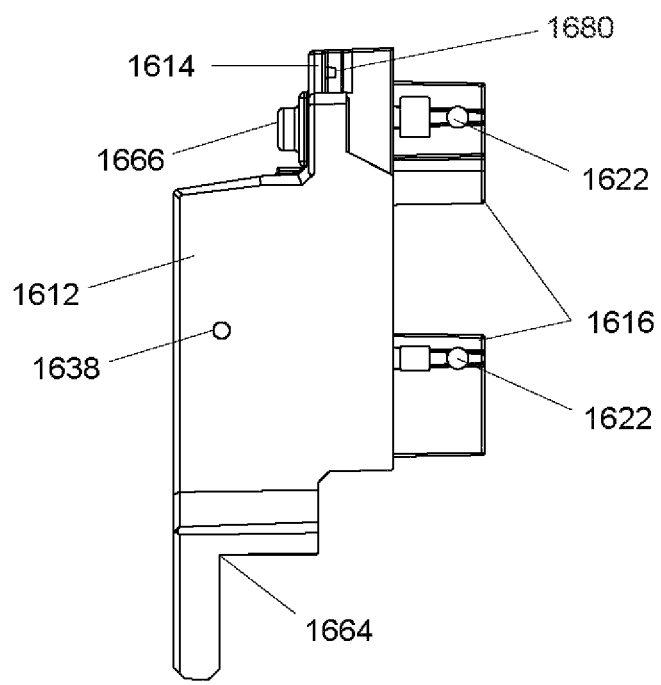
FIG. 116 shows a side view of the fence head of FIG. 115.
Figure 117:
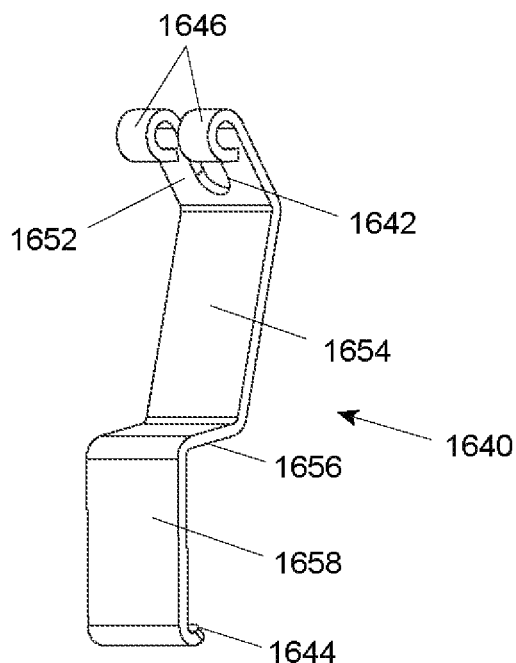
FIG. 117 shows a leaf spring isolated.

FIG. 113 shows fence assembly 1600 isolated and FIG. 114 shows an exploded view of one end of the fence. Fence 1600 is composed of a pair of fence heads 1606 and 1608 which are attached to a hollow rectangular tube 1610. In the presently disclosed embodiment, fence heads 1606 and 1608 are mirror images of one another, so only the structure of head 1606 will be described in detail, and the same reference numbers will be used to identify the corresponding parts in head 1608. Fence head 1606, which is shown isolated in FIGS. 115 and 116, includes a main section 1612, a face section 1614, and one or more projections 1616 extending from the face section. The projections 1616 fit snugly within tube 1610, and screws 1618 attach the fence head to the tube. Those screws pass through holes 1620 in the tube and then thread into holes 1622 in the projections.

A cutout 1624 in main section 1612 provides clearance for a locking mechanism or latch and allows the user of the saw to clamp and unclamp the fence on both the front and rear rails. A somewhat U-shaped notch or cutout 1626 in the bottom edge of main section 1612 fits around features in the front and rear rails, so a user can place the fence in indexed or predetermined positions relative to the rails, as will be discussed later.

Cutout 1624 surrounds a locking mechanism 1628 that allows the user of the saw to clamp and unclamp the fence to the front and rear rails. The locking mechanism consists of a locking lever 1630, which is hollow and generally rectangular in shape, with a generally triangular cross-section. The locking lever further includes a through hole 1632 near the top and front of the lever, and a through hole 1634 slightly further down, and closer to the back of the lever (both labeled in FIG. 114). A pivot spring pin 1636 (shown in FIGS. 114 and 118) fits through the through hole 1634 near the back of the lever and through a pair of holes 1638 in the fence head to attach the locking lever to the fence head in such a way that the locking lever can rotate or pivot around pin 1636. The locking lever is shaped so that it can move freely through the cutout 1624 in the fence head as the locking lever pivots.

Underneath locking lever there is a leaf spring 1640 with a U-shaped cutout 1642 in one end and a bent or hook section 1644 on the other end. The cutout defines two arms 1646, which are bent to fit around a pin 1648, and a torsion spring 1650 is disposed around pin 1648 and between the arms. The ends of the pin fit into holes 1632 in the locking lever. The torsion spring is configured to push the leaf spring away from the locking lever. Pin 1648 is flush or just sub-flush with the edges of locking lever 1630, so it does not catch on the fence head as the lever pivots about pivot pin 1636. The leaf spring 1640 includes a first bent section 1652, a first straight section 1654, a second bent section 1656, and a second straight section 1658.

Figure 119:
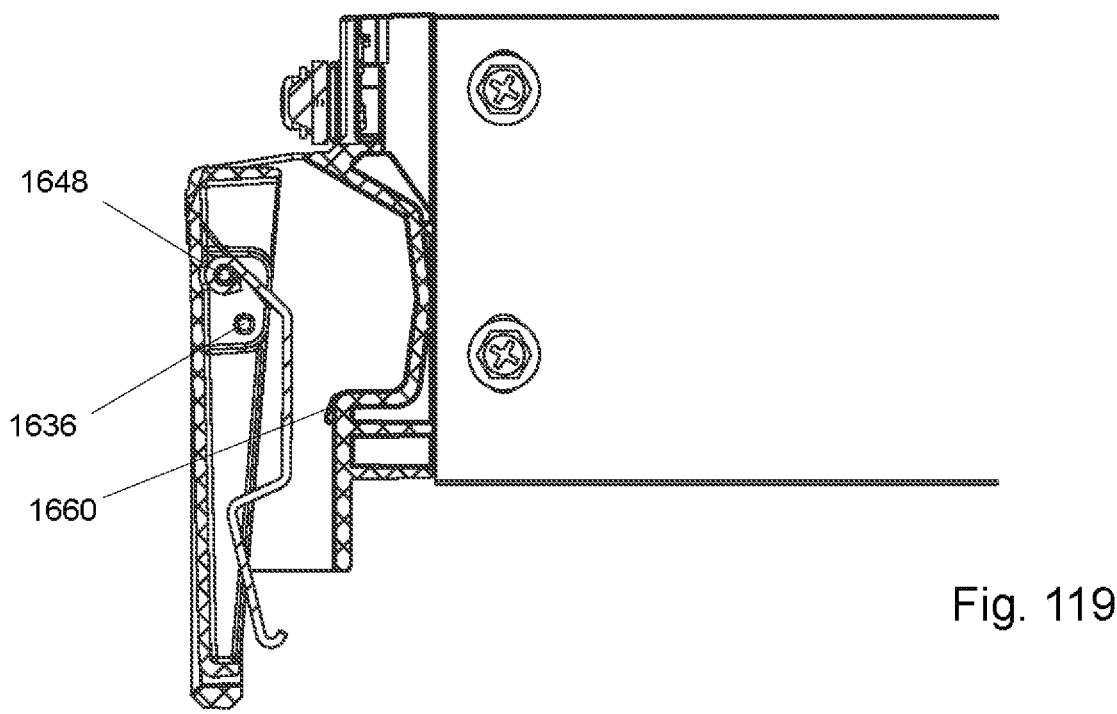
FIG. 119 shows a cross section of a locked fence head.
Figure 120:
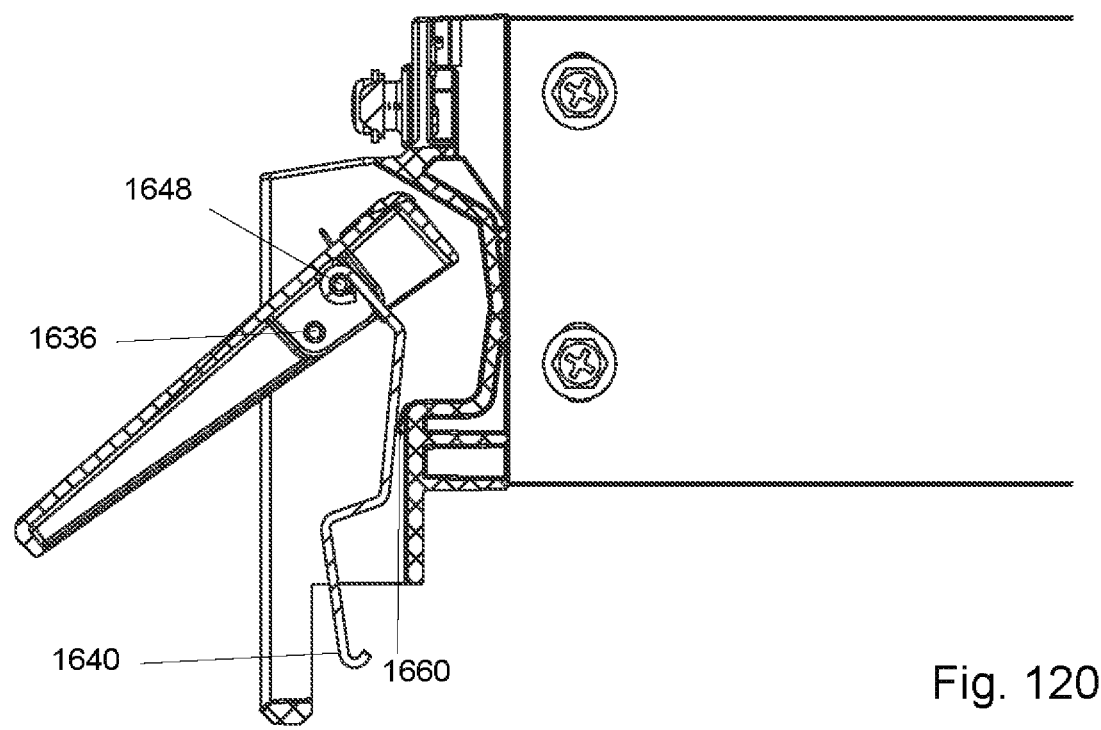
FIG. 120 shows a cross section of an unlocked fence head.

Clamp or locking mechanism 1628 enables the fence to be securely clamped or locked to the front and rear rails when the latch levers are both in a generally vertical position. FIG. 119 shows a cross section of the locking mechanism in its actuated, locked position, and FIG. 120 shows a cross section of the locking mechanism in its unactuated, unlocked position. In the locked configuration, pin 1648 is slightly further away from the main fence (this may be described slightly further forward for whichever fence head is connected to the front rail) than pivot pin 1636 so that the top of the locking lever is pushed outward (away from the fence) and the bottom of the latching lever is pushed inward and pulled up, latching around the base of, or a cutout within, front rail 1602. The locking mechanism may be thought of as an over center lock, which is biased to be stable in both the locked and unlocked positions, because the weight of spring 1640 pulls pin 1648 further down and back (relative to the position shown in FIG. 120) in the unlocked position, and the force of spring 1640 on pin 1648 tries to pull it down and forward (relative to the position shown in FIG. 119).

Figure 118:
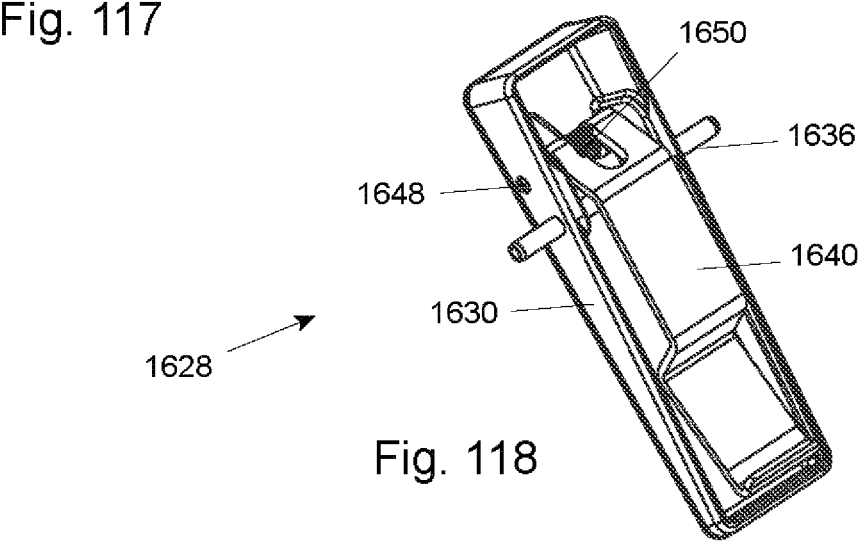
FIG. 118 shows a locking lever with a leaf spring.

Cutout 1624 in the fence head includes a surface 1660, which may be thought of as a ramp surface or a cam surface. When locking mechanism 1628 is in its unactuated, or unlocked, position, the base of locking lever 1630 extends out away from fence head 1606, until first straight section 1654 of leaf spring 1640 contacts surface 1660. In this position, pin 1648 is behind pin 1636, so torsion spring 1650 tends to bias the locking mechanism toward its unlocked position. FIG. 118 shows lock lever 1630, pivot pin 1636, leaf spring 1640, leaf spring pin 1648, and torsion spring 1650 isolated from other structures. It can be seen that the torsion spring extends between the lever and the leaf spring, pushing them apart. If the hook end of leaf spring 1640 was in the way when placing the fence on the table, a user could pull the distal end of the locking lever further up, which would cause leaf spring 1640 to slide along ramp surface 1660, which would push the spring forward, out of the way of the front or rear rail. To lock the fence in place on the rails, a user would place the fence on the rails and push the distal end of latch lever down. It can be seen in FIG. 116 that fence head 1606 includes a corner 1664 shaped to fit around the top and front (or back) of the front (or rear) rail.

Figure 121:
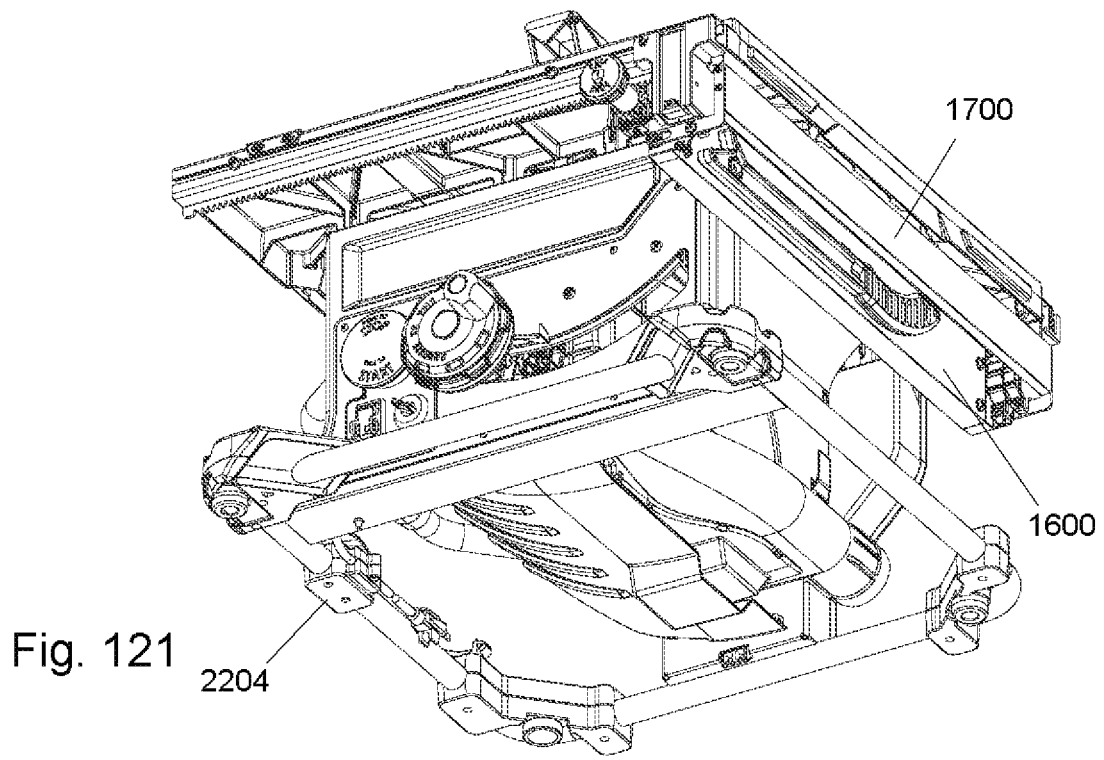
FIG. 121 shows a table saw with a fence in a storage configuration.
Figure 122:
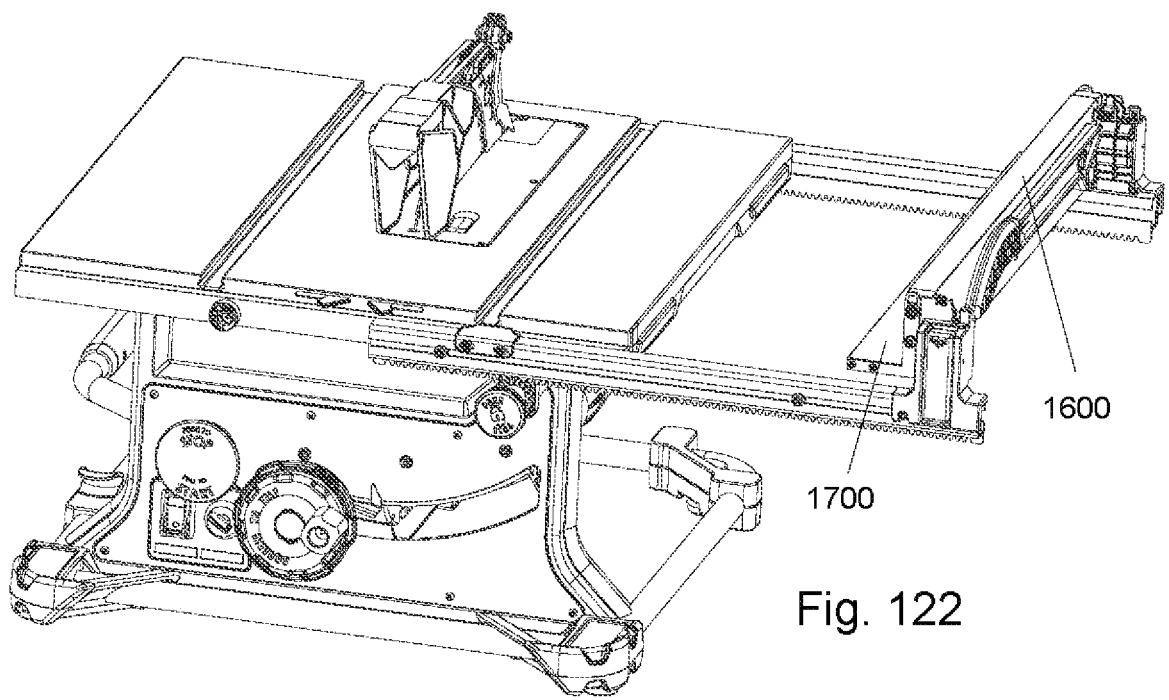
FIG. 122 shows a table saw with a fence in an extension table configuration.

During normal use of saw 10 and fence 1600, the fence would be placed on the table and secured to the front and rear rails, as shown in FIG. 1. A user would place a work piece on the table and against the flat face of tube 1610, so the workpiece could slide along the table and tube as it was pushed into and past the spinning blade. The fence may also be flipped around, so tube 1610 may be used on the left side of the blade, in which case fence head 1608 would connect to the front rail and fence head 1606 would connect to the rear rail. The fence may also be positioned in a storage position, as shown in FIG. 121, in which it would be clipped to the underside of the rails on either side of the saw. In the presently disclosed embodiment, the rails can be extended out to either the right or left side of the saw, but the rails could be configured to only extend in one direction within the scope of the invention. FIG. 122 shows table saw 10 with front rail 1602 and rear rail 1604 extending out to the right side of the saw to increase the cutting capacity of the saw. The fence includes a pivotally attached secondary fence assembly 1700, which may be thought of as a fence extension or shelf, which can be positioned as shown in FIG. 122 to function as an extension table to provide an additional support surface for work pieces when the rails are extended. FIG. 123 shows table saw 10 with the rails extending out to the left side of the saw. Fence 1600 extends between the front and rear rails and is connected to both rails. FIG. 123 shows secondary fence assembly 1700 positioned to function as a low fence for ripping thin materials, such as an exemplary workpiece 34.

Secondary fence assembly 1700 is comprised of a main section 1702, which is generally rectangular in shape, with two wide faces 1704 and two narrow faces 1706. The faces are on opposing sides, so only one face 1704 and one face 1706 are labeled in FIG. 114. The secondary fence is symmetrical in structure, so only an exploded view of the end near fence head 1606 is shown, but the components on the other end of the secondary fence are equivalent. The end of the main section includes two bosses 1708, into which a pair of screws 1710 thread to secure a fence bracket 1712 to main section 1702. A screw 1720 extends through a washer 1722, an elongate hole 1718 in the fence bracket, and threads into a hole 1668 in a boss 1666 in fence head 1606. The boss extends through the elongate opening in the fence bracket, which allows the fence bracket to move up and down and pivot relative to the boss. This allows the secondary fence assembly to be positioned in a variety of ways relative to the main fence.

Figure 124:
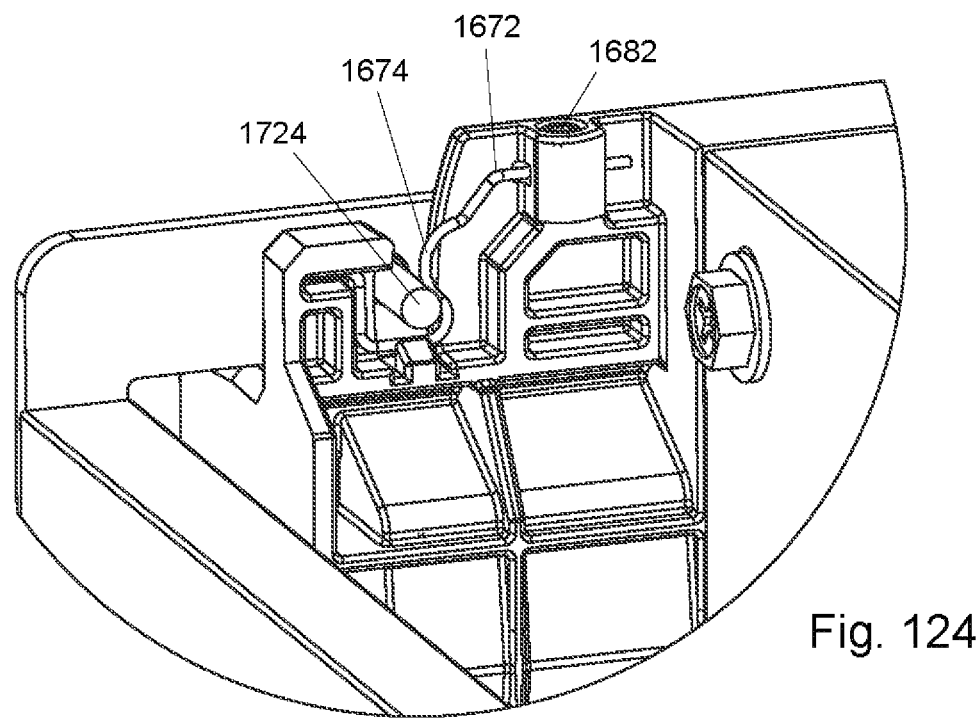
FIG. 124 shows a detail view of part of the fence of FIG. 113.

A pin 1724 is press-fit into a hole 1716 in the fence bracket, and the pins at each end of the fence are used to lock the secondary fence assembly in its various configurations. FIG. 124 shows a detail view of the interaction between pin 1724 and a spring 1672 in fence head 1606, which secures the secondary fence assembly in the position shown in FIGS. 1, 113, and 121, in which wide faces 1704 are generally parallel to the tall face of the main fence. It can be seen in FIG. 124 that spring 1672 fits within a slot 1670 in fence head 1606, and a bump 1674 in the spring presses against the top of pin 1724 when the pin is fully seated in the slot in the fence head. One end of the spring extends through a hole 1680 in a boss 1678, and a set screw 1682 is threaded into the boss to secure the end of the spring. This prevents the spring from moving out of place, and allows a user to adjust the force the spring applies to pin 1724. This would be accomplished by loosening the set screw, moving the bump in the spring closer to or further from the pin, and retightening the screw.

Fence head 1606 (and, of course head 1608) includes a pair of detent notches 1684 and 1686, which secure pin 1724 when the secondary fence structure is in either a support shelf or a low fence configuration, which are shown in FIGS. 122 and 123, respectively. When the secondary fence is placed in the low fence configuration, its wide faces 1704 are generally perpendicular to the main fence, and pin 1724 fits in detent notch 1684. This holds the secondary fence securely in place at a height slightly above the table, so the fence and secondary fence can be moved to any desired position on the table, as will be discussed. It can be seen in at least FIG. 115 that notch 1684 has a slight divot on its inner edge; this helps to hold the pin securely in place, because little to no downward pressure will be applied on the secondary fence in this configuration, since the pressure will be lateral (against narrow face 1706). A low fence may allow a user to cut thin material with greater ease, since the height of the fence is closer to the height of the workpiece in this case. In the material support shelf configuration shown in FIG. 122, wide face 1704 of the secondary fence is held parallel to, or just below, the top of table 12. In this position, pin 1724 fits in detent notch 1686 in the fence head.

A pin and/or clip may be provided on the fence to store a push stick, such as push stick 1730, shown in FIG. 113.

Typically, the length of the rail along the front of a saw determines how far the fence can be positioned from the blade, and therefore, the largest dimension that can be cut on the saw using the fence. This may be called the cutting capacity or rip capacity of the saw. Some table saws include rails sufficiently long to provide 36 inches of cutting capacity—in other words, the face of the fence nearest the blade can be positioned 36 inches away from the blade so a work piece can be cut to 36 inches wide, and the front and rear rails are long enough to support the fence in that position. Other table saws include rails with 52 inches of cutting capacity. Saws with these cutting capacities are typically stationary saws called cabinet saws or contractor saws. Smaller, portable table saws, such as jobsite or benchtop saws, typically provide anywhere from 18 inches to about 30 inches of cutting capacity.

In larger table saws, such as cabinet saws, the fence includes a wide head portion that extends down to the front rail of the saw. The head portion may then be locked to the front rail to hold the fence securely in place, or unlocked to allow the fence to slide along the front rail and table. The rear end of the fence can, but does not have to, include a component which interacts with the rear rail of the saw to increase the stability of the fence. However, the alignment between the fence and the blade is maintained primarily by the fence head or heads. This typically requires a relatively wide fence head, in order to prevent forces exerted on the sides of the fence from causing it to twist or shift when it is locked. For example, the points on the head of a typical fence head which contact the rail and stabilize the fence could be spaced apart between approximately 5 and 20 inches. The fence itself is typically between 2 and 8 inches wide, and it is generally centered on the fence head. With the fence positioned on the right side of the blade, the fence could only be shifted to the right along the rails until the right edge of the fence head came to the end of the front rail. However, this means that there are at least several inches of unusable table space, taken up by the width of the fence and the fence head. In larger table saws, which often have rails between 50 and 90 inches in length, this unusable space is not usually noticeable, since it is such a small proportion of the overall rip capacity. However, in smaller saws, such as benchtop or jobsite saws, losing even three inches of rip capacity on each side of an 18 inch table presents a significant problem.

To address this issue, smaller, portable table saws may include rails which may move or telescope out to provide increased cutting capacity. In table saw 10, front rail 1602 and rear rail 1604 are attached to table 12 in such a way that they can move to the right or to the left to provide increased cutting capacity. FIG. 122 shows table saw 10 with the front and rear rails moved or extended to the right side of the saw to increase the cutting capacity of the saw, and FIG. 123 shows the rails moved to the left side of the saw.

Figure 125:
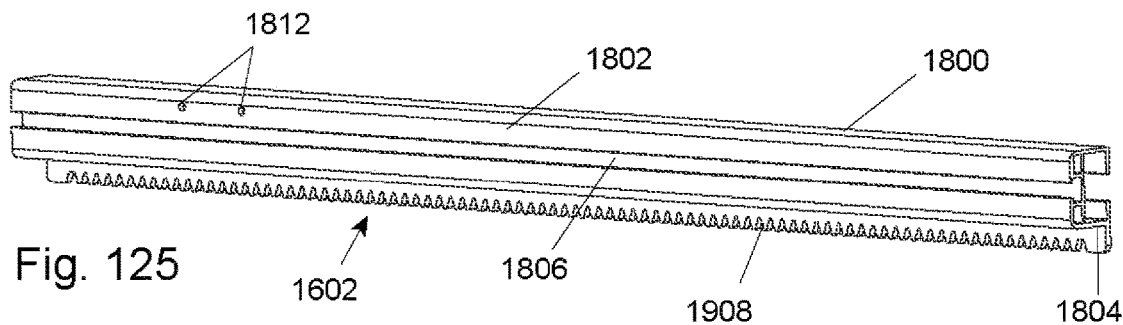
FIG. 125 shows a rail configured to be used with a table saw.
Figure 126:
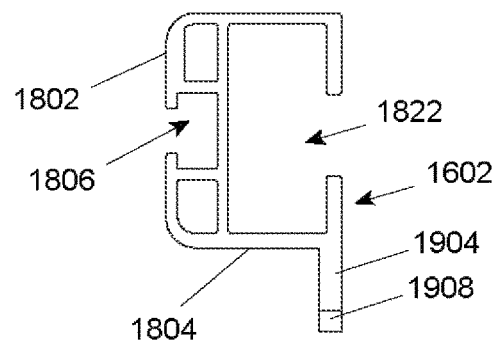
FIG. 126 shows a side view of the rail of FIG. 125.
Figure 127:
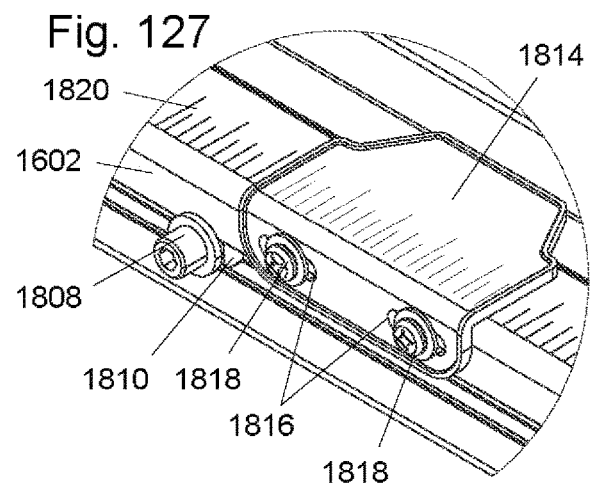
FIG. 127 shows a lens, ruler, and rail.

Front rail 1602 and rear rail 1604 are attached to table 12 in such a way that they can slide to the right or to the left to provide increased cutting capacity. The configuration of the front and rear rails and how the rails attach to the saw can vary. One example of a front rail 1602 is shown isolated in FIGS. 125 and 126. The rail is elongate and is designed so that it can be extruded out of aluminum to facilitate manufacturing. The rail includes a top edge 1800, a front edge 1802, and a bottom edge 1804. A channel 1806 extends along the front of the rail, and one or more fence indexing bolts 1808 are positioned within the channel. The fence can clamp against the top and front edges of the rail, with notches 1626 in the fence heads extending around bolts 1808 for convenient indexing, or the fence may be clamped at any desired location along the rails. Each bolt 1808 threads into a square nut 1810 within channel 1806, and, since the nuts are unable to rotate within the channel, the bolts may be secured tightly in any desired position. Thus, if a user were to commonly need to place the fence 6" from the blade, they could move a pair of bolts (one in the front rail, one in the rear rail) to the desired position, so the fence could be quickly and accurately positioned in the desired location. Two threaded holes 1812 in front rail 1602 are used to attach an indicator lens 1814, which can be used with a ruler 1820 on the front of the table to measure the position of the rails (and therefore the position of the fence) relative to the blade. The indicator lens is shaped generally like a rectangle, and it is bent about 90 degrees to fit over the front and top of the front rail. The lens includes a tab, which is configured to extend over the ruler, as can be seen in at least FIG. 127. The indicator lens attaches to the front rail by two screws 1818 which pass through elongate holes 1816 in the lens and holes 1812 in the front rail. The elongate holes can be used to adjust the position of the lens relative to the ruler, as needed. The rail also includes a large channel 1822, which is used to slidably connect the rail to the table. The configuration of the front and rear rails and how the rails attach to the saw may vary.

Figure 131:
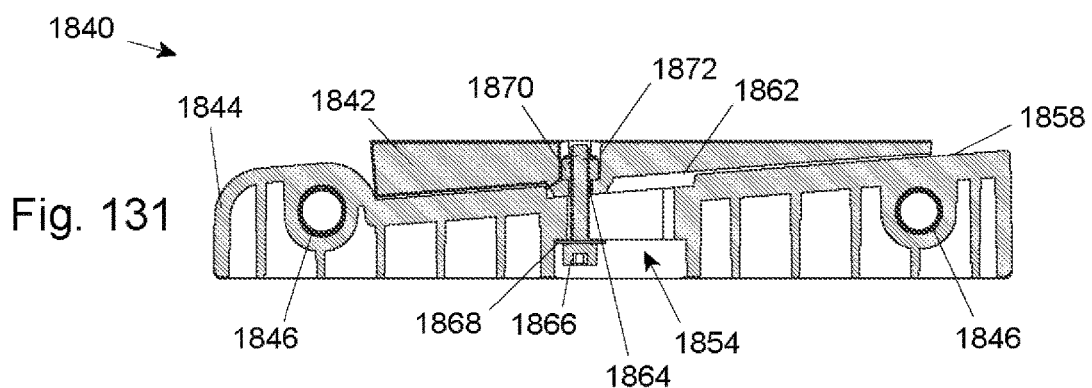
FIG. 131 shows the rail support of FIG. 130 isolated.
Figure 132:
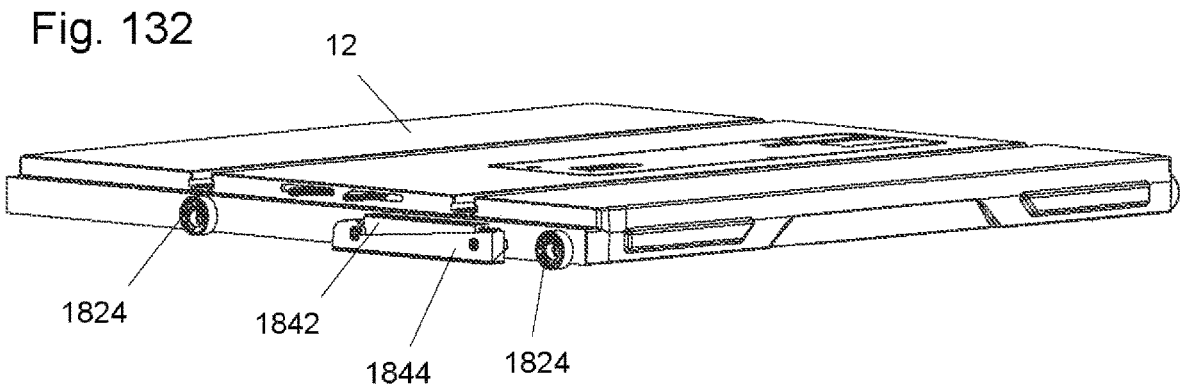
FIG. 132 shows various rail support components installed on a saw table.

In the depicted embodiment, two eccentric rail supports 1824 are attached to the front and rear edges of table 12, as shown in FIG. 132, along with an elongate rail support 1840 on each of the front and rear edges. The rail supports are shown isolated in FIGS. 128-131. In the present embodiment, one eccentric rail support 1824 is attached toward each of the right and left sides of the table, and elongate rail support 1840 is attached somewhat near the middle of the table. Channel 1822 in the support rails is shaped to fit around the rail supports, and the front and rear rails are supported along the front and rear of the table, respectively, by sliding the channel 1822 around the supports. FIG. 132 shows table 12 isolated with the rail supports connected thereto.

Figure 128:
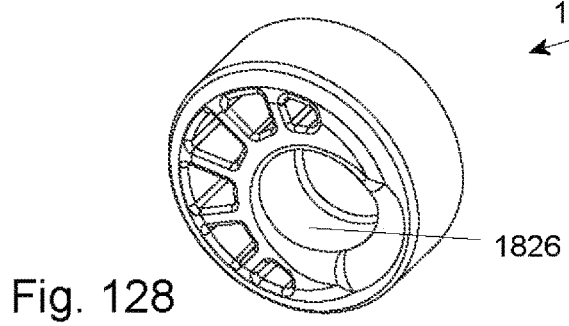
FIG. 128 shows an eccentric rail support isolated.
Figure 129:
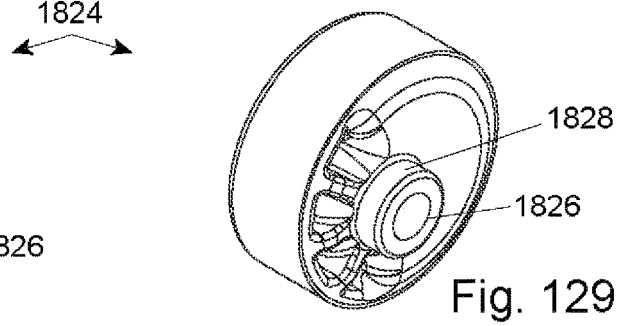
FIG. 129 shows another view of the eccentric rail support of FIG. 128.

An eccentric rail support 1824 is shown isolated in FIGS. 128 and 129. It includes an off-center through hole 1826 and a generally cylindrical extension 1828 on the rear face, which functions as an offset, providing space for the edges of channel 1822 to fit around the supports. A bolt 1832 extends through hole 1826 and a corresponding hole 1830 in the table (labeled in FIG. 7) to secure the eccentric support to the table and prevent it from rotating during use. Rail supports 1824 are eccentric so the position of the rail can be adjusted by turning the eccentric rail supports and tightening bolts 1832.

Figure 130:
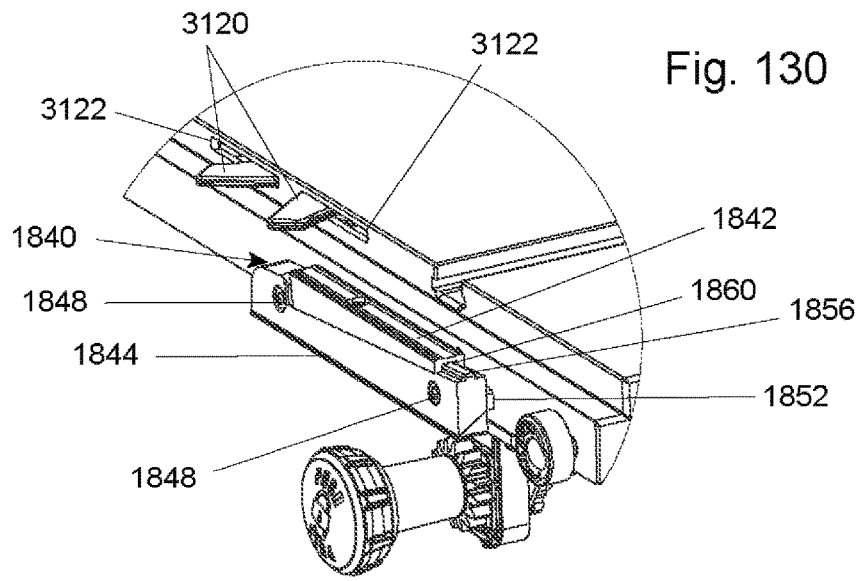
FIG. 130 shows a rail support installed on a saw table.

Elongate rail support 1840, shown isolated in FIGS. 130 and 131, is comprised of two somewhat triangular sections 1842 and 1844. The lower section 1844 includes two holes 1846, and two bolts 1848 extend through holes 1846 and thread into holes 1850 in the table, to secure the elongate rail support to the table. A spacer section 1852 extends from the lower section toward the table, and it provides space for the edges of channel 1822 to fit around the support. The base of the lower section includes an elongate adjustment hole 1854, and the top of the section includes a guide surface 1856, which extends along the middle of an angled surface 1858. A corresponding groove 1860 is provided along the bottom of upper triangular section 1842, along a complementary angled surface 1862. The guide surface 1856 and groove 1860 fit together, so the upper triangular section 1842 may be slid along the lower section 1844 without twisting, in order to increase the overall height of the support (to exert more pressure on the top and bottom of channel 1822). The positions of the upper and lower triangular sections are secured by a bolt 1866, which passes through a washer 1868, elongate hole 1854 in the lower section, a hole 1864 in the upper section, and threads into a nut 1870 disposed in the upper section, which fits within a nut-shaped hole 1872, so the nut is held from rotating. To adjust the positions of the triangular sections, a user would loosen bolt 1866 (such as with a hex wrench), slide the upper triangular section to the desired position, and retighten the bolt. It is advantageous to provide an elongate rail support in lieu of an additional eccentric rail support, because the elongate support may provide a more consistent feel for a user as they move the rails laterally, due to the increased surface area in contact with the rails.

In an alternate embodiment, rail supports 1824 and 1840 could be replaced with rail supports such as those discussed in U.S. Pat. No. 10,092,968, titled "Table Saws," which is incorporated herein by reference.

Saw 10 also includes a rear rail 1604 and a rear rail supports. In the presently depicted embodiment, the rear rail and rear rail support are identical to the front rail and front rail support structure, except the rear rail does not include holes 1812, because it does not have an indicator lens. It will be appreciated that the front and rear rails and rail support structures do not have to be identical, and that they could be configured differently within the scope of the presently disclosed invention. Rear rail 1604 is structurally the same as front rail 1602, so the same reference numbers will be used to refer to the same components, such as the top edge 1800.

Figures 133, 134:
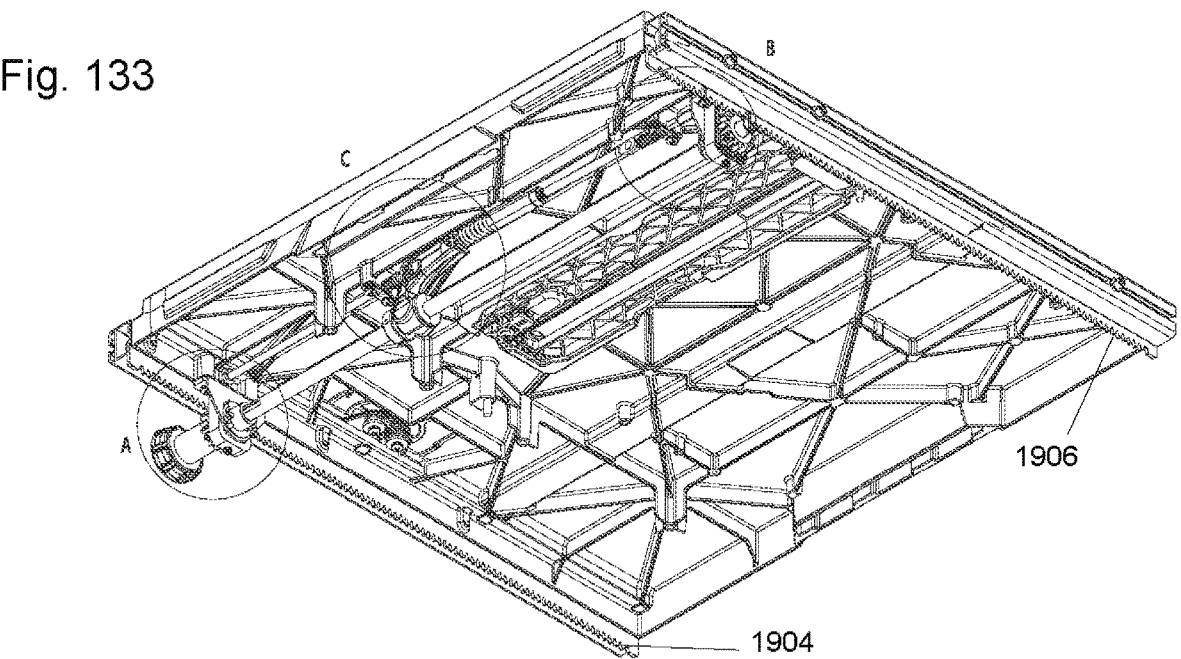
FIG. 133 shows the underside of a saw table with a rail position adjustment and locking mechanism.
FIG. 134 shows a detail view of the front section of a rail position adjustment and locking mechanism.
Figure 135:
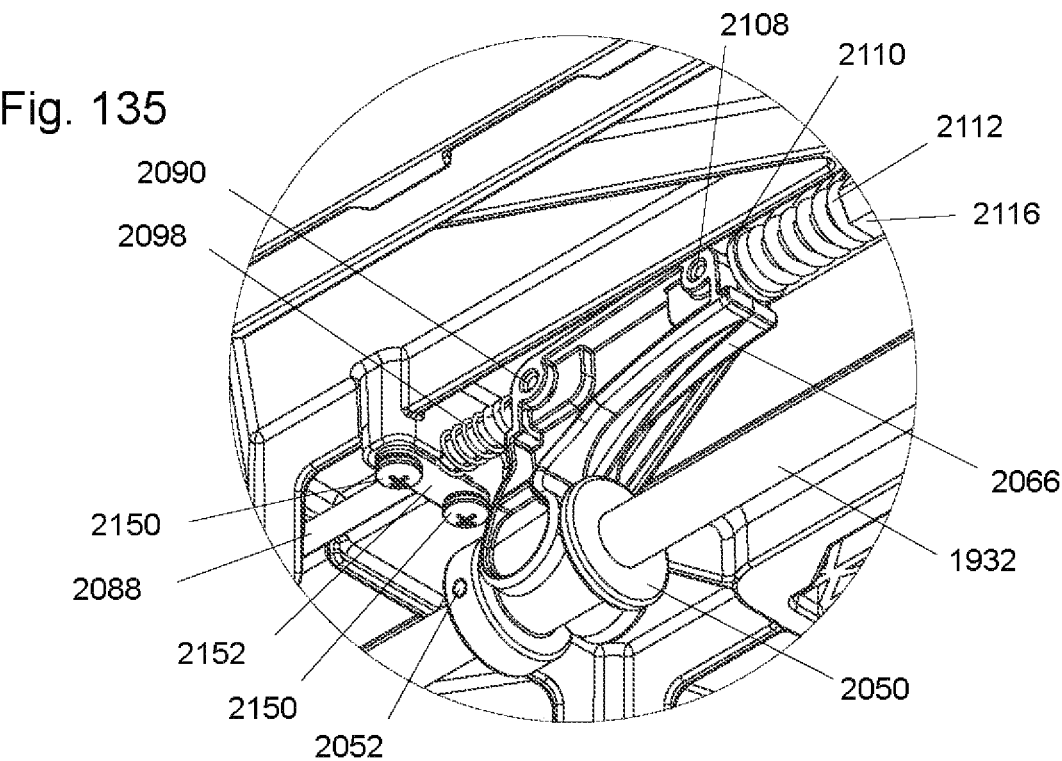
FIG. 135 shows a detail view of the middle section of a rail position adjustment and locking mechanism.
Figure 136:
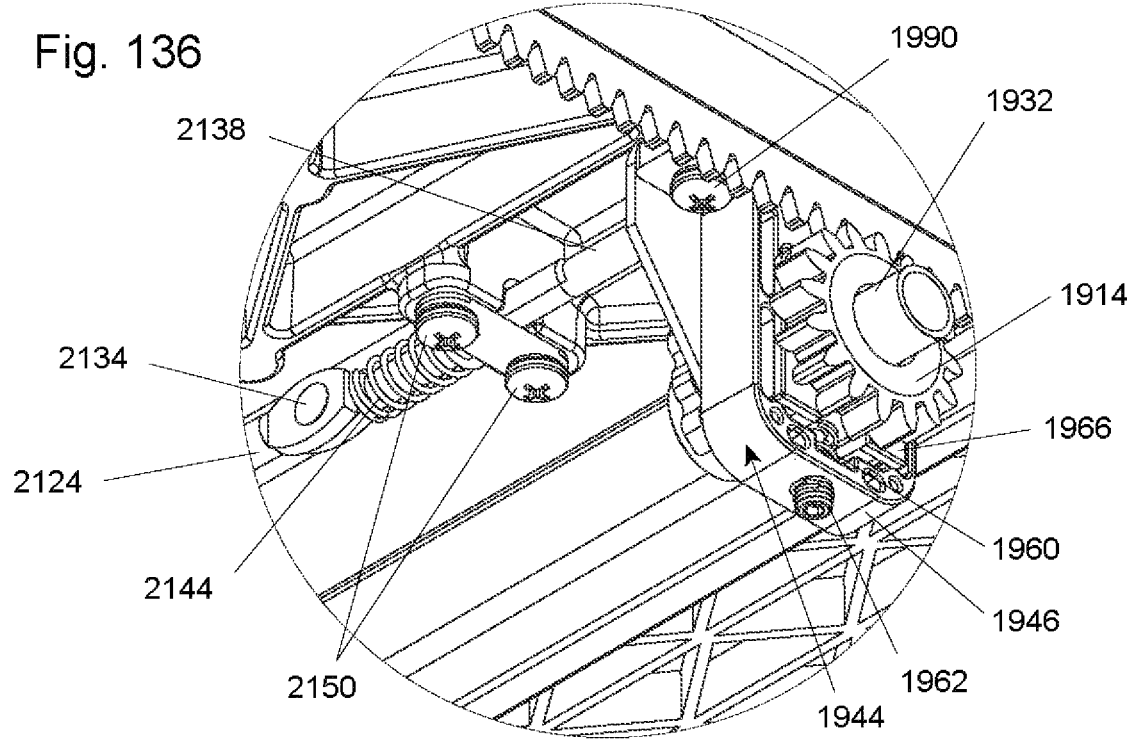
FIG. 136 shows a detail view of the rear section of a rail position adjustment and locking mechanism.

Table saw 10 is constructed so that the front and rear rails can be locked in place anywhere between the fully retracted position shown in FIG. 1 and the fully extended positions shown in FIGS. 122 and 123. This allows a user to clamp the fence to the rails, and then move the rails, using a rail adjustment mechanism 1902, to reposition the fence as needed. The front and rear rails are held in place by a locking mechanism that clamps the front and rear rails in place via friction, by locking rods which press outwardly against the front and rear rails. Since the locking mechanism 1900 and the rail adjustment mechanism 1902 are substantially integral with one another, the structures will be described together. Adjusting moveable rails in accomplished in some table saws by releasing a clamp or lever, often positioned on the side of the saw, and then using a separate handwheel or knob to move the rails. It is an advantage of the presently disclosed invention that the mechanisms for locking and moving the rails are integral with one another, so a user can unlock, move, and re-lock the rails using a single, intuitive, ergonomic mechanism. FIG. 133 shows the underside of table 12 with the locking and position adjustment mechanisms installed, and FIGS. 134-136 show detail views of the circles labeled A, B, and C in FIG. 133.

As stated, the front and rear rails (and therefore the fence) are held in place by a locking mechanism 1900 that clamps against the front and rear rails by pushing them against the rail supports. A user operates the locking mechanism by grasping a handle 1904 and pulling it forward so that it extends out from the front rail, then releasing it. Handle 2000 is biased apart from a spacer 2026, so it returns to its original position when released, leaving button 2000 in its extended position, as will be discussed further below. With button 2000 out, both the front and rear rails are free to move, so a user can grasp and rotate the handle and/or button to move the rails. The user can then push button 2000 back in toward the saw, to the position shown in FIGS. 133 and 134, to lock the rails in place. In the unlocked position, button 2000 is configured to be a noticeable distance from the front of the saw, several inches for example, to indicate to a user when the rails are not locked in place. The button is also positioned so that it extends out into the region in which a user would stand to use the saw, thereby further indicating when the rails are unlocked. The button can also be red or some other bright color so that it is easy to see when extended.

Saw 10 also includes a rail position adjustment mechanism 1902 to adjust the lateral position of the front and rear rails relative to the blade and table, in order to make cuts of different widths using the rip fence. The mechanism includes a front rack 1904 which is integral with front rail 1602, and a rear rack 1906 which is integral with rear rail 1604. It will be appreciated that racks 1904 and 1906 could also be formed separately and then attached to the front and rear rails. The bottom edge of each rack includes a section having teeth 1908 with gullets between the teeth. Racks 1904 and 1906 may be made from aluminum or any other suitable material, such as hard plastic.

Figure 137:
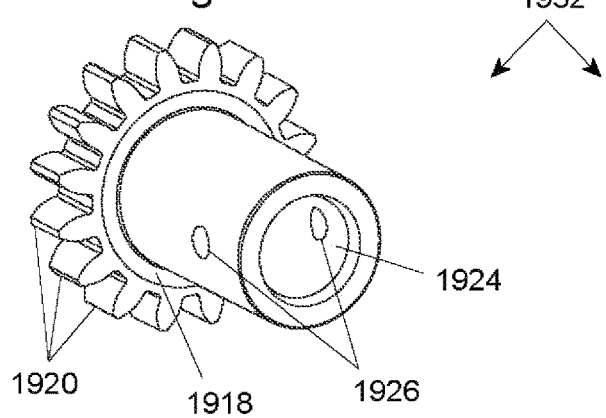
FIG. 137 shows a pinion gear isolated.
Figure 138:
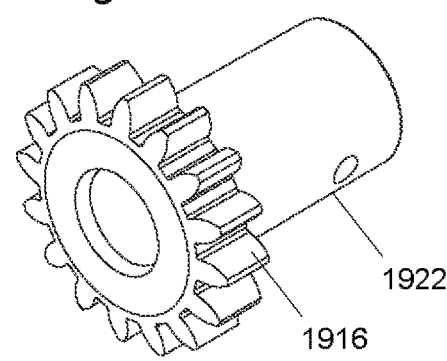
FIG. 138 shows another view of the pinion gear of FIG. 137.
Figure 139:
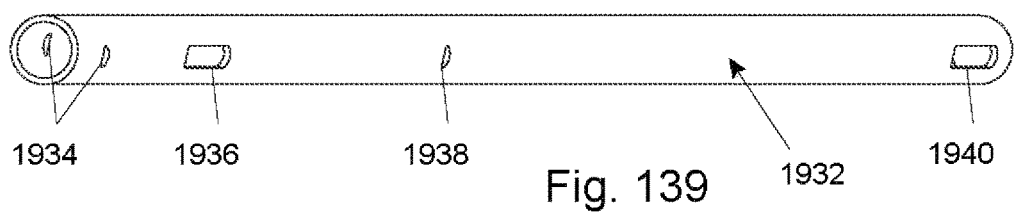
FIG. 139 shows a shaft isolated.
Figure 140:
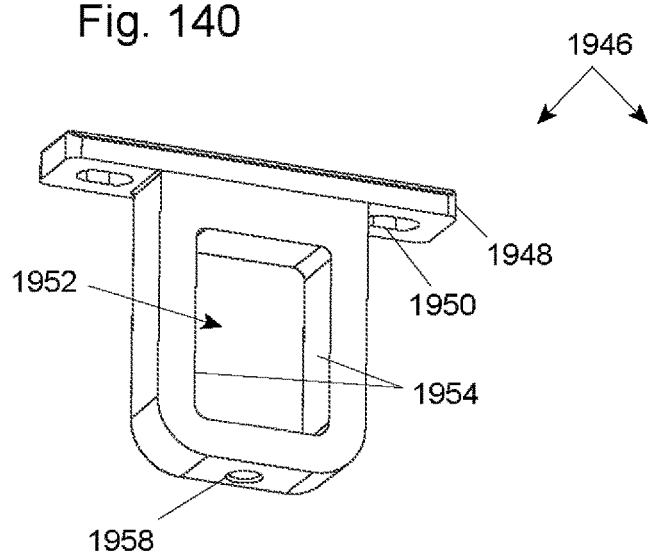
FIG. 140 shows a guide bracket isolated.
Figure 141:
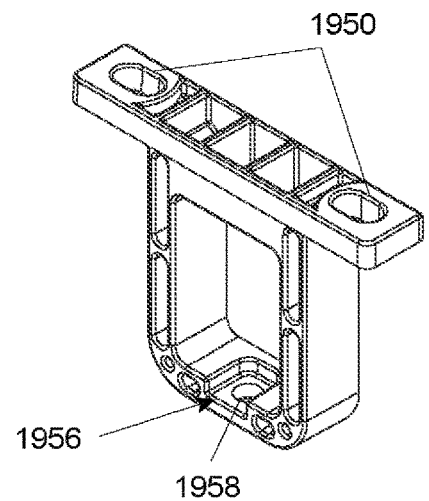
FIG. 141 shows another view of the guide bracket of FIG. 140.
Figure 142:
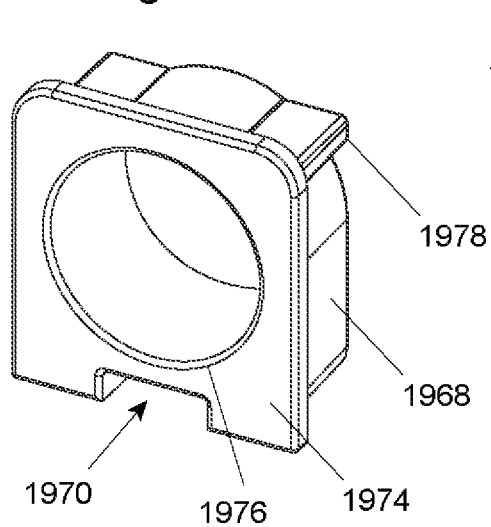
FIG. 142 shows a biased guide bushing isolated.
Figure 143:
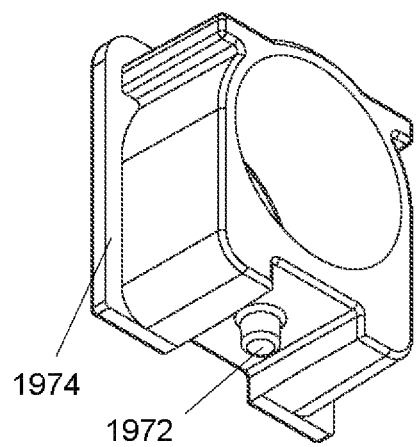
FIG. 143 shows another view of the biased guide bushing of FIG. 142.

The racks 1904 and 1906 are configured to mate with two pinion gears 1914, which in turn are connected to a shaft 1932. The shaft and pinion gears are in a fixed position laterally; they do not move left or right relative to the table. Therefore, as the shaft and pinion gears rotate, they cause the racks and attached rails to move left or right. When viewed from the front of the saw, clockwise rotation of the pinion gears would move the rails to the right, and counterclockwise rotation would move the rails to the left. This is an intuitive motion for a user, since the gears may be thought of as rotating in the direction of the intended movement. Pinion gear 1914 is shown isolated in FIGS. 137 and 138 and shaft 1932 is shown isolated in FIG. 139. In the presently disclosed embodiment, the pinion gears are identical, but it will be appreciated that they could be formed and shaped differently within the scope of the invention. Pinion gear 1914 is comprised of a short, generally cylindrical gear section 1916, which has a rear face 1918, teeth 1920, and a narrower, longer cylindrical section 1922. A through-hole 1924 extends the length of the pinion gear, and it is sized to fit closely around shaft 1932. A small through-hole 1926 extends through section 1922, and a spring pin 1928 extends through hole 1926 and an elongate hole 1936 near the front of shaft 1932 to connect the shaft to the pinion gear. The pinion gear 1914 at the rear of shaft 1932 is connected to elongate hole 1940 near the rear of the shaft. The spring pins 1928 are in fixed positions relative to the pinion gears, which are in fixed positions relative to the table, as will be discussed, but the elongate holes 1936 and 1940 in the shaft allow the shaft to move forward and backward relative to the pinion gears. However, the spring pins prevent the shaft from rotating relative to the pinion gears.

In an alternate embodiment, through-hole 1924 in the pinion gear may a splined hole or a keyed hole, in which case both shaft 1932 and through-hole 1924 could be, for example, hexagonally shaped. This design would help prevent the pinion gear from rotating relative to the shaft. However, other shapes of the shaft and pinion gear are possible, as long as the gear is prevented from rotating relative to the shaft, but is allowed to slide along the shaft. In other words, each pinion gear is non-rotatably, but slidably attached to or associated with the shaft.

Figure 144:
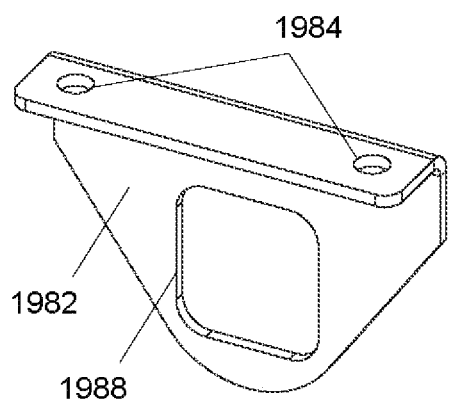
FIG. 144 shows a table mounting bracket isolated.
Figure 145:
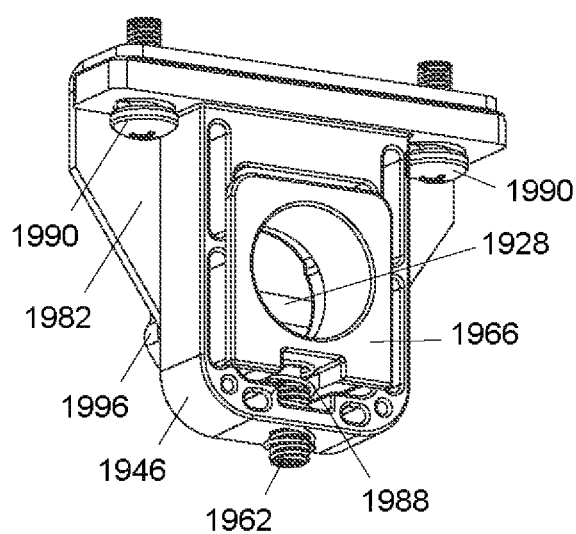
FIG. 145 shows a guide bracket, biased guide bushing, and table mounting bracket.
Figures 146, 147:
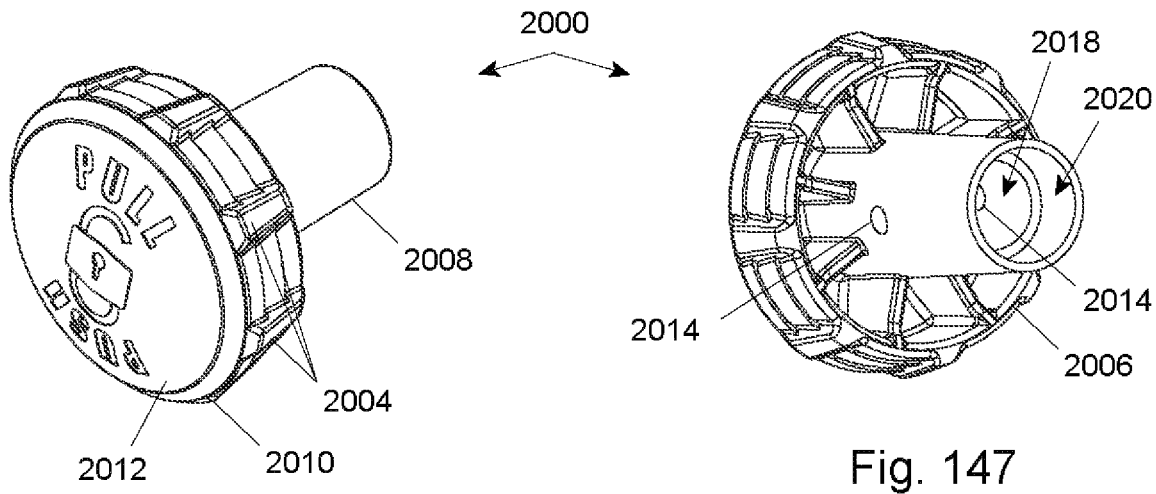
FIG. 146 shows a knob isolated.
FIG. 147 shows another view of the knob of FIG. 146.
Figures 148, 149:
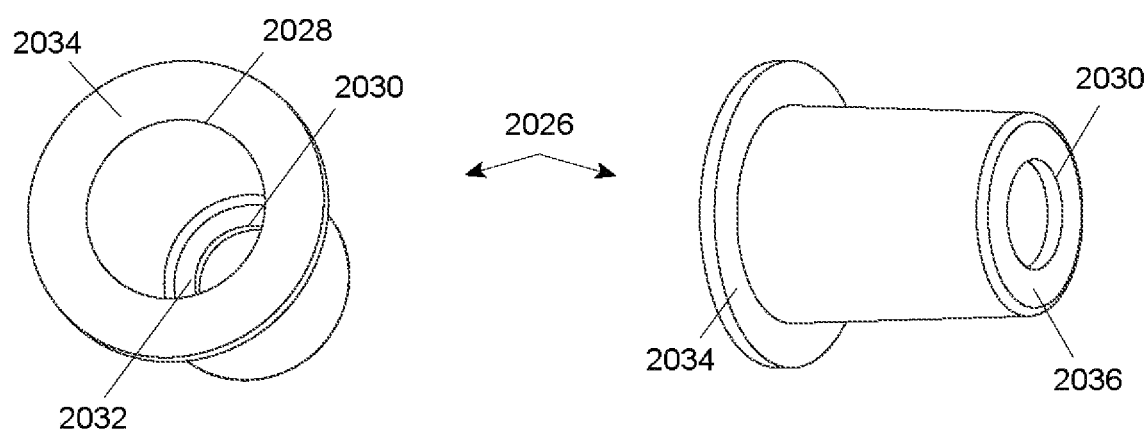
FIG. 148 shows a spacer isolated.
FIG. 149 shows another view of the spacer of FIG. 148.

The pinion gears 1914 are used to move the rails, and also to attach the position adjustment and locking mechanisms to the underside of table 12, as can be seen in at least FIG. 133. The narrow section 1922 of each pinion gear is configured to fit through a biasing mechanism 1944 and table mounting bracket 1982, and a retaining clip 1996 is bent around spring pin 1928 to secure the pinion gear, so it can rotate freely, but not move forward or backward relative to its mounting location. Biasing mechanism 1944 is comprised of a guide bracket 1946 and a biased guide bushing 1966, which are shown isolated in FIGS. 140-143, as well as a spring 1960 and set screw 1962. The spring biases the teeth on pinion gears 1914 into contact with the teeth 1908 on racks 1904 and 1906. This decreases any play or slop in the system, and prevents the gears from rattling. A table mounting bracket 1982, shown isolated in FIG. 144, is disposed above and on one side of the biasing mechanism, in order to increase the strength of the guide bracket and prevent it from bending or warping due to the forces involved in locking and unlocking the rails. FIG. 145 shows biasing mechanism 1944 and table mounting bracket 1982 isolated from other structures.

Guide bracket 1946 is shaped generally like a hollow rectangle, with an elongate flange 1948 disposed at the top. The bracket is shaped to define a generally rectangular opening 1952, which is configured to receive biased guide bushing 1966. The generally vertically oriented, opposing edges or faces 1954 forming the sides of opening 1952 may be thought of as guide surfaces. A generally semicircular indentation 1956 extends partway into the bottom edge of opening 1952, and provides a seat or cup to hold the bottom end of spring 1960 in place. A set screw 1962 is threaded through a hole 1958 in indentation 1956, and the position of the screw may be adjusted to limit the range of motion of biased guide bushing 1966. The flange 1948 includes elongate holes 1950, so that the bracket can be attached to the underside of table 12, as shown at least in FIG. 134. Providing elongate holes allows the lateral position of the guide bracket, and therefore the overall position and alignment of the locking and position adjustment mechanism, to be adjusted. This allows the parallelism between the front and rear rails to be adjusted in order to accommodate manufacturing tolerances or any other misalignment.

Biased guide bushing 1966 is shaped generally like a rectangle with a somewhat semicircular top edge, and it is shaped to fit within opening 1952 in guide bracket 1946. Two opposing, generally vertical edges or faces 1968, which may be thought of as guide surfaces, are provided on opposite sides of the guide bushing. The bottom edge includes a cutout or indentation 1970, and a pin or guide 1972 configured to fit within spring 1960 and contact set screw 1962. One face of the bushing is wider and taller than the main body of the bushing, which forms a ledge or flange 1974. A generally cylindrical through hole 1976 extends through the bushing and is shaped to accommodate the narrow cylindrical section of pinion gear 1914. The bushing may also include additional flanges 1978 which contact guide surfaces 1954 in guide bracket 1946. Guide bracket 1946 and biased guide bushing 1966 are preferably made from injection molded plastic, such as glass filled nylon, although other materials and methods of manufacturing could be used.

Table mounting bracket 1982 is shaped generally like a triangle, with one side folded over at about 90 degrees. The folded section has two holes 1984, which can be used to attach the bracket to corresponding holes 1986 in the underside of table 12 (labeled in FIG. 7). The main section of the bracket includes a generally square hole 1988. Table mounting bracket 1982 is a stamped, sheet metal part, although other materials and methods of manufacturing could be used.

When biasing mechanism 1944 is assembled, as shown in at least FIGS. 134, 136, and 145, biased guide bushing 1966 fits within rectangular opening 1952 in the guide bracket, with spring 1960 and set screw 1962 disposed between the bushing and bracket. Pinion gear 1914 fits through the guide bushing, with face 1918 of toothed portion 1916 of the gear resting against the face of the guide bushing. The pinion gear is held in place by a retaining clip 1996 disposed behind the guide bracket and table mounting bracket. Thus, the biased guide bushing is held from moving forward or backward, but is allowed to move up and down within guide bracket 1946, with the opposing walls 1968 of the bushing sliding along the opposing walls 1952 of the guide bracket. In the presently disclosed embodiment, the guide bushing has a vertical travel of about 0.15 inches, but other distances are possible within the scope of the invention. The springs in the two biasing mechanisms disposed at the front and rear of the table bias the bushings toward table 12, which in turn biases the pinion gears 1914 into operative contact with the front and rear rails. In an alternate embodiment, spring 1960 could be omitted, and the guide bracket and bushing could be formed as a single, rigid piece. It will be appreciated that a single biasing mechanism could be used, at either the front or rear of the table. However, it is advantageous to bias both pinion gears into contact with the rails with approximately the same force in order to minimize the chance of misalignment between the rails, and the provision of two biasing mechanisms accomplishes this, while also providing a consistent "feel" to a user, regardless of slight variations in manufacturing tolerances or wear on the gears and racks.

Rail adjustment mechanism 1902 also includes an actuator 2000, as stated, which may be thought of as a knob, button, or lock button. A spacer 2026, which may be thought of as an engagement mechanism, is disposed behind the knob, and is biased away from the knob by a spring 2002. One of the pinion gears is positioned behind the knob (toward the center of the saw), and the gear is supported by table mounting bracket 1982 as described above. Knob 2000 and spacer 2026 are shown isolated in FIGS. 146-149.

Knob or handle 2000 is configured to be engaged by a user, and it can include bumps 2004 to increase friction with a user's hand, but may alternatively have a textured surface, a smooth surface, or some other surface. The handle includes a generally cylindrical section 2008, a wider, cylindrical section 2010, and a dome-shaped front section 2012 extending from the wider cylindrical section. A hole 2014 extends perpendicularly to section 2008, and it is shaped to accommodate a spring pin 2016, which extends through hole 2014 in the handle and hole 1934 in shaft 1932. Shaft 1932 fits within a hole 2018 which extends most of the length of handle 2000. The rear of hole 2018 includes a wider section 2020, which is shaped to accommodate part of spring 2002. Thus, handle 2000 cannot move relative to shaft 1932; it will move forward and backward, as well as rotate, with the shaft. Of course, other methods of attachment could be used within the scope of the invention, as long as the knob is prevented from moving relative to the shaft. With the locking mechanism in its actuated, or locked, position, the rear edge or back 2006 of section 2010 rests against the front edge of the spacer 2026, which, in turn rests against the pinion gear which is substantially adjacent the front of the saw.

Spacer 2026 is shaped to fit around cylindrical section 2008 on handle 2000 when the locking mechanism is in the actuated, or locked, position. Section 2008 fits within a large opening 2028 in the spacer, and a narrower hole 2030 at the rear of the spacer provides clearance for shaft 1932. The difference in diameter between holes 2028 and 2030 defines a ledge 2032, and the rear end of spring 2002 rests against this ledge to bias the handle and spacer apart. A flange 2034 extends around the front of the spacer and provides an abutment surface for the rear face 2006 on handle 2000. The rear face 2036 of spacer 2026 rests against the front face of pinion gear 1914.

Figure 150:
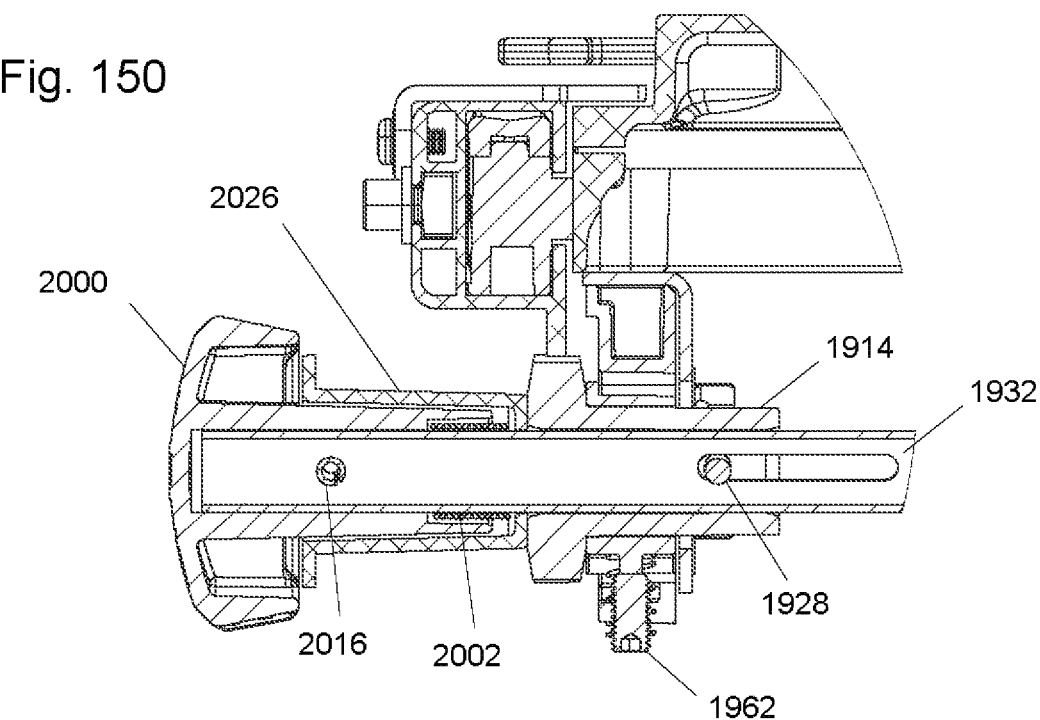
FIG. 150 shows a cross section of a locking mechanism in the locked position.
Figure 151:
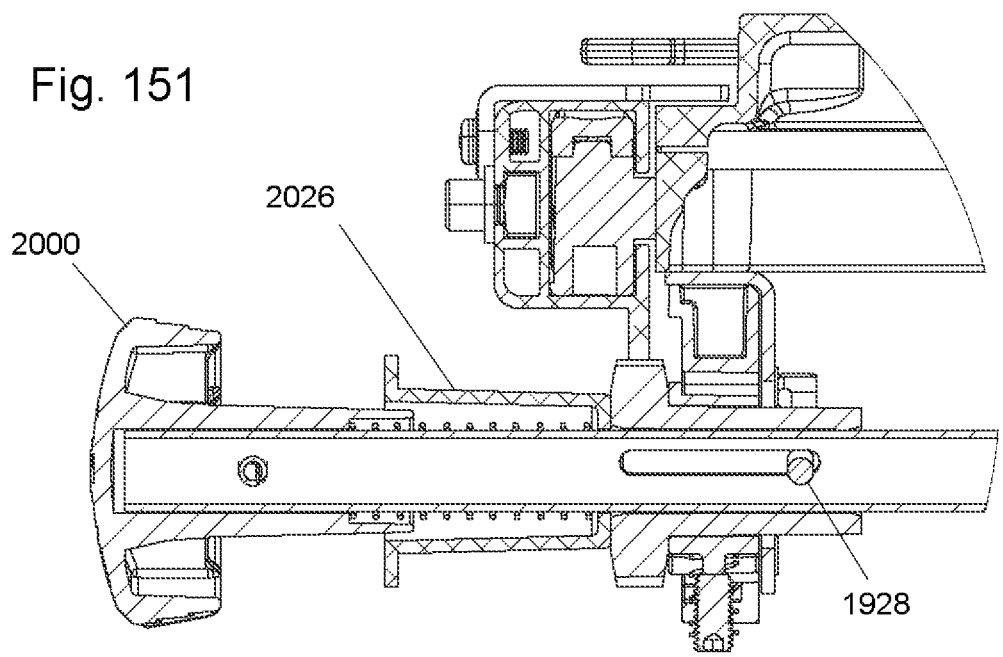
FIG. 151 shows a cross section of a locking mechanism in the unlocked position.

FIG. 150 shows a cross-sectional view of handle 2000, spacer 2026, spring 2002, and shaft 1932, in the locked position, and FIG. 151 shows the same components in the unlocked position.

A guide member 2050, which may be thought of as a bushing or force transfer member, is positioned partway along shaft 1932, and is attached to the shaft by a spring pin 2052, which extends through a through-hole 2054 in the bushing and through-hole 1938 in the shaft, as shown in FIG. 135. The bushing is shown isolated in FIG. 152. It is comprised of a wide cylindrical section 2056, a longer, narrow cylindrical section 2058, and a short, wide cylindrical section 2060. A through-hole 2062 extends through the bushing, and it is configured to fit closely around shaft 1932.

In order to unlock the rails, as will be discussed, a user would grasp spacer 2026 and pull it forward, away from table 12. Because the front of the spacer rests against the back of handle 2000, such movement would pull the handle forward, along with shaft 1932, which slides within pinion gears 1914. This movement of shaft 1932 would release the locking mechanism, as will be discussed later. In order to re-lock the rails, a user would push button 2000 back in toward the saw, which would, in turn, cause shaft 1932 to move backward. This movement of shaft 1932 would actuate the locking mechanism, as will be discussed. Bushing 2050, which is attached to shaft 1932, also moves forward and backward with the shaft, and it transfers the forward and backward movement of shaft 1932 to locking mechanism 1900.

Figure 155:
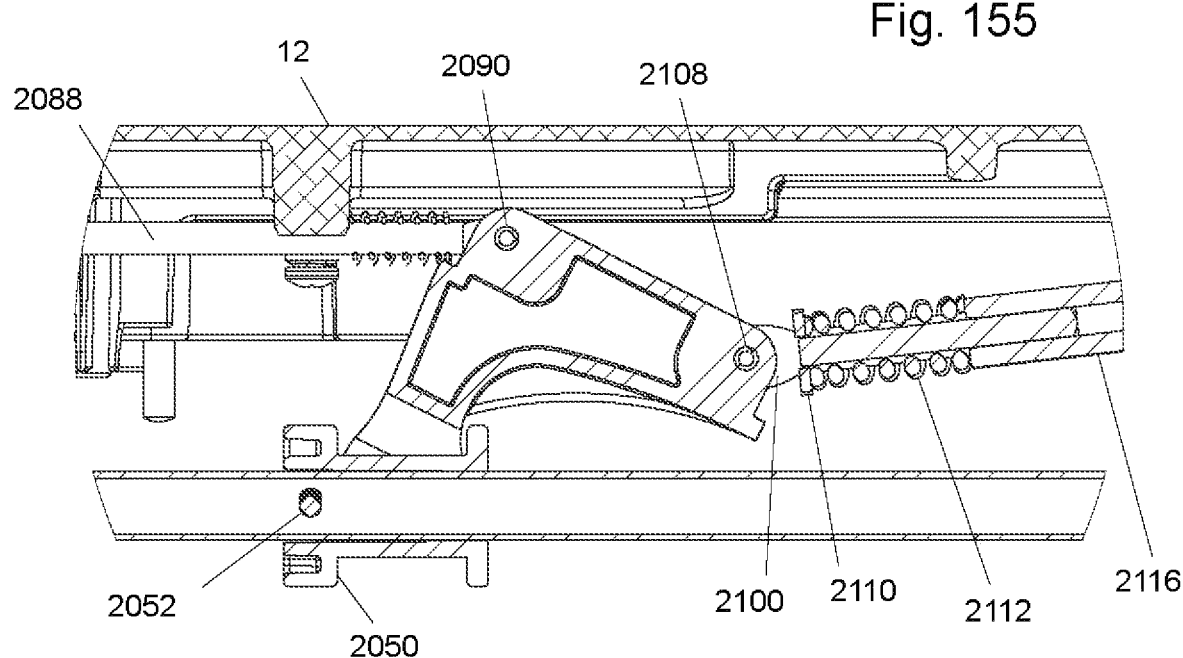
FIG. 155 shows a cross section of a transfer bushing and link member in the locked position.
Figure 156:
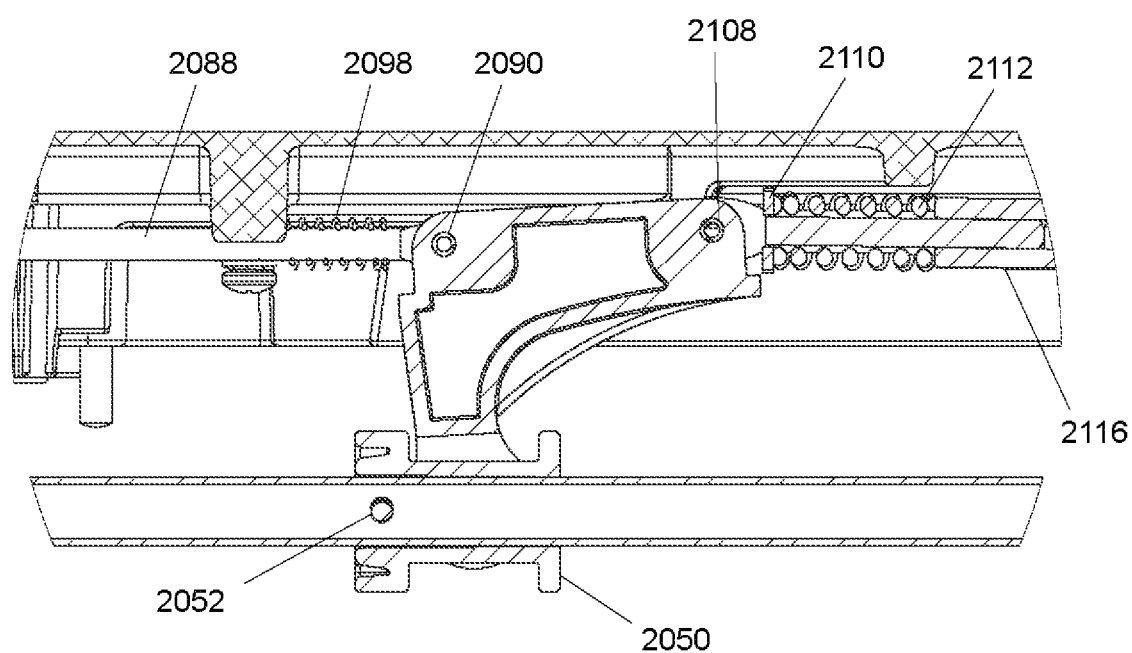
FIG. 156 shows a cross section of a transfer bushing and a link member in the unlocked position.
Figure 157:
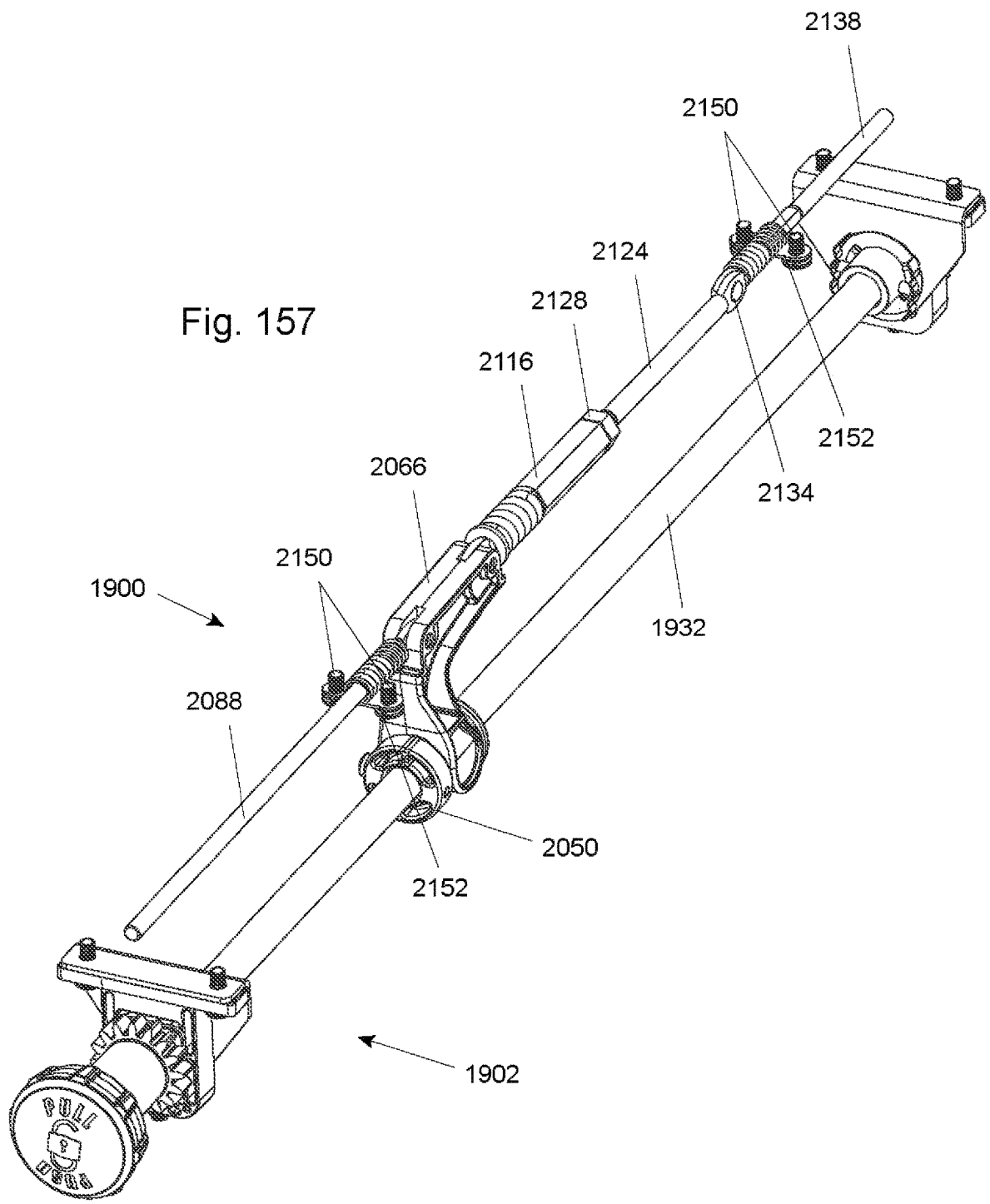
FIG. 157 shows a rail position adjustment and locking mechanism isolated from other structures.

Locking mechanism 1900 includes a rotating member or link member 2066, which may be thought of as a rocker and which is shown isolated in FIGS. 153 and 154, and is shown in assembly in FIG. 135. Link member 2066 includes two arms 2068, which terminate in round sections 2070. The arms are spaced apart to fit around and capture narrow section 2058 of bushing 2050, so the round ends of the arms are captured between wider sections 2056 and 2060 of the bushing. In this manner, bushing 2050 is held between the two arms, so it is free to rotate without affecting the rocker, but any forward or backward movement of the bushing will pull or push on the arms, causing rocker 2066 to move. The arms can be configured to flex outward somewhat when the bushing is inserted so that the arms apply some spring force against the sides of the bushing. The main section 2072 of the rocker is generally rectangular in shape, with arms 2068 disposed near the front. A slot or cutout 2074 extends from the front to the back of main section 2072 and a through hole 2076 extends across the middle of the slot. A similar slot 2078 and through hole 2080 are disposed at the rear end of the main section. A short extension or ledge 2082 extends from the front edge of the rocker, and a slightly longer ledge 2084 extends from the rear edge of the rocker. The ledges function to help limit the travel of the locking mechanism, as will be discussed. The rocker transfers motion of handle 2000 and shaft 1932 to motion of the various locking components which form locking mechanism 1900. FIGS. 155 and 156 show cross sections of part of locking mechanism 1900 in the unlocked and locked positions, respectively, FIG. 157 shows locking mechanism 1900 and rail position adjustment mechanism 1902 isolated from other structures, and FIGS. 158-161 show various components of the locking mechanism isolated.

Figure 158:
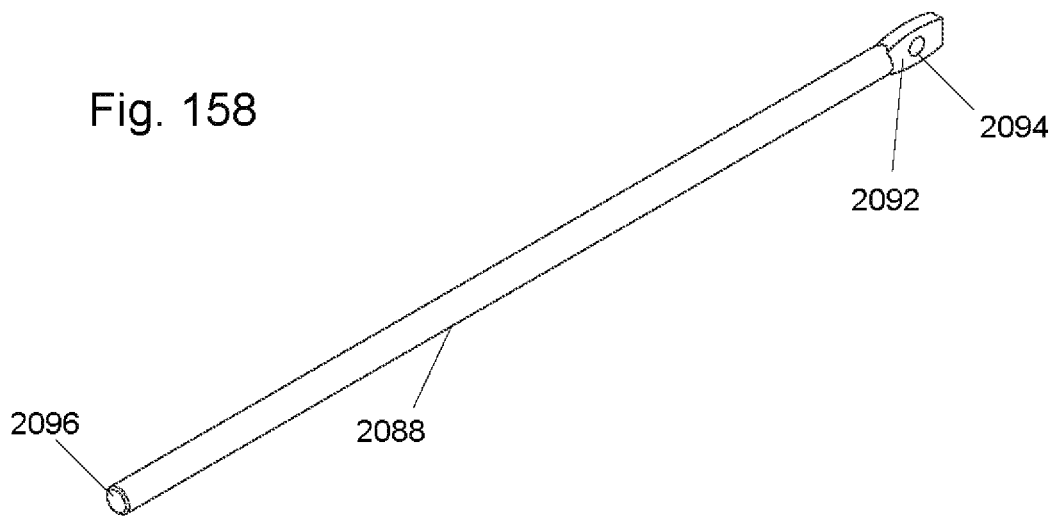
FIG. 158 shows a front lock bar isolated.
Figure 159:
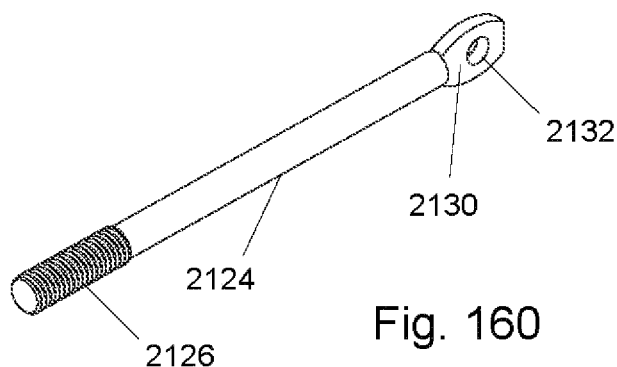
FIG. 159 shows a short, sliding link isolated.

A front lock bar 2088, shown isolated in FIG. 158, is connected to hole 2076 in the rocker by a spring pin 2090. The front lock bar is elongate and generally cylindrical in shape, with a locking end 2096 and a short, thin, flat section 2092 at the other end, which is sized to fit within slot 2074 in the rocker. Spring pin 2090 passes through holes 2076 in the rocker and a hole 2094 in the lock bar to pivotally connect the front lock bar to the rocker. A short, sliding link 2100, shown isolated in FIG. 159, has an elongate section 2102, a flat section 2104, and a hole 2106, and is attached to the other end of rocker 2066 by a spring pin 2108. It will be appreciated that a bolt with a nut, or some other method of pivotal attachment would be suitable for connecting the lock bar and sliding link to the rocker. A washer 2110 is placed on the sliding link, followed by a spring 2112, and the end of section 2102 extends into a non-threaded section of a hole through a barrel nut 2116.

Figure 160:
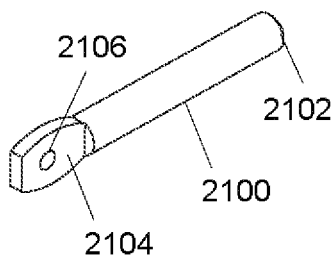
FIG. 160 shows an intermediate lock bar isolated.
Figure 161:
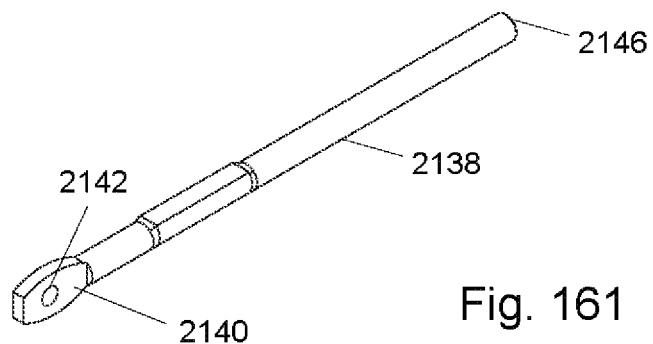
FIG. 161 shows a rear lock bar isolated.

An intermediate lock bar 2124, shown isolated in FIG. 160, includes a threaded end 2126, which threads through a jam nut 2128 and into barrel nut 2116, so the position of the intermediate lock bar relative to the barrel nut can be locked in place by tightening both nuts. The distal end 2130 of bar 2124 is flat, with a hole 2132, through which a rivet 2134 passes to pivotally connect the intermediate lock bar to a hole 2124 in a flat section 2140 of a rear lock bar 2138, which is shown isolated in FIG. 161. The rear lock bar includes a locking end 2146, and a spring 2144 is disposed around the bar.

Locking mechanism 1900 is connected to table 12 by two or more bosses or supports, such as bosses 2154 and 2156, which extend from the table. The front and rear lock bars are captured and supported by cutouts in the supports, and are held in place by a pair of brackets 2152, which are each attached to the supports via a pair of bolts 2150. It will be appreciated that locking mechanism 1900 could be connected to table 12 through a variety of mechanisms, including brackets or bosses which were not integral with the table. The locking mechanism is captured between and supported by the supports so that the rocker can rotate or pivot with respect to the supports. The lock bars extend out from each side of the bosses and fit into holes 2160 and 2162 in the front and rear of the table (labeled in at least FIG. 7), respectively, so the lock bars can move with respect to the table and rails and contact the front rails. The brackets prevent the lock bars from moving up and down, but allow the bars to move forward or backward. Spring 2098 extends between a bracket and the rocker, and spring pin 2144 extends between a bracket and the pivotal connection between the intermediate and rear lock bars. Of course, the lock bars and links could be any of a variety of shapes, such as a square rod or tube, but the cylindrical shape is easy to manufacture.

The sliding link, washer, spring 2112, nuts, and long link may together be thought of as forming an adjustable link section. In use, the section functions substantially as a single component, with spring 2112 allowing a small amount of change to the overall length of the section as the mechanism is locked and unlocked. The depicted method, or some other method of providing a slight change in length is preferably provided in order to allow the locking mechanism to easily over-center in both the locked and unlocked positions. As stated, FIGS. 150 and 156 show cross sections of portions of the locking mechanism in its locked position, and FIGS. 151 and 155 show cross sections of the unlocked position. It can be seen that spring pin 2108 is above spring pin 2090 in the locked position, but below spring pin 2090 in the unlocked position. This forms an over-center lock, with springs 2098, 2112, and 2144 stabilizing the mechanism in both the locked and unlocked positions.

To adjust the position of the rails (and thus the position of the fence which may be clamped thereto), a user would grasp handle 2000 and/or spacer 2026 and pull them forward. This would pull shaft 1932 and guide member 2050 forward, which, in turn, would pull arms 2068 on rocker 2066 forward, from the position shown in FIG. 155 to the position shown in FIG. 156. The movement of rocker 2066 would pull the front and rear lock bars towards each other and out of contact with the front and rear rails. Without the contact of the lock bars, the front and rear rails are free to move upon rotation of handle 2000, which, as discussed, causes rotation of pinion gears 1914. Clockwise rotation of the handle would move the rails to the right, and counter-clockwise rotation would move the rails to the left, from the perspective of a user standing at the front of the saw.

With this configuration, the front and rear rails are free to slide along the rail supports upon rotation of handle 2000, which moves racks 1904 and 1906 along pinions 1914. The front and rear rails will slide together because they are connected by shaft 1932. As the shaft rotates, the pinion gears rotate together, which in turn causes the front and rear rails to slide together along the rail supports. Thus, the front and rear rails will move together even though they are not connected by an extension table. When the rails are in the desired position, the user would push handle 2000 in, which, in turn, would push rocker 2066 rearward to the locked position, and the front and rear lock bars would engage the front and rear rails to lock the rails in position.

Figure 162:
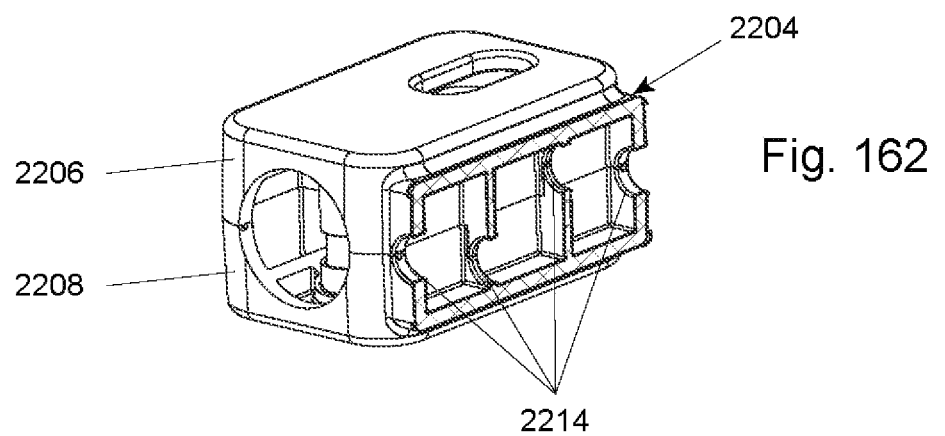
FIG. 162 shows a strain relief mechanism isolated.

Power is supplied to a switchbox 1280 by a cord 2202 (labeled in FIG. 123) entering into the switchbox. Cord 2022 passes through a strain relief 2204 near where it enters the switchbox. Strain relief 2204 is integrally formed with a clamp which extends around support structure 14 and includes upper and lower halves 2206 and 2208, respectively. The left side of base 14 includes two generally C-shaped extensions 2210 and 2212, around which power cord can be wound (see FIG. 5). Rear extension 2212 is connected to upper section 82 of the rear, left foot, and front extension 2210 is connected to strain relief 2204. In the presently depicted embodiment, the power cord exits the strain relief in a direction which facilitates easy wrapping of the cord around the extensions, since it exits the strain relief in a direction which is parallel to the wrapping direction. Positioning the wrapped power cord on the left side of base 14 takes advantage of what would otherwise be unused space, and prevents the power cord from interfering with the rear storage compartment, user interface on the front of the saw, or with the ability of the internal components to tilt. FIG. 5 shows an exploded view of strain relief 2204 and the extensions, and FIGS. 121 and 123 show cord 2202 passing through the strain relief. FIG. 162 shows a cross section of strain relief 2204, and it can be seen that the strain relief includes a plurality of contact surfaces 2214, which contact the power cord and prevent it from moving. It can be seen that the contact surfaces are offset vertically relative to one another, so, when the power cord is clamped between the upper and lower sections, it will be held in a somewhat zig-zag or "W" shape. Thus, pulling force applied to power cord 2202 will be distributed to strain relief 2204 and base 14, which protects the connection between the power cord and switchbox.

Figure 163:
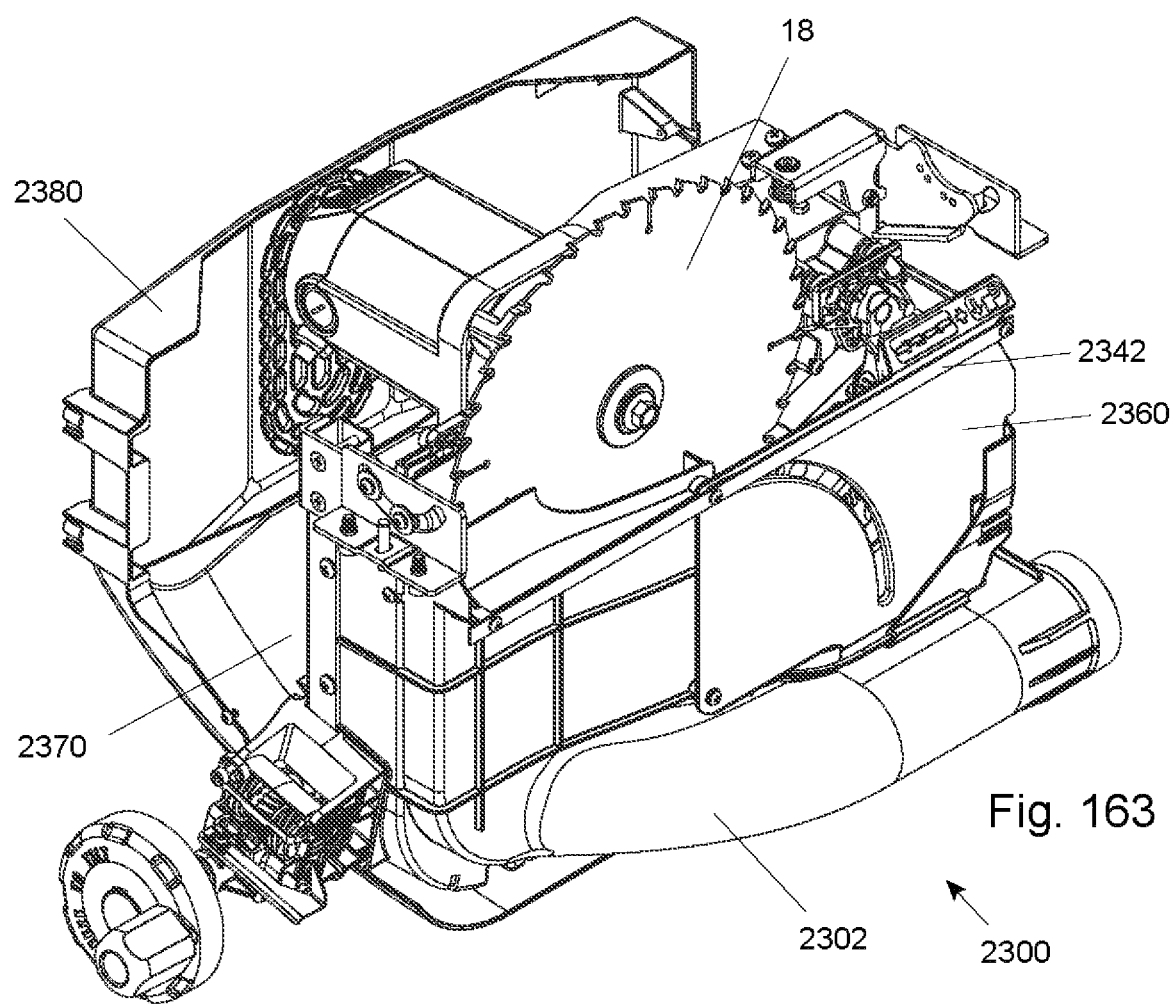
FIG. 163 shows a dust shroud assembly with some additional components.
Figure 164:
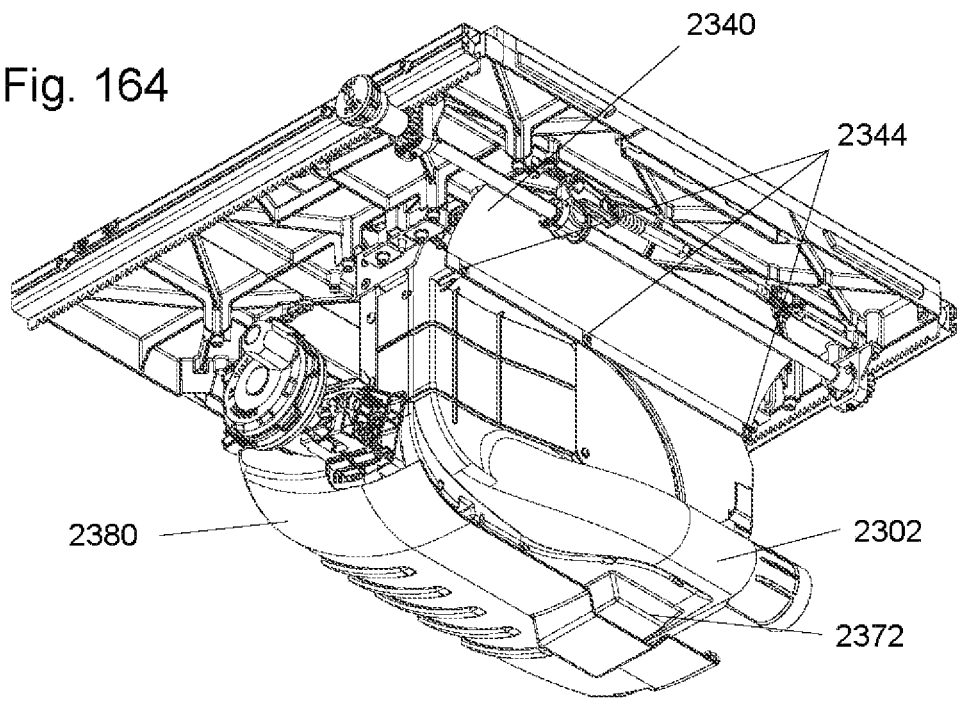
FIG. 164 shows the underside of a dust shroud assembly with some additional components.
Figure 165:
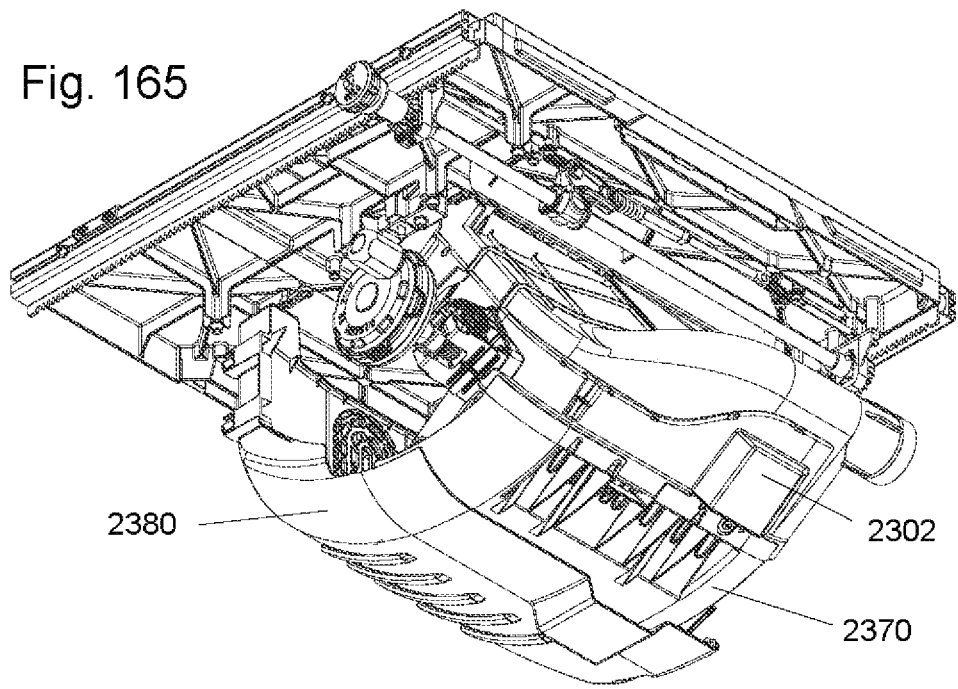
FIG. 165 shows the underside of a dust shroud assembly with some additional components, with the blade tilted to 45 degrees.
Figure 166:
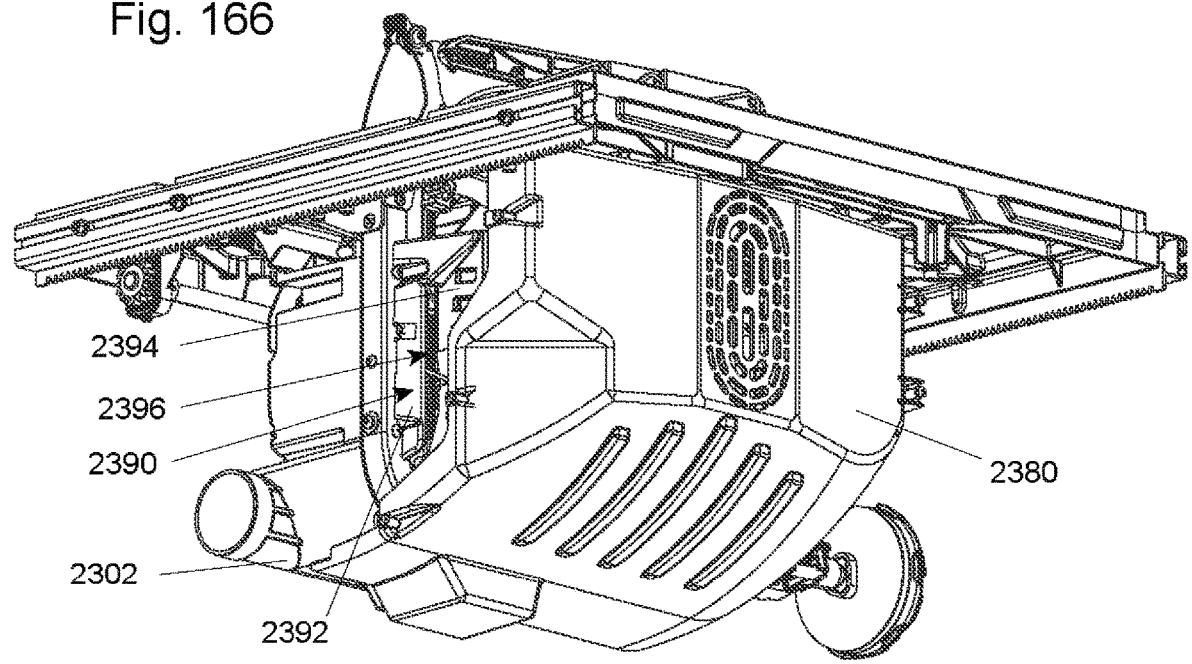
FIG. 166 shows a rear view of a dust shroud assembly with some additional components.

Table saw 10 also includes a shroud assembly 2300 to catch saw dust and direct it through a chute out the back of the saw. Shroud assembly 2300 is shown attached to table 12 in FIGS. 164-169, and various components thereof are shown isolated in FIGS. 163 and 170-176. Shroud assembly 2300 includes a dust shroud 2302, shown isolated in FIGS. 170-173, which is mounted to trunnion 150 by a plurality of bolts, which pass through holes 2306 in the dust shroud and holes 194, 188, 186, and 174 in the trunnion. The dust shroud is shaped to match the outline of trunnion 150, so the main body thereof is somewhat rectangular in shape, with rounded bottom corners. The front of the dust shroud extends up to fit behind front mounting plate 224 and around the right side of housing 520 of the tilt mechanism, as seen in FIG. 163. With the blade fully elevated, the dust shroud extends about halfway up the blade, almost to the underside of table 12. A flexible cover 2340 may extend between dust shroud 2302 and the underside of table 12 to prevent anything from entering the shrouded area and potentially contacting the blade under the table, as well as to maximize dust collection. The flexible cover extends around a bar 2342 (shown in FIG. 176), which is connected to dust shroud 2302 by three screws 2344, which thread through the bar and into holes 2308 in the shroud. Three bolts (not shown) are used to connect the other side of the flexible cover to bosses 2348 in the underside of table 12 (labeled in FIG. 7). The flexible cover may be made of any suitable material, such as sturdy nylon fabric, as long as the trunnion (and the portion of the shroud assembly connected thereto) is still allowed to pivot.

The bottom edge of the shroud includes a rectangular extension 2310, which provides clearance for brake cartridge bracket 1100 when the blade is retracted, if a saw is equipped with an active injury mitigation system. Shroud 2302 extends on the right side of blade 18 (from the perspective of a user of the saw). A secondary dust shroud 2350 extends on the left side of the blade, and it is shown isolated in FIG. 173. It is shaped somewhat like an "L," with a fin 2352 and a lip 2354, which overlaps slightly with primary shroud 2302 to ensure a continuous surface for air and dust to travel past. The secondary dust shroud also includes a somewhat rectangular cutout 2356, which provides clearance for the blade to retract if the saw is equipped with an active injury mitigation system. The secondary dust shroud is bolted to trunnion 150 by a bolt passing through hole 166 in the trunnion, and it is also connected to primary dust shroud 2302.

Figure 170:
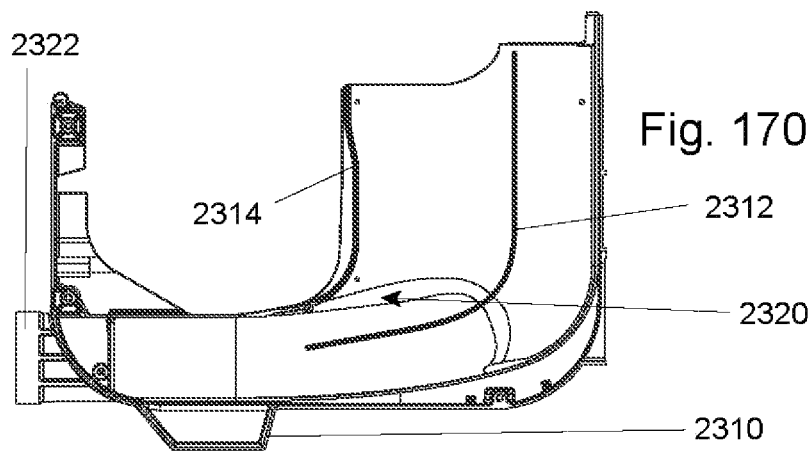
FIG. 170 shows a dust shroud isolated.
Figure 173:
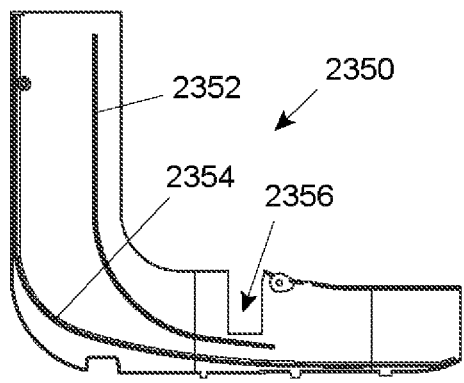
FIG. 173 shows a secondary shroud isolated.
Figure 172:
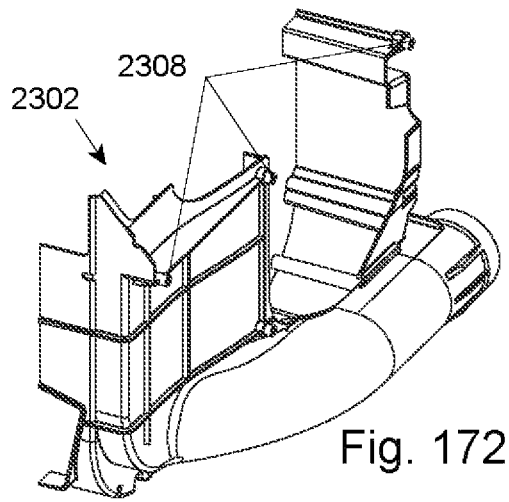
FIG. 172 shows another view of the dust shroud of FIG. 170.

A fin 2312 on shroud 2302 extends generally perpendicularly out from the inside or left face of the shroud to a position within a few millimeters of the blade. Fin 2312 extends substantially vertically until it reaches roughly the bottom of the blade, with the blade fully lowered, where it then curves toward the rear of the saw, as shown in FIG. 170. Fin 2352 extends generally perpendicularly from secondary shroud 2350 from the inside face or right side of the shroud toward the blade, extending within a few millimeters of the blade. Like fin 2312, fin 2352 extends substantially vertically until it reaches roughly the bottom of the blade with the blade fully lowered, where it then curves toward the rear of the saw, as shown in FIG. 173.

Shroud 2302 includes another fin 2314, which also projects out generally perpendicularly from the side. Fin 2314 is positioned rearward of fin 2312 and it extends generally from near the top of the shroud down toward the bottom thereof, where it curves back for a short distance. Fin 2314 is positioned generally in the front-to-back middle of the blade adjacent the saw's arbor, and the fin extends as close as possible to the blade while still providing clearance for the arbor. Fins 2312, 2314, and 2352 all help peel and direct dust away from blade 18.

Shroud 2302 is positioned as close to the blade as possible so it can extend as high as possible when the blade tilts, while still providing clearance for the saw's arbor. However, space is required to change the blade and to change the brake cartridge in saws equipped with active injury mitigation systems that use brake cartridges. Accordingly, a door 2360 is provided at the rear of shroud 2302, and the door can pivot up and forward, toward the top and front of the saw. Door 2360 is shown in its normal position in at least FIG. 168, and pivoted forward in at least FIG. 169. The door is pivotally connected to the shroud by a bolt 2362 (labeled in FIG. 168), which extends through the front, lower corner of the door and through hole 2316 in the shroud. An arcuate opening 2364 is disposed in the shroud, and middle bolt 2344 (shown in FIG. 164) extends through the opening to guide the motion of the door as it is pivoted up and out of the way. A tab 2366 may be provided along the top of the door to provide a surface for a user to grasp to raise the door, and the tab may extend over a section of bar 2342 or one of the bolts 2344 to limit the downward pivotal motion of the door.

Figure 167:
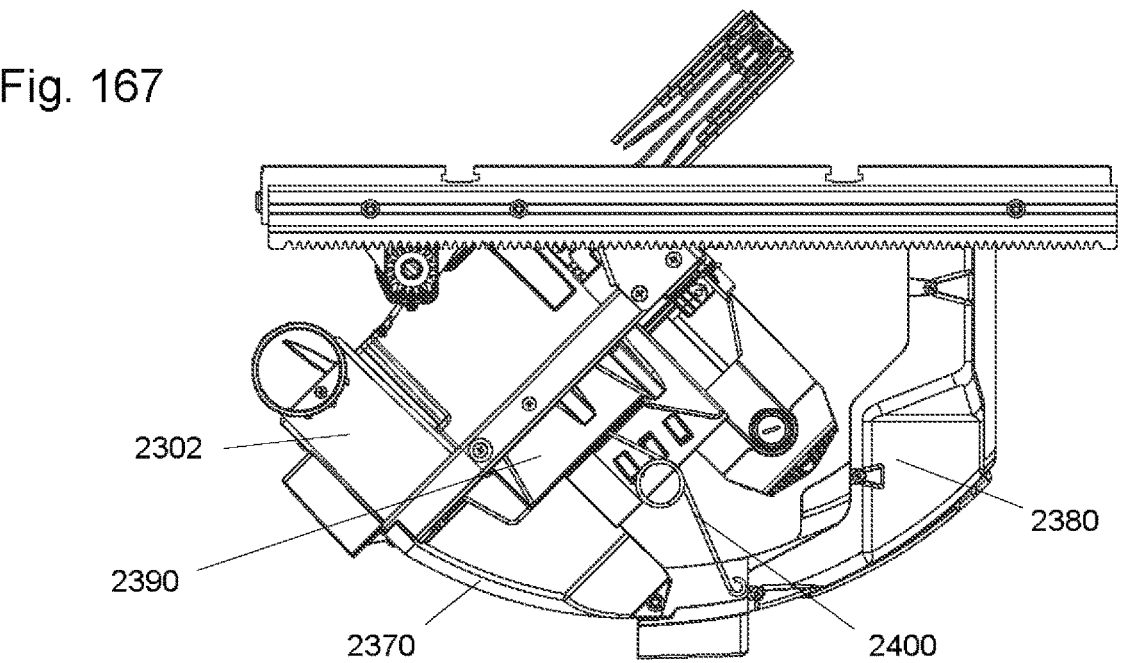
FIG. 167 shows a rear view of a dust shroud assembly with some additional components, with the blade tilted to 45 degrees.
Figure 168:
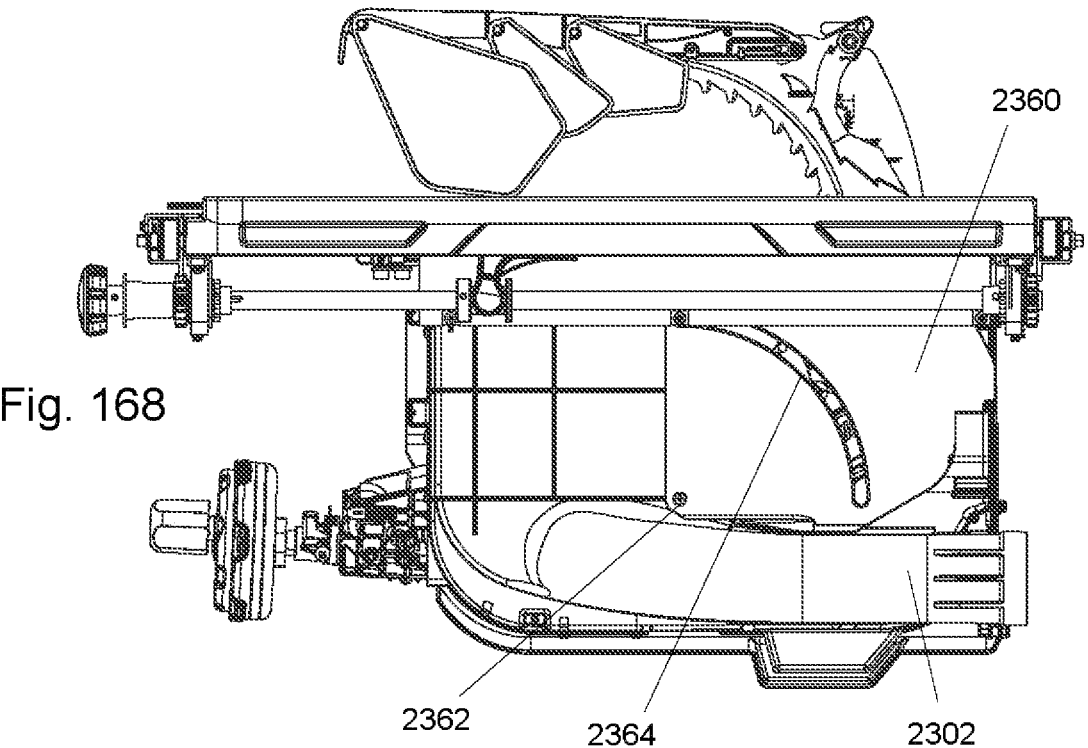
FIG. 168 shows a side view of a dust shroud assembly with some additional components.
Figure 171:
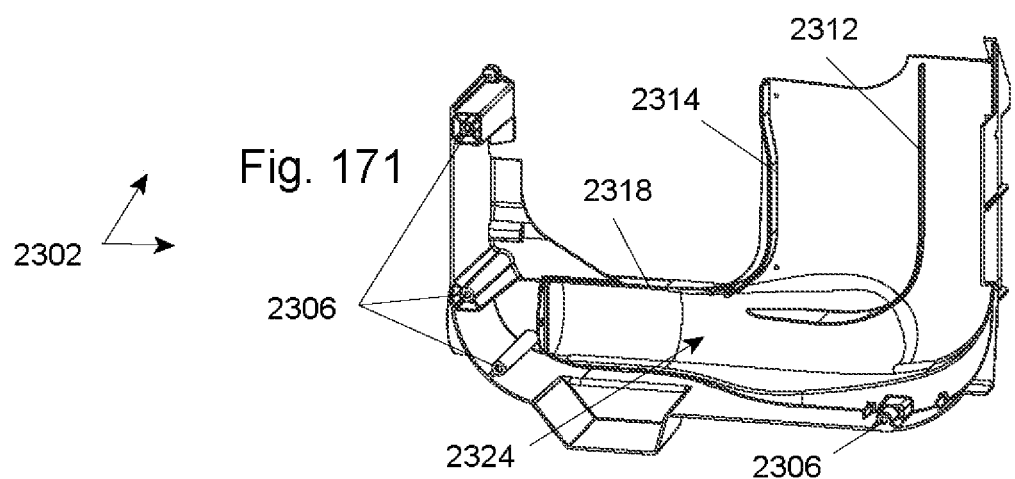
FIG. 171 shows another view of the dust shroud of FIG. 170.

Shroud 2302 also includes a chute 2318 (labeled in FIG. 171) through which the shroud directs sawdust toward the rear of the saw. Chute 2318 has a mouth 2320 positioned roughly below or slightly behind the center of the blade, an exit 2322, and an enclosed channel 2324 extending between the mouth and the exit, as shown in FIGS. 170 and 171. The bottom end of fin 2312 extends into mouth 2320, and then into channel 2324 approximately 150 mm beyond mouth 2320, although it could extend roughly 50 to 200 mm or more into channel 2324. The bottom end of fin 2312 is mounted on the right side of channel 2324 and roughly in the middle of the top-to-bottom dimension of the channel, as seen in FIG. 170. The fin extends generally perpendicularly out from the right side of chute 2320 to approximately the middle of the side-to-side dimension of the chute. In some embodiments, the fin can slope downward slightly from the mouth toward the bottom of the chute. The bottom end of fin 2312 in channel 2324 functions to prevent air and dust from recirculating back toward blade 18. Experiments have shown that some dust moving along the bottom of dust shroud 2302 into chute 2324 can be deflected or can recirculate up and back toward the blade. The bottom end of fin 2312 substantially prevents that recirculation while still allowing dust and air to enter chute 2324 above the fin. The bottom end of fin 2312 is also shown in FIGS. 167 and 171, which show additional views of the rear of the dust shroud.

Figure 174:
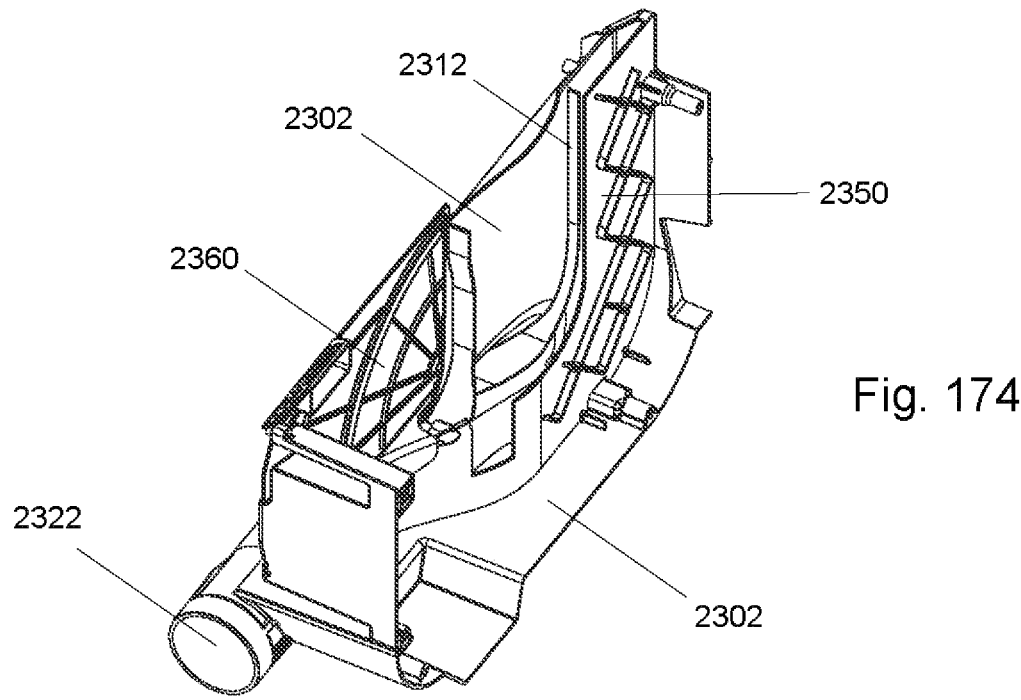
FIG. 174 shows a dust shroud and a secondary shroud.
Figure 175:
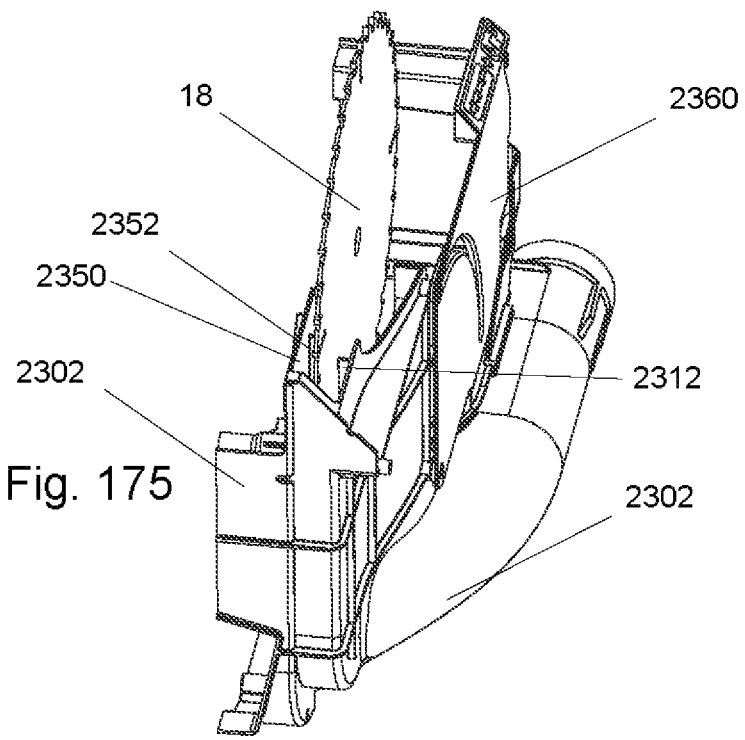
FIG. 175 shows a dust shroud, secondary shroud, and blade.

Chute 2320 extends toward the rear of support structure 14, far enough for a vacuum or other dust collection system to be attached to exit 2322. Exit 2322 can be shaped and sized to mate with standard vacuum systems and couplers. In the depicted embodiment, exit 2322 is circular with an approximately 65 mm outside diameter and an approximately 60 mm inside diameter. FIG. 174 shows the primary and secondary shrouds isolated, and FIG. 175 shows the two shrouds with blade 18.

It is desirable to prevent a user from accidentally contacting the spinning blade below the table. However, the presently depicted embodiment of saw 10 does not include a molded plastic housing, as is common on various benchtop saws. As discussed, shroud 2302, flexible cover 2340, and door 2360 prevent a user from contacting the blade below the table on the right side of the saw. It is advantageous to provide further shielding on the left side of the saw to prevent a user from contacting the blade on that side. Shroud 2302 is mounted to trunnion 150, and therefore, moves with the trunnion when a user changes the angle of the blade relative to the table. That movement is arcuate and substantial (since the blade may be pivoted to about 45 degrees), and therefore, the shielding or shrouding components on the left side of trunnion 150 must be able to accommodate that change in position while still fully shielding the blade. Accordingly, the saw includes a pivoting shield or left side cover 2370 connected to trunnion 150 by bolts passing through holes 176, 178, 182, and 184 in the trunnion. Pivoting shield 2370 is somewhat arcuate in shape, and it extends until it is about level with the bottom of the blade. The pivoting shield includes a projection 2372, which fits against the left side of rectangular projection 2310 on dust shroud 2302, to trap dust and prevent inadvertent access to the blade. A stationary dust shield or secondary left cover 2380 is connected to support structure 14, and it extends from the underside of table 12, down around the pivoting shield when the blade and trunnion are perpendicular to the table (not beveled). Thus, as a user bevels the trunnion and blade, the region of overlap between the stationary and pivoting dust shields decreases, and the blade remains fully shielded.

A small, tertiary shield 2390 may be connected to the back of trunnion 150. The shield pivots along with the trunnion, and it provides additional protection against a user contacting the blade. The tertiary shield, which may be thought of as a secondary rear cover, includes a main section 2392, an offset section 2394, and a gap 2396 between the sections (see FIG. 166). A torsion spring 2400 (shown in FIGS. 5, 72, and 167) is connected between the trunnion and support structure, and it extends through gap 2396. One end of the spring extends around projection 1262 on trunnion bar 1256 (projection 1262 is labeled in FIG. 90), as can be seen in at least FIG. 72. The other end of the spring is connected to support structure 14, as can be seen in at least the exploded view of FIG. 5. The spring helps to offset the weight of the trunnion and attached components as the blade is tilted from 90 to 45 degrees.

Figure 176:
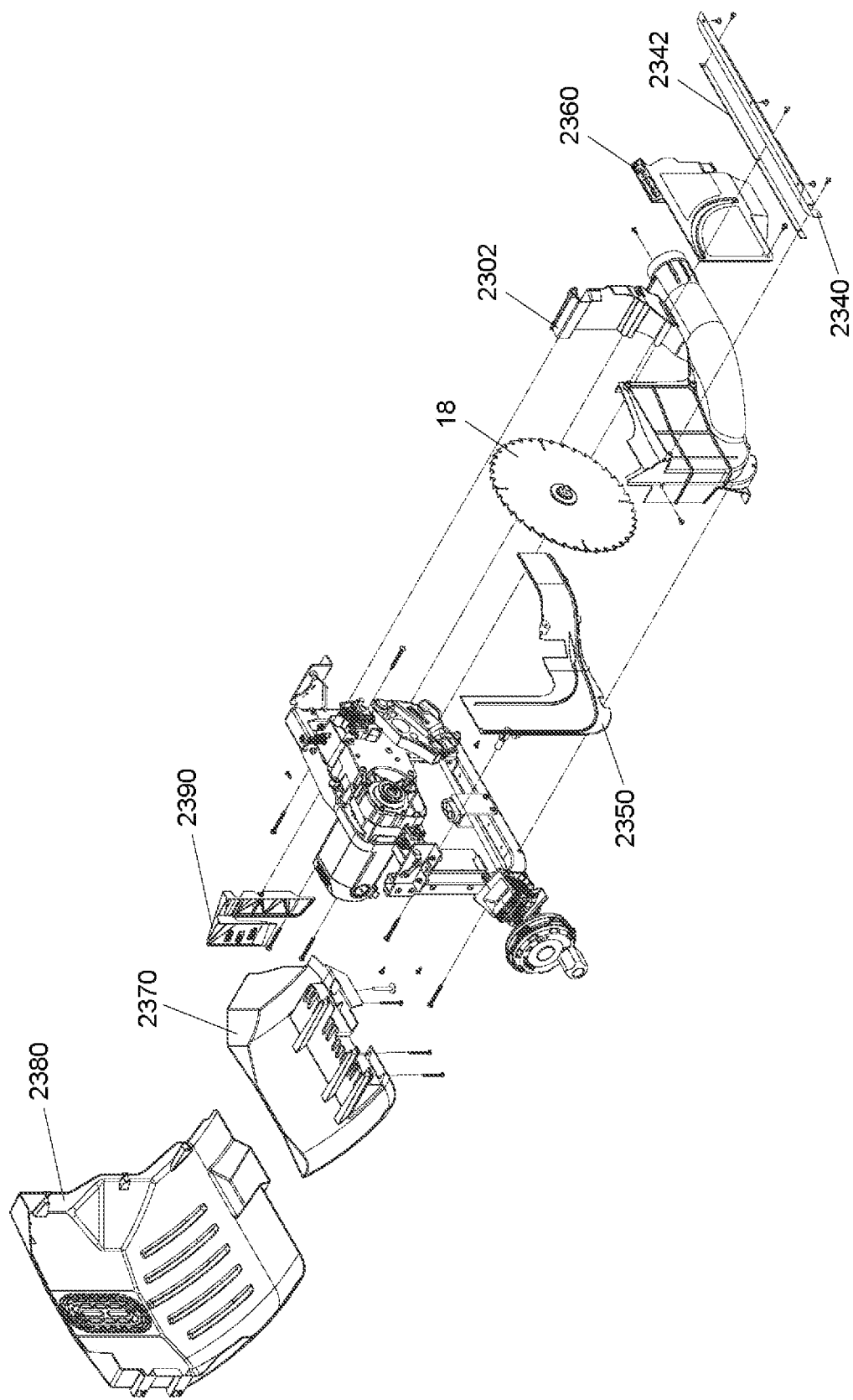
FIG. 176 shows an exploded view of a shroud assembly and trunnion assembly.

In this manner, a user is prevented from contacting the portion of the blade or other internal saw components on the underside of the table in both the vertical and beveled positions, even though the saw does not include a traditional, molded plastic housing. Front and rear panels 56 and 58 of support structure 14, along with the shroud assembly, overlap in various ways to ensure full coverage of the underside of the saw. FIG. 176 shows an exploded view of shroud assembly 2300.

Figure 177:
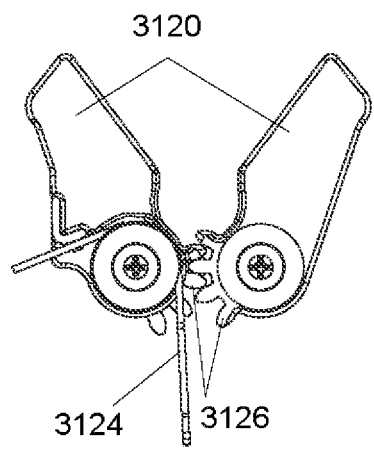
FIG. 177 shows an articulating fence stop isolated.
Figure 178:
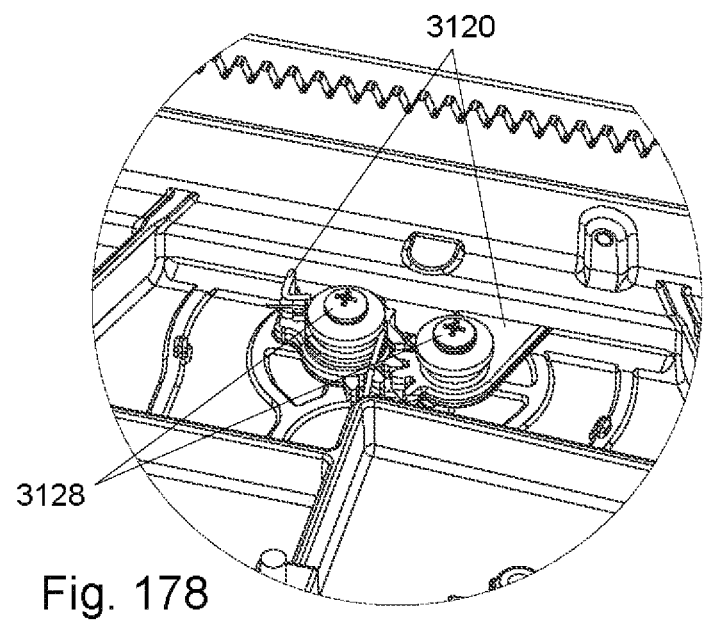
FIG. 178 shows another view of the fence stop of FIG. 190.
Figure 179:
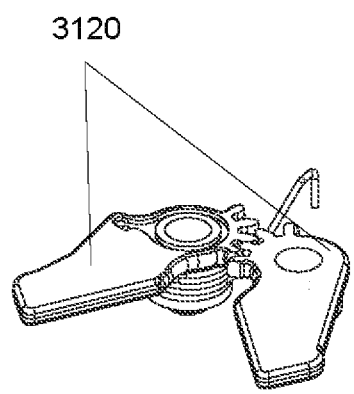
FIG. 179 shows a fence stop on a saw.
Figure 180:
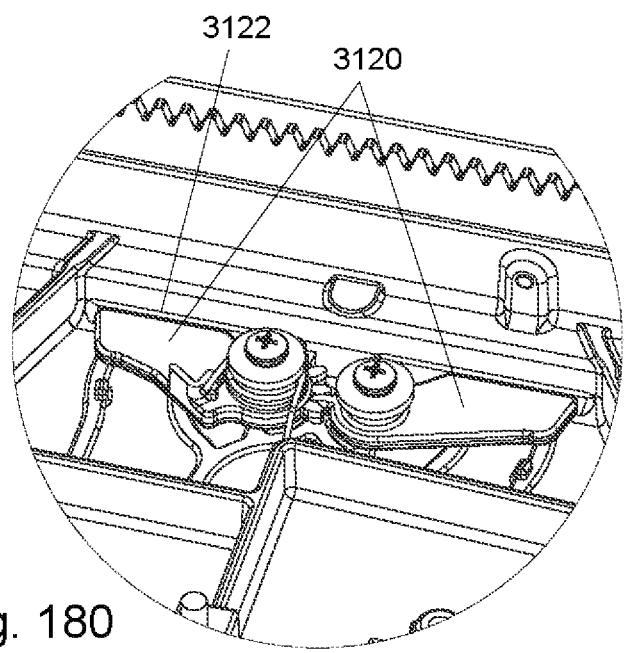
FIG. 180 shows another view of a fence stop on a saw.

In saws equipped with active injury mitigation systems, such systems may be configured to detect and respond to any conductive material coming into contact with the blade, in which case contact with either skin or metal would activate the safety system. This may lead to activations if a user moves a fence, such as fence 1600 into contact with the blade. To avoid this, saw 10 may be provided with a pair of fence stops 3120, which extend beyond the front of table 12 and prevent the fence from moving into the blade. The fence stops are labeled in FIG. 130, where they can be seen extending from a pair of openings 3122 in the table. FIGS. 177 and 179 show the fence stops isolated with some other components, FIG. 178 shows a detail view of the underside of the table with the fence stops extending beyond the edge thereof, and FIG. 180 shows a detail view of the underside of the table with the fence stops retracted so they are fully beneath the table. The fence stops are biased toward their extended position by a torsion spring 3124, and they are connected to table 12 by a pair of screws 3128. Each fence stop includes a toothed end 3126, and the teeth mesh so that a user may simply press one stop backward (under the table) in order to move both stops out of the way to move the fence closer to the blade or to pass the fence fully over the blade with the blade lowered beneath the table.

INDUSTRIAL APPLICABILITY

The power saws described herein are applicable to woodworking, manufacturing, packaging, construction, carpentry, material processing, etc. Various disclosed features are particularly relevant to table saws. Various other disclosed features are particularly relevant to table saws, hand-held circular saws, track saws, miter saws, and band saws with active injury mitigation technology.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:
1. A table saw comprising:
a table with an opening;
a blade configured to extend through the opening;
a motor to drive the blade; and
an elevation mechanism to raise or lower the blade relative to the table, where the elevation mechanism includes a handwheel that is rotatable to raise or lower the blade, a rotatable shaft having a first end and a second end, a universal joint assembly, a threaded shaft, and an elevation carriage, where the handwheel connects to the first end of the rotatable shaft, where the universal joint assembly includes a driving yoke mounted on the second end of the rotatable shaft, where the universal joint assembly also includes a coupling yoke in contact with the driving yoke, where the universal joint assembly further includes a driven yoke in contact with the coupling yoke, where the driven yoke is mounted on the threaded shaft, where the elevation carriage rides on the threaded shaft and supports the blade, and where rotation of the handwheel rotates the rotatable shaft, which rotates the driving yoke, which rotates the coupling yoke, which rotates the driven yoke, which turns the threaded shaft to raise or lower the elevation carriage and blade relative to the table, where the coupling yoke includes at least one ball that contacts one of the driving yoke and the driven yoke.

2. The table saw of claim 1, where the handwheel is mounted on the first end of the rotatable shaft.

3. The table saw of claim 1, further comprising a bracket, where the bracket supports the second end of the rotatable shaft.

4. The table saw of claim 1, where the bracket also supports the threaded shaft.

5. The table saw of claim 1, wherein the at least one ball comprises two balls and where the coupling yoke includes two arms with the two balls held between the two arms, and where one ball contacts the driving yoke and one ball contacts the driven yoke.

* * * * *